(12) United States Patent
Sundaresan et al.

(10) Patent No.: US 9,125,047 B2
(45) Date of Patent: Sep. 1, 2015

(54) CLOUD-BASED RADIO ACCESS NETWORK FOR SMALL CELLS

(71) Applicant: NEC Laboratories America, Inc., Princeton, NJ (US)

(72) Inventors: Karthikeyan Sundaresan, Princeton, NJ (US); Cheng Liu, Princeton, NJ (US); Mustafa Arslan, Princeton, NJ (US); Meilong Jiang, Princeton, NJ (US); Sampath Rangarajan, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 172 days.

(21) Appl. No.: 13/951,396

(22) Filed: Jul. 25, 2013

(65) Prior Publication Data

US 2014/0031049 A1 Jan. 30, 2014

Related U.S. Application Data

(60) Provisional application No. 61/676,101, filed on Jul. 26, 2012, provisional application No. 61/783,742, filed on Mar. 14, 2013.

(51) Int. Cl.
| | |
|---|---|
| *H04W 80/04* | (2009.01) |
| *H04W 16/02* | (2009.01) |
| *H04W 84/04* | (2009.01) |
| *H04W 24/02* | (2009.01) |
| *H04W 16/32* | (2009.01) |
| *H04W 88/08* | (2009.01) |

(52) U.S. Cl.
CPC ............. *H04W 16/02* (2013.01); *H04W 24/02* (2013.01); *H04W 84/042* (2013.01); *H04W 16/32* (2013.01); *H04W 88/085* (2013.01)

(58) Field of Classification Search
USPC .......... 370/328, 334, 329, 375, 267; 455/450, 455/435.3, 446, 561, 269
See application file for complete search history.

(56) References Cited

U.S. PATENT DOCUMENTS

| 8,937,904 | B2 * | 1/2015 | Machida ....................... 370/328 |
| 2011/0201268 | A1 | 8/2011 | He et al. |
| 2012/0163299 | A1 | 6/2012 | Chen et al. |
| 2013/0077966 | A1 * | 3/2013 | Gelbman et al. ............... 398/43 |
| 2013/0163539 | A1 * | 6/2013 | Cao et al. ...................... 370/329 |
| 2013/0286954 | A1 * | 10/2013 | Ma et al. ....................... 370/329 |

OTHER PUBLICATIONS

Michel Nahas et al., 'Base Stations Evolution: Toward 4G Technology', 19th International Conference on Telecommunications ICT 2012), IEEE, Apr. 23-25, 2012.
S. Bhaumik et. al., "Cloudiq: A framework for processing base stations in a data center," in ACM MobiCom, Aug. 2012.

\* cited by examiner

*Primary Examiner* — Vladimir Magloire
*Assistant Examiner* — Majid Syed
(74) *Attorney, Agent, or Firm* — Joseph Kolodka; Akitaka Kimura

(57) ABSTRACT

A wireless communications system is disclosed. The system comprises a baseband processing unit (BBU) pool including one or more baseband processing units (BBUs), and a plurality of remote radio heads (RRHs) connected to the BBU pool through a front-haul network, wherein the wireless communications system has a plurality of sectors, each of which includes one or more small cells, each of which is deployed by one of the plurality of RRHs, wherein a BBUs is mapped to two or more RRHs in a sector in a one-to-many configuration, and a BBU is mapped to a single RRH in a sector in a one-to-one configuration, and wherein a combination of the one-to-one configuration and the one-to-many configuration is applied to each sector. Other systems, apparatuses, and methods also are disclosed.

17 Claims, 55 Drawing Sheets

CLOUD-BASED RADIO ACCESS NETWORK FOR SMALL CELLS

This application claims the benefit of U.S. Provisional Application No. 61/676,101, entitled "Case for Re-configurable Backhaul in Cloud-RAN based Small Cell Networks," filed on Jul. 26, 2012, and U.S. Provisional Application No. 61/783,742, entitled "FluidNet: A Flexible Cloud-Based Radio Access Network for Small Cells," filed on Mar. 14, 2013, the contents of both of which are incorporated herein by reference.

BACKGROUND OF THE INVENTION

The present invention relates to small cells and, more particularly, to a cloud-based radio access network for small cells.

Small cells have become an integral component in meeting the increased demand for cellular network capacity. Cloud radio access networks (C-RAN) have been proposed as an effective means to harness the capacity benefits of small cells at reduced capital and operational expenses. With the baseband units (BBUs) separated from the radio access units (RAUs) and moved to the cloud for centralized processing, the backhaul between BBUs and RAUs forms a key component of any C-RAN.

In this work, we argue that a one-one mapping of BBUs to RAUs is highly sub-optimal, thereby calling for a functional decoupling of the BBU pool from the RAUs. Further, the backhaul architecture must be made re-configurable to allow the mapping between BBUs and RAUs to be flexible and changed dynamically so as to not just optimize RAN performance but also energy consumption in the BBU pool. Towards this end, we design and implement the first OFDMA-based C-RAN test-bed with a reconfigurable backhaul that allows 4 BBUs to connect flexibly with 4 RAUs using radio-over-fiber technology. We demonstrate the feasibility of our system over a 10 km separation between the BBU pool and RAUs. Further, real world experiments with commercial off-the-shelf WiMAX clients reveal the performance benefits of our reconfigurable backhaul in catering effectively to heterogeneous user (static and mobile clients) and traffic profiles, while also delivering energy benefits in the BBU pool.

The proliferation of mobile devices is contributing to an exponential growth of data traffic in broadband wireless networks. Sustaining these growing demands in turn requires higher spectral efficiencies from the network. Hence, operators are constantly looking for solutions that provide increased capacity without incurring significant additional capital (CAPEX) and operational (OPEX) expenses. Cloud-based radio access network (C-RAN) of small cells provides a promising solution in this direction and is being advocated both by operators (e.g., China Mobile, SoftBank) as well as service providers (e.g. LightRadio, Liquid Radio).

A C-RAN consists of three key components (FIG. 1): (i) the distributed radio access units (RAUs), each deployed with antennas at the remote site of a small-cell, (ii) a pool of baseband units (BBUs) in a datacenter cloud, run by high performance processors and real-time virtualization; and (iii) high-bandwidth, low-latency optical transport network connecting the BBUs and RAUs. The key concept of C-RAN is to separate the RAUs from the baseband processing and migrate the latter to a centralized entity. This keeps the RAUs light-weight, thereby allowing them to be deployed in large numbers for small cells. Centralized processing allows for better interference management between small cells and hence benefit from increased capacity through aggressive spectral reuse. In addition to capacity, C-RAN provides a multitude of other benefits: green infrastructure, reduced CAPEX/OPEX, easier traffic load balancing, and flexible service models.

While the BBU pool is implicitly decoupled from the RAUs in terms of physical connectivity in a C-RAN, a one-one logical mapping exists between a BBU and an active RAU. Hence, one BBU is logically assigned to generate an LTE/WiMAX frame for a given active RAU, although the mapping can change across time. We argue that such a mapping is highly sub-optimal for two reasons: (i) Generating a distinct radio signal (frame) for each small cell is important for capacity-enhancing techniques such as dynamic frequency reuse (e.g. dynamic FFR) or co-ordinated multi-point transmissions (e.g. CoMP in LTE). However, such schemes are applicable only for static users. Indeed for mobile users, for whom the problem of handovers is exacerbated in small cells, a traditional DAS (distributed antenna system) based scheme is more appropriate. In DAS, the same radio signal is transmitted to multiple small cells to provide increased coverage and diversity gain, (ii) When the traffic load is sparse in a given region, a single BBU can manage the load of multiple small cells, by serving them through a DAS. Whenever there is an opportunity to serve multiple small cells through a DAS, this reduces the number of BBUs and hence the processing (cores, DSPs, FPGAs) needed to manage a given set of RAUs, thereby resulting in energy savings in the cloud. However, allowing the C-RAN to cater to heterogeneous user (static and mobile) and traffic profiles, while also leveraging energy savings, in turn requires the backhaul to be flexible enough to support one-one as well as one-many logical mappings between BBUs and RAUs.

Towards this goal, we propose a C-RAN system with a flexible backhaul architecture, named FluidNet. While the physical optical backhaul remains unchanged, the logical connectivity between BBUs and RAUs (called overlays) is made flexible (one-one, one-many) and re-configurable to adapt to varying user profiles and traffic load conditions. We have prototyped FluidNet on a WiMAX-based C-RAN system with 4 BBUs and 4 RAUs, where the frames from the BBUs to RAUs are transported through our reconfigurable backhaul using radio-over-fiber (RoF) technology. We demonstrate the feasibility of our system over a 10 km distance between the BBU pool and RAUs. Through various real world experimental scenarios using commercial off-the-shelf WiMAX clients, we highlight the performance benefits of our reconfigurable backhaul in catering effectively to heterogeneous users (using a combination of dynamic FFR and DAS) and traffic conditions, as well as the potential for energy savings in the BBU pool.

Our contributions in this work are multi-fold.

- We advocate and propose a re-configurable backhaul for C-RAN systems that can cater effectively to users of multiple profiles and varying traffic load conditions.
- We prototype the first OFDMA-based C-RAN system using RoF technology.
- With real-world experiments, we showcase the potential benefits of our flexible backhaul overlays with respect to both performance and energy.

BACKGROUND AND MOTIVATION

A. Overview of C-RAN

The high level architecture of C-RAN is depicted in FIG. 1, consisting of three main components: (i) remote radio access unit (RAU), (ii) optical fiber based transport network, and (iii) pool of baseband units (BBUs) or central processor node.

The RAUs serve as simple, light-weight radio units with antennas, with their processing power being migrated to the central processing node. Hence, RAUs are relatively inexpensive and can be deployed in large scale without prior cell-site planning.

Optical fiber coupled with wavelength (WDM) and/or time division multiplexing (TDM) is employed to distribute wireless signals from the central processor to the remote units with both high reliability and low latency. There are two options for the transport of wireless signals: (i) digitized radio signals through CPRI (common public radio interface), or (ii) analog radio signal through radio-over-fiber (RoF) technology. While the former has less degradation and can transport wireless signals over longer distances (compared to RoF), the price to pay is the increased bandwidth needed on the backhaul to carry the sampled radio signals (order of Gbps).

The central processing node is the heart of the architecture, where most of the sophistication resides. The centralized nature helps migrate the base station (BS) processing of a large set of cells to a datacenter cloud, allowing for energy-efficient and intelligent inter-cell interference (ICIC), resource and mobility management. There are two options for the split of BS processing between BBU and RAU: (i) centralized—where all processing up to layer 1 (PHY) happens at each of the BBUs in the pool, and (ii) partially centralized—where processing only up to layer 2 (MAC) happens at the BBU, while PHY processing is pushed to the RAU. While the latter option is geared to reduce the increased bandwidth requirement on the backhaul, it needs a proprietary interface between BBU and RAU to be defined for transport of MAC layer data. Hence, the former option is preferred as it can be realized existing interfaces (e.g. CPRI).

B. Motivation for a Reconfigurable Backhaul

In a C-RAN, although a smaller set of BBUs may be managing a larger set of RAUs, one-one logical mapping exists between a BBU and an active RAU. In other words, at any given time, one BBU is logically assigned to generate an LTE/WiMAX frame for a given active RAU, although this mapping can change across time. We argue that such a mapping is highly sub-optimal through a simple example. Consider a system with 3 BBUs and 3 RAUs, serving three users (MSs) as shown in FIG. 2. Consider the following three scenarios.

1) Static Users: Consider a scenario, where all the users are static and are interfered by their neighboring small-cell. Now, with the help of dynamic FFR, the three RAUs can operate on orthogonal half (N/2 sub-channels) of the spectral resources (N sub-channels in a frame) each to result in a net simultaneous utilization of 1.5N sub-channels through reuse. Such a scheme would require different frames to be sent to the 3 RAUs for the 3 users, resulting in all the 3 BBUs being active as shown in FIG. 2(a). On the other hand, operating in a DAS mode in this scenario, where the same frame is sent to all the 3 RAUs would result in the available sub-channels being split among the 3 users without any reuse (N/3 for each user), resulting in a net utilization of only N sub-channels (see FIG. 2(b)). Although the coverage and diversity gain in DAS provides increased rate on the N sub-channels, the loss in reuse outweighs the benefits for static clients.

2) Mobile Users: Now, let all the three clients be mobile, moving between the 3 RAUs. Now catering to the mobile clients through dynamic FFR from individual RAUs is extremely difficult for multiple reasons—(a) with small cells, there are frequent handoffs, whose latency has a significant impact on throughput, (b) increased signaling load on the backhaul and mobile core due to frequent handoffs, (c) it might be hard to track the mobile user to specific small cells to efficiently apply dynamic FFR and leverage reuse. While relegating the mobile user to the macrocell is one option, DAS is an ideal approach for such mobile users, whereby a coverage similar to macrocell is achieved, while also increasing the link capacity (through shorter links and diversity gain, see FIG. 2(b)).

3) Low Traffic Load: Let the three clients be static, but their net data rate requirement is less than the resources corresponding to N sub-channels in a frame. While dynamic FFR can be employed in such cases, DAS can accomplish the same task with just one BBU, thereby allowing the other two BBUs to be switched off (unlike in dynamic FFR), resulting in significant energy savings in the BBU pool.

Thus, while dynamic FFR is best suited for static users, employing DAS also has benefits in several scenarios both from performance (mobile users, scenario 2) as well as energy (mobile users and static users with low load, scenarios 2 and 3) perspectives. Note that, unlike FFR, in DAS, a single frame is transmitted to multiple RAUs, thereby requiring a one-many logical connectivity between BBUs and RAUs. Hence, it becomes important to have a backhaul that can be re-configured (semi-statically) to allow flexible combinations of one-one and one-many logical mappings (overlays) between the BBUs and RAUs to adapt effectively to the dynamic nature of static and mobile user population as well as their induced load in the network.

C. Related Work

The centralized processing in C-RAN allows for easier realization of sophisticated CoMP, HetNet algorithms for wireless transmissions that have been developed in the research community. Being an architecture for radio access networks, most of the innovation on the architecture front is now being spear-headed by the industry.

Several providers have focused on making the RRH's simple, power-efficient and scalable (e.g. LightRadio, AIR) to accommodate multiple bands as well as access technologies (e.g. 3G, 4G, etc.). Similarly, chip-makers are focusing on the architecture for the baseband pool, with one camp advocating for general-purpose processors, while the other advocating the need to retain DSPs for several intensive baseband functions. Recently, [1] focused on the problem of scheduling processor cores to different BBUs in the pool with latency requirements.

Optical backhaul, being the medium needed to provide the capacity for transporting radio signals, is already being used in several DAS deployments serving stadiums, convention centers, etc. Here radio signals are transported either in analog (e.g. radio-over-fiber) or digital (e.g. CPRI) format. Several DAS based prototypes employing RoF technology have also been proposed in literature. Some aim to provide broadband wireless services to fast moving users in a train environment, while others try to combine MIMO with a DAS architecture in an RoF based WDM backhaul system.

Contrary to existing approaches, which are based on a pre-determined backhaul configuration, we propose a dynamically configurable backhaul architecture to achieve flexible configurations and hence effectively cater to different user profiles and traffic load patterns.

Existing solutions are focused more on the design of RAUs and general architecture of C-RANs (e.g. Light Radio from Alcatel Lucent, Liquid Radio from Nokia Siemens Networks, and Antenna-integrated Radio (AIR) from Ericsson) as well as the virtualization and scheduling of compute resources in the BBU pool [1]. No optimization of the mapping of BBU signals to RAUs to execute different transmission strategies on the RAN has been accomplished thus far.

References:

[1] S. Bhaumik et. al., "Cloudiq: A framework for processing base stations in a data center," in ACM MobiCom, August 2012.

BRIEF SUMMARY OF THE INVENTION

An objective of the present invention is, for example, to dynamically reconfigure backhaul to provide better performance on the RAN.

An aspect of the present invention includes a method implemented in a mobile communications system having a plurality of sectors, each of which includes one or more small cells. The method comprises obtaining, from each small cell in said each sector, aggregate traffic demand, determining a minimum set of resources needed for distributed antenna systems (DAS) and fractional frequency reuse (FFR) configurations based on first traffic demand from mobile traffic and second traffic demand from sector-exterior traffic, respectively, determining optimal multiplexing of the DAS and FFR configurations for said each sector, determining baseband processing unit (BBU) resource usage metric (RU metric) for said each sector, clustering the plurality of sectors two at a time based on the RU metrics of the two sectors, and applying, through a front-haul configuration on allocated resources, DAS and FFR strategies to each small cell in the two sectors.

Another aspect of the present invention includes a method implemented in a mobile communications system. The method comprises categorizing users and traffic into different profiles according to at least one of mobility and traffic load, and applying transmission strategies to different user and traffic profiles.

Still another aspect of the present invention includes a method implemented in a mobile communications system. The method comprises applying different transmission strategies on the radio access network (RAN) through logical configurations on front-haul, wherein the front-haul is dynamically re-configured to cater to varying user and traffic profiles.

Still another aspect of the present invention includes using DAS and FFR jointly to cater to both mobile and static user traffic demands effectively.

Still another aspect of the present invention includes realizing hybrid DAS and FFR signal mappings by adapting the front-haul network (between baseband and remote radio units) configuration.

Still another aspect of the present invention includes a solution to determine signal mapping (front-haul configurations) that maximizes the amount of traffic demand supported on the RAN, while also minimizing the compute resource consumption in the baseband pool. Specifically, this would include some algorithms.

Still another aspect of the present invention includes categorizing users and traffic into different profiles based on mobility, traffic load, etc. and applying appropriate transmission strategies (e,g, DAS, FFR, or CoMP) to different user and traffic profiles effectively. This would improve RAN performance as well as reduce BBU resource/energy consumption.

Still another aspect of the present invention includes realizing different transmission strategies on the RAN through logical configurations on the front-haul that can be dynamically re-configured to cater effectively to varying user and traffic profiles in the network.

Still another aspect of the present invention includes a wireless communications system comprising a baseband processing unit (BBU) pool including one or more baseband processing units (BBUs), and a plurality of remote radio heads (RRHs) connected to the BBU pool through a front-haul network, wherein the wireless communications system has a plurality of sectors, each of which includes one or more small cells, each of which is deployed by one of the plurality of RRHs, wherein a BBUs is mapped to two or more RRHs in a sector in a one-to-many configuration, and a BBU is mapped to a single RRH in a sector in a one-to-one configuration, and wherein a combination of the one-to-one configuration and the one-to-many configuration is applied to each sector.

Still another aspect of the present invention includes a method used in a wireless communications system comprising a baseband processing unit (BBU) pool including one or more baseband processing units (BBUs), and a plurality of remote radio heads (RRHs) connected to the BBU pool through a front-haul network, the method comprising applying to each sector a combination of the one-to-one configuration and the one-to-many configuration, wherein the wireless communications system has a plurality of sectors, each of which includes one or more small cells, each of which is deployed by one of the plurality of RRHs, and wherein a BBUs is mapped to two or more RRHs in a sector in a one-to-many configuration, and a BBU is mapped to a single RRH in a sector in a one-to-one configuration.

Still another aspect of the present invention includes a baseband processing unit (BBU) used in a wireless communications system, the BBU being configured to be connected to a plurality of remote radio heads (RRHs) through front-haul network, wherein the wireless communications system has a plurality of sectors, each of which includes one or more small cells, each of which is deployed by one of the plurality of RRHs, wherein the BBUs is mapped to two or more RRHs in a one-to-many configuration, and the BBU is mapped to a single RRH in a one-to-one configuration, and wherein a combination of the one-to-one configuration and the one-to-many configuration is applied to the sector.

BRIEF DESCRIPTION OF THE DRAWINGS

FIG. 10(a): Mobility Experiment.
FIG. 10(b): DAS—Outdoor.
FIG. 11(a): Set-up.
FIG. 11(b): Different strategies.
FIG. 12(a): DAS, static users.
FIG. 12(b): DAS, mobile users.
FIG. 12(c): FFR, static users.
FIG. 12(d): FFR: mobile users.
FIG. 13(a): Hybrid, static users.
FIG. 13(a): Hybrid, mobile users.

FIG. 31(a): Traffic Satisfaction, Static. FIG. 31(b): RU, Mobile. FIG. 31(c): Non-peak RU. FIG. 31(d): Traffic satisfaction, mobile. FIG. 31(e): Temporal progression of clusters.

DETAILED DESCRIPTION

A system called FluidNet allows for a functional decoupling (in addition to the already existing physical decoupling) of the BBU pool from the RAUs. Further, it designs a backhaul (also called front-haul) architecture that is re-configurable to allow the mapping of signals between BBUs and RAUs to be changed dynamically and intelligently (based on network feedback) so as to not just optimize RAN performance but also energy consumption in the BBU pool. Specifically, it employs a combination of one-to-one and one-to-many mapping of BBU signals to RAUs to execute DAS (distributed antenna systems) and FFR (fractional frequency reuse) strategies and tailor them appropriately for heterogeneous traffic load and user profiles. The end result is better performance on the RAN and reduced use of computing/energy resources in the BBU pool.

The proposed FluidNet C-RAN solution incorporates a dynamically reconfigurable backhaul to provide better performance on the RAN by catering transmission strategies like DAS, FFR, CoMP, etc. (through backhaul configurations) to both spatio-temporal traffic distribution as well as heterogeneous user profiles (static, nomadic, mobile users). In addition, it also minimizes the use of computing resources and hence provides cost/energy savings in the BBU pool.

I. FluidNet Architecture and Implementation

A. Proposed Architecture

Figure 1:
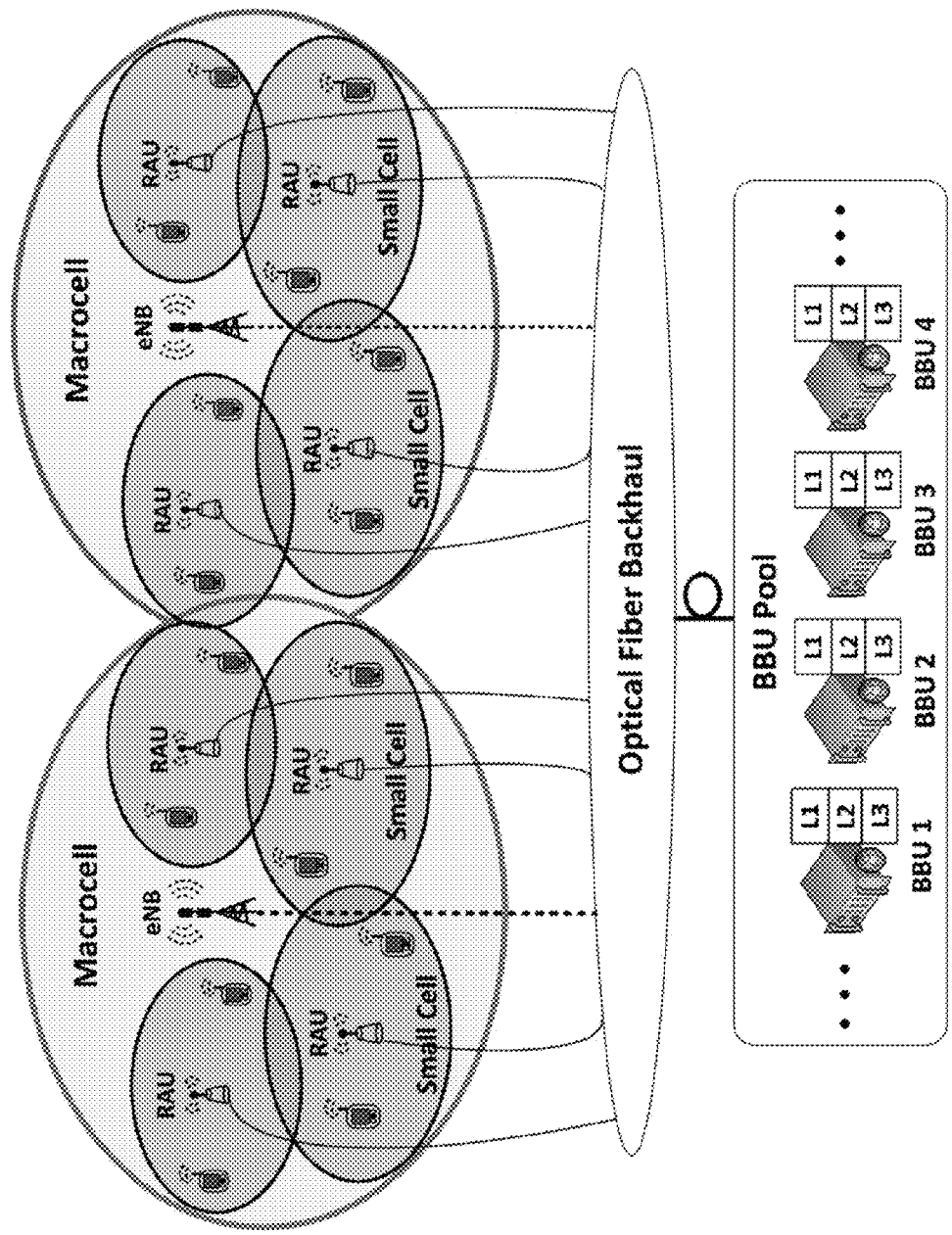
FIG. 1 depicts a C-RAN architecture.
Figure 2:
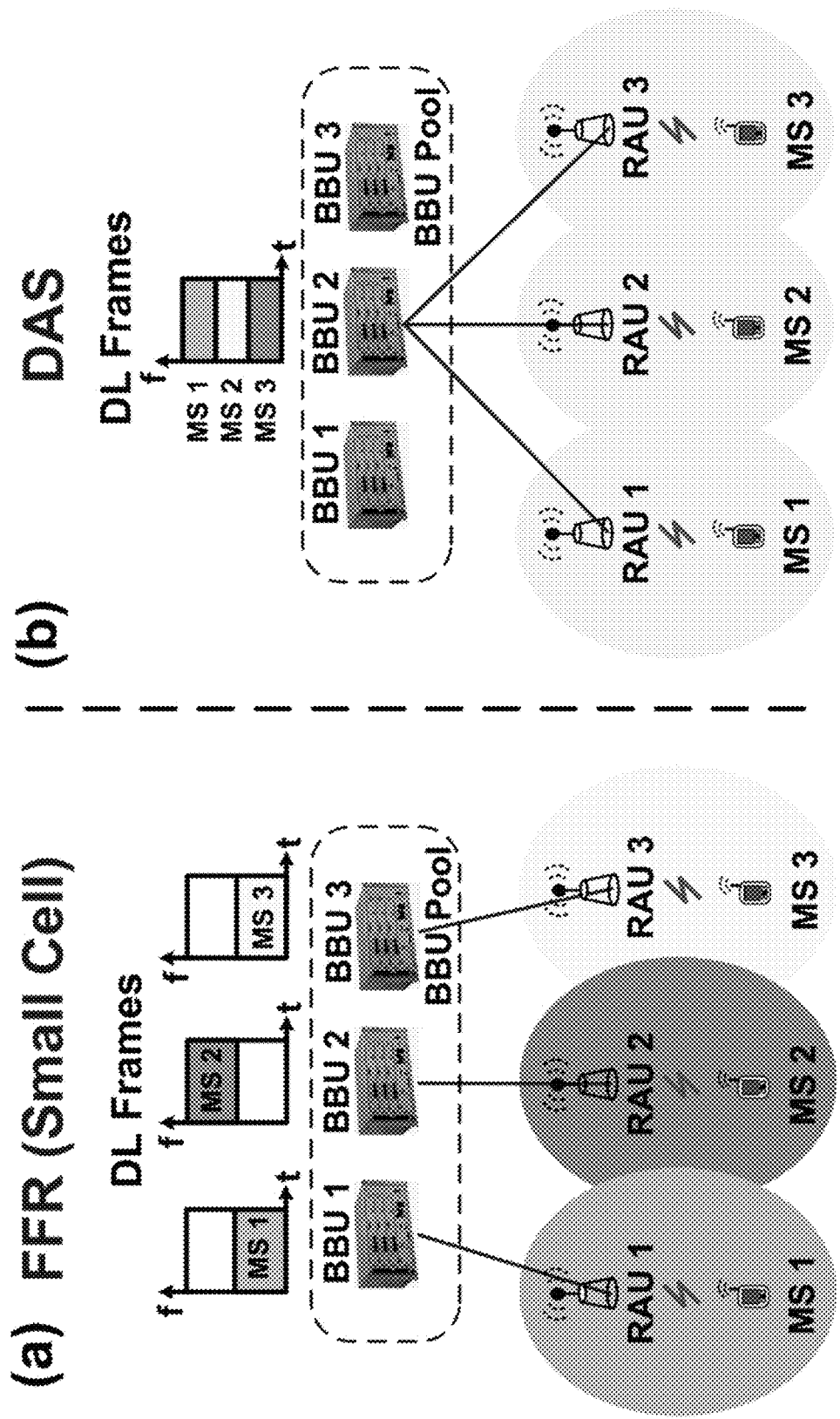
FIG. 2 depicts a motivation example.
Figure 3:
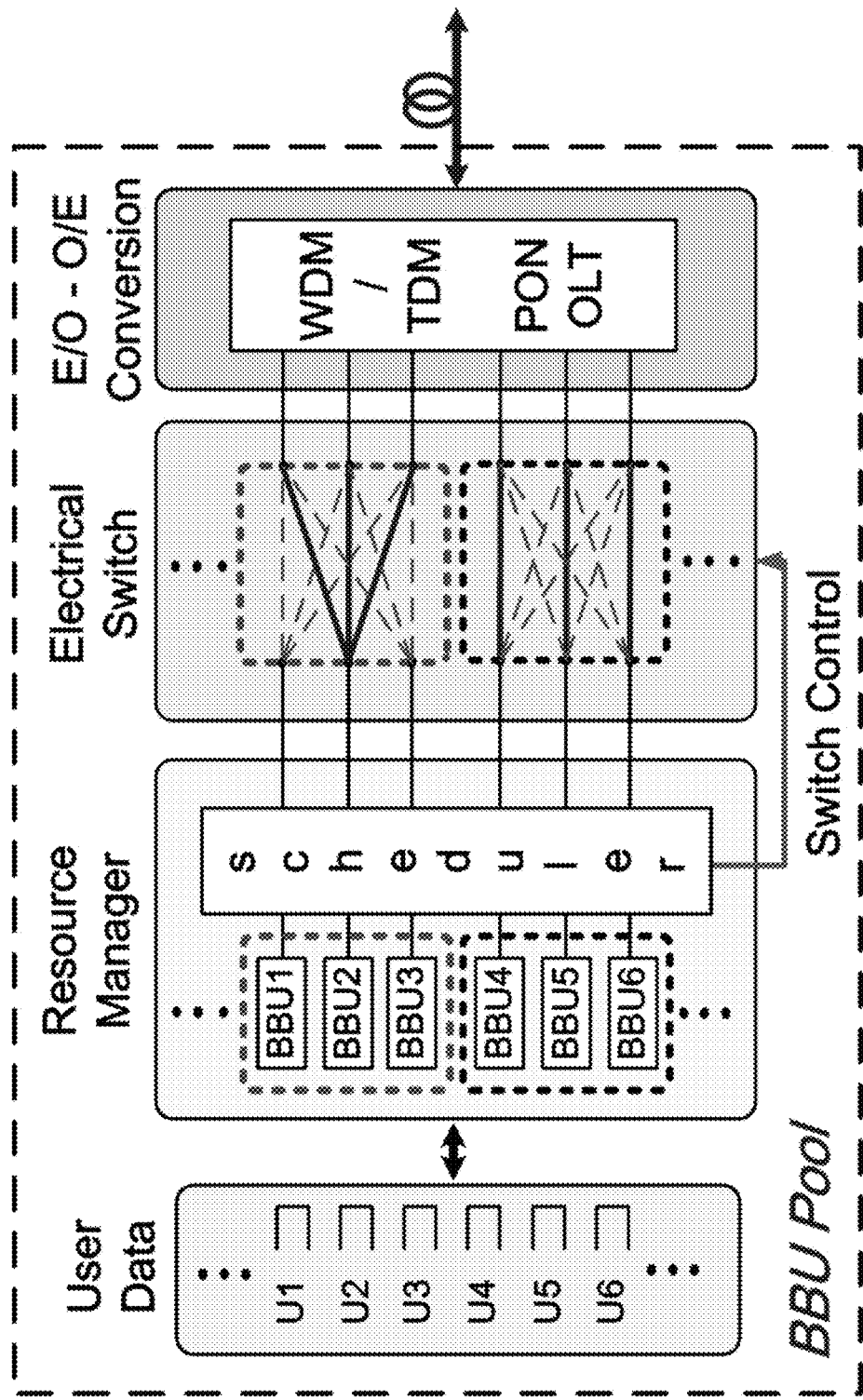
FIG. 3 depicts a central processing node in FluidNet.

Given that we desire to reconfigure the logical connectivity of the backhaul on the fly, this has to be effected from the central processing node. Hence, we describe our proposed architecture of the central processing node that helps achieve such flexible backhaul overlays (see FIG. 3), and is called FluidNet. The key operations of our central node are described below.

1) Decoupling BBU Processing from RAUs and User Buffers: Decoupling of a cell's (BS) processing from its remote unit allows a given set of BBU units to generate transmission signals (frames) that are sent to different sets of RAUs at different instants. In addition, it is also important to decouple the user data buffers from BBU processing, whereby multiple BBUs can share a user's data. This is useful not only during mobility (and handovers) but also in static scenarios, where different BBUs may serve the same cell and hence user at different instants (due to overlay reconfiguration).

2) BBU Selection and Scheduling: Given the user traffic demands, the BBU selector determines the appropriate number of BBU units needed to generate distinct number of transmission frames that will be dispatched to the RAUs. The transmission frames are in turn determined by the joint scheduler that takes into account user buffers and their traffic demands. Furthermore, this component also provides the flexibility to enable resource virtualization across network operators both within each cell and also across the network.

3) Reconfigurable Switch: Once the distinct transmission frames are generated after PHY processing as digital baseband (I,Q) or IF (intermediate frequency) signals, they are carried on CPRI (common public radio interface) and have to be routed to the right set of RAUs. Since some frames are sent to multiple RAUs (as in DAS), while other frames are sent individually to specific cells (as in dynamic FFR or CoMP), our reconfigurable switching fabric allows for both unicast and multicast switching. This is achieved with the help of a switch module that determines (jointly with the help of BBU resource manager) the appropriate set of output ports to activate for an incoming signal depending on the intended set of recipient RAUs for the frame, thereby allowing for frame replication across multiple RAUs. Since a BBU pool might potentially serve tens to hundreds of small cell RAUs, to ensure scalability in reconfiguring overlays, the switching fabric is composed of multiple smaller-size switches (as opposed to one big switch). The size of the switches is chosen to tradeoff the level of multicasting capability (for DAS) with cost.

While transmission of digital radio signals through CPRI is the preferred approach in C-RAN, two remarks are noteworthy: (i) high bandwidth requirement on the backhaul (order of 10 Gbps for a 4×4 MIMO system), and (ii) each RAU must be equipped with an RF path, which varies from one operator to another. Hence, an alternate design is to directly transport analog RF signal over fiber (RoF). While signal degradation over longer distances is more pronounced with RoF, it does save on RF paths in addition to BBU processing during DAS operation as well as on backhaul bandwidth. However, reconfigurable switching will now have to be accomplished in the optical domain, which could be more complex compared to switching in the digital domain.

4) Optical Conversion and Distribution: Each digital radio signal (frame) at the output of the switch (FIG. 3) is then converted to the optical domain and loaded on a wavelength. The frames on different wavelengths are then multiplexed using WDM to be carried on the fiber, where the individual wavelengths assigned to small cells are then respectively delivered using add-drop multiplexers. The optical signals are then re-converted back to electrical domain, modulated to RF and then transmitted at the RAUs. Note that, one can also employ other optical transport technologies (eg. TDM-PON, OFDM-PON, etc.).

While the above operations are described from the perspective of downlink, a reverse process can be envisioned for the uplink. Further, since the focus of this work is to make a case for a reconfigurable backhaul, our current implementation of FluidNet focuses mainly on its last two components and does not incorporate all aspects of baseband pooling (eg. processor virtualization, algorithms for BBU resource manager, etc.), which will be considered in future.

B. Implementation

Figure 4:
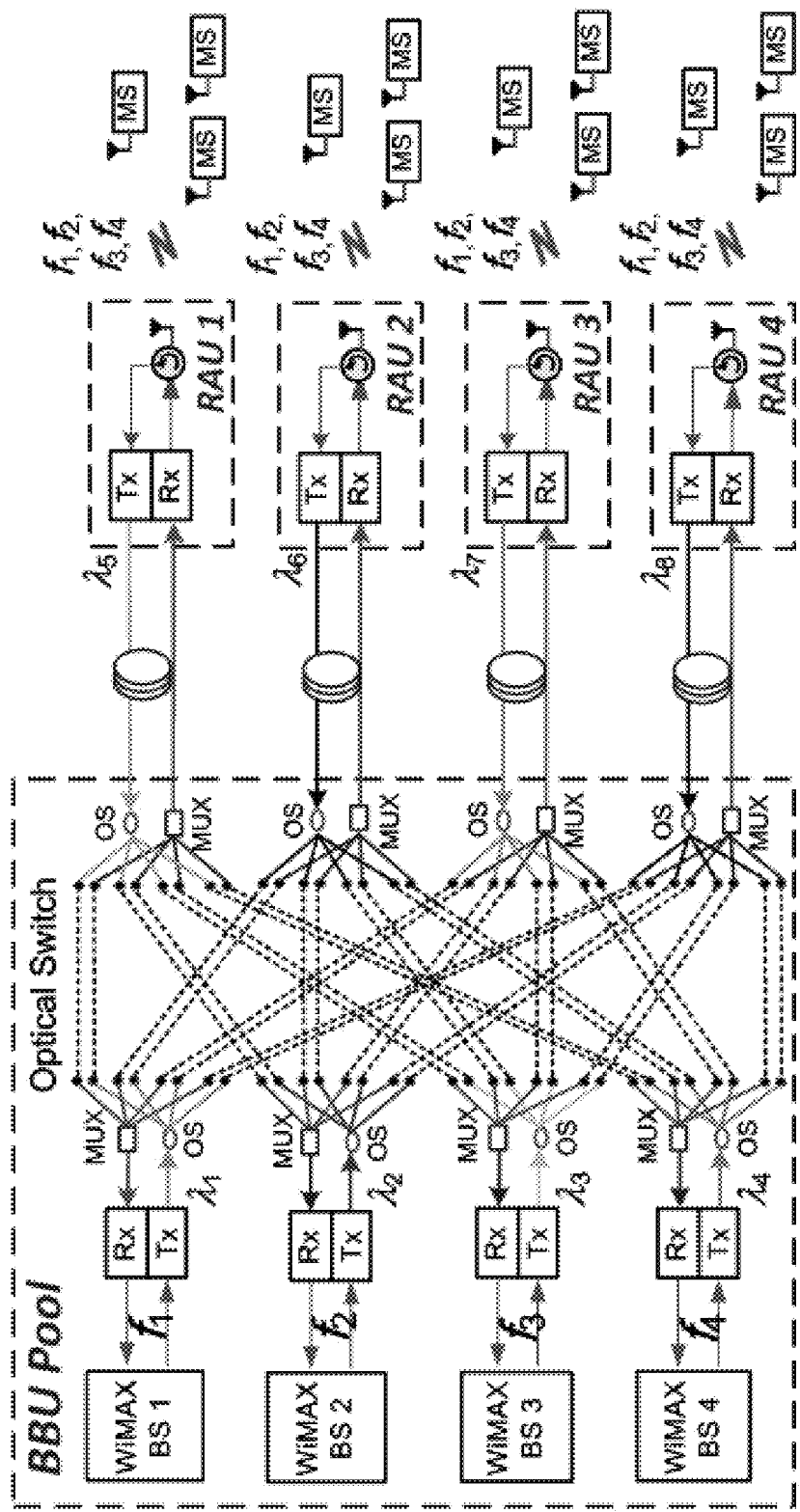
FIG. 4 depicts an implementation.

FIG. 4 shows the block diagram of our implementation, whose various components are as follows.

BBU Pool and Clients: We consider four WiMAX based pico-cell BSs (2 each from NEC and PicoChip) for our BBUs, that generate WiMAX RF signals at 2.59 GHz or 2.61 GHz, for which an experimental license has been obtained from FCC to perform over-the-air transmissions. Each of the BBUs can operate on the same frequency (single operator with one access technology) or different frequencies (multiple operators or single operator with multiple access technologies like 3G, 4G, etc.). We employ wireless netbooks with WiMAX USB dongles as the clients. Note that our test-bed and proposal are equally applicable to LTE as well.

Radio-over-Fiber: The lack of commercially available products to manipulate the baseband or IF transmission between BBU pool and RAUs in the digital domain (over CPRI), has prompted us to employ analog RF signal transmission based on radio over fiber (RoF) techniques, and consequently use optical switching. However, this does not affect our contributions. In RoF transmission, the modulated RF analog signal coming out of a BBU is directly converted into an optical carrier, and delivered to RAUs through optical fiber. At RAUs, the optical signals are directly (photo-)detected and converted back to the RF domain. Then the signals are amplified and transmitted through antennas. Therefore, all the signal processing functions (even modulation and RF up/down-conversion that are typically done at RAUs in the CPRI approach) are centralized at the BBU pool, which greatly simplifies the RAU design (to a remote antenna in our set-up).

Transceivers: The RF output of our WiMAX BBUs are directly used as the input signals to drive RoF transceivers. The RoF transceiver is a commercially available product, which integrates the function of both E/O (electrical/optical) RoF transmitter and O/E RoF receiver in a single module. Therefore, by having a pair of the RoF transceiver modules at two ends, a bi-directional point-to-point RoF link can be established between the BBU and RAU.

Reconfigurable Backhaul: To enable reconfigurability in the backhaul and hence control transmissions to RAUs (either in DAS or dynamic FFR modes; CoMP not standardized yet), we employ optical splitters coupled with an optical switch.

Since our optical switch supports only one-one switching, we enable flexible switching (one-one and one-many) indirectly as follows. The output of each BS is modulated onto different wavelengths through a coarse wavelength division multiplexing (CWDM) technique by using different RoF transmitters (dense WDM can be employed when tens-hundreds of RAUs are being managed). Each RoF downlink signal is further separated by an optical splitter into four different paths with equal amount of power. Hence, for four BBUs, there are totally 16 downlink paths, and each of them is associated with an independent input of the optical switch. On the other side of the switches, every four different wavelength paths (one from each BBU) are multiplexed together through a CWDM multiplexer (Mux), and connected to an RAU through a single downlink fiber. The function of the optical switch is to turn on or off each independent path from each BBU to each RAU. This allows any BBU to transmit to any (one-one) or multiple (one-many) RAU, thereby achieving full, flexible configurability.

A similar scheme applies to the uplink transmission, where each incoming optical signal path is first split into four and switched to four BBUs. Note that the logical connections between BBU and RAU on the uplink are exactly the same as that on the downlink. Hence, a paired optical switch, which simultaneously controls two optical paths can be used to reduce system complexity.

RAU: At each RAU, a single RoF receiver is used to detect multiple wavelengths with multiple RF signals being carried on top of them. On the uplink, each RAU receives wireless signals from different MSs (potentially at different RF frequencies), and converts the whole electrical spectra to optical domain and transmits to the BBU pool.

Notice that in our experimental setup, a pair of standard, optical single-mode fiber is used for each RAU—for uplink and downlink transmission separately. It is also possible to use a single fiber for both up and down streams. However, this requires optical circulators at both BBU pool and RAUs to separate the streams.

C. Feasibility

We have validated the feasibility of our implementation for both single operator and multi-operator set-ups by transmitting WiMAX signals with negligible signal (SNR) degradation over 10 Km. In the multi-operator set-up, multiple wavelengths carrying individual RF signals (for different operators) are sent to the same RAU and successfully detected using a single transceiver.

II. Experimental Evaluation

We now evaluate the merits of a flexible backhaul by conducting various experiments on our testbed and measuring system performance under several practical scenarios. While both indoor and outdoor experiments were conducted, in the interest of space, we will restrict most of our discussions to indoor experiments given that outdoor experiments resulted in similar trends and inferences.

A. Coverage and Interference Tests

Figure 5A:
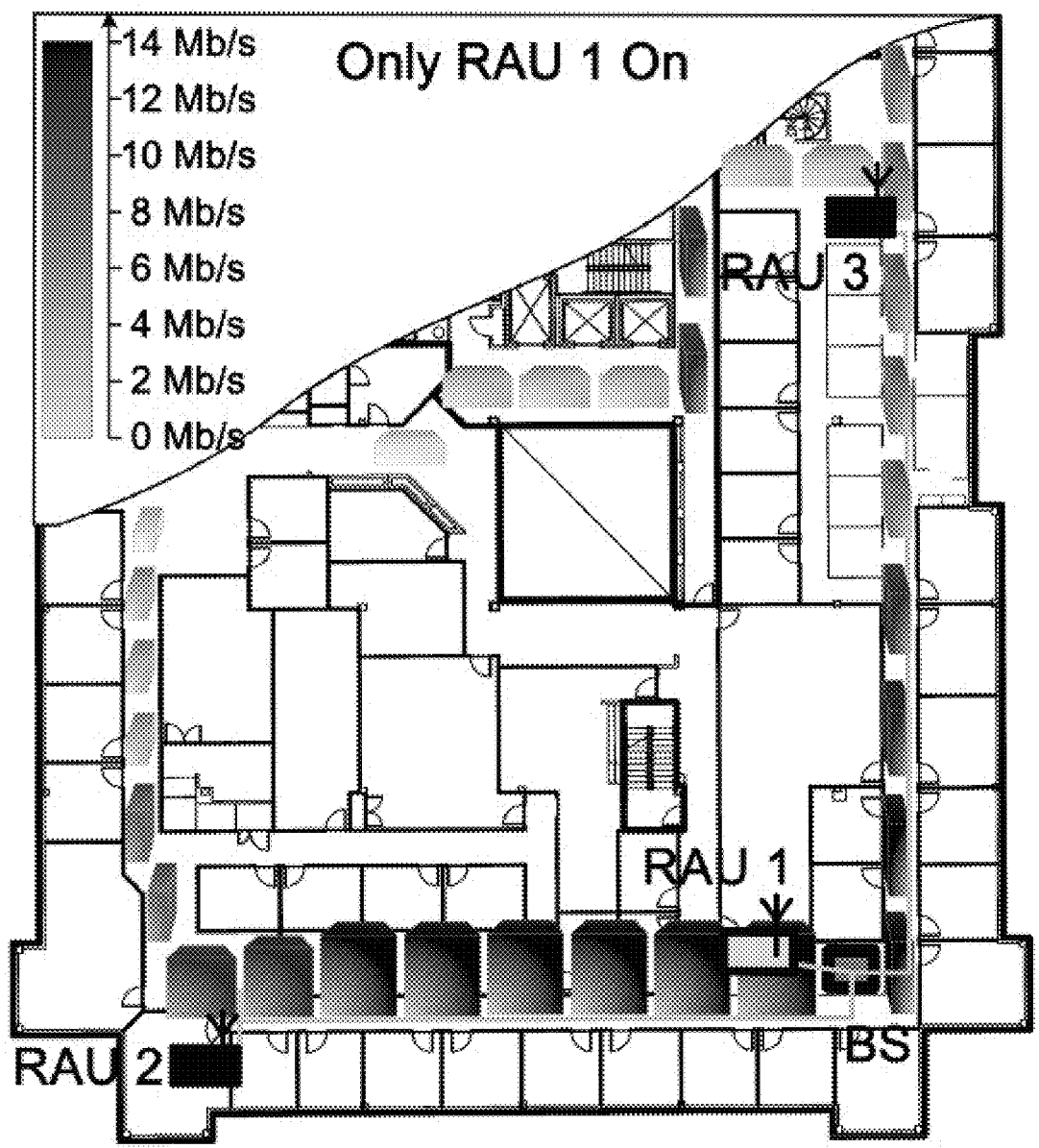
FIGS. 5(a) to 5(d) depict coverage tests.
Figure 5B:
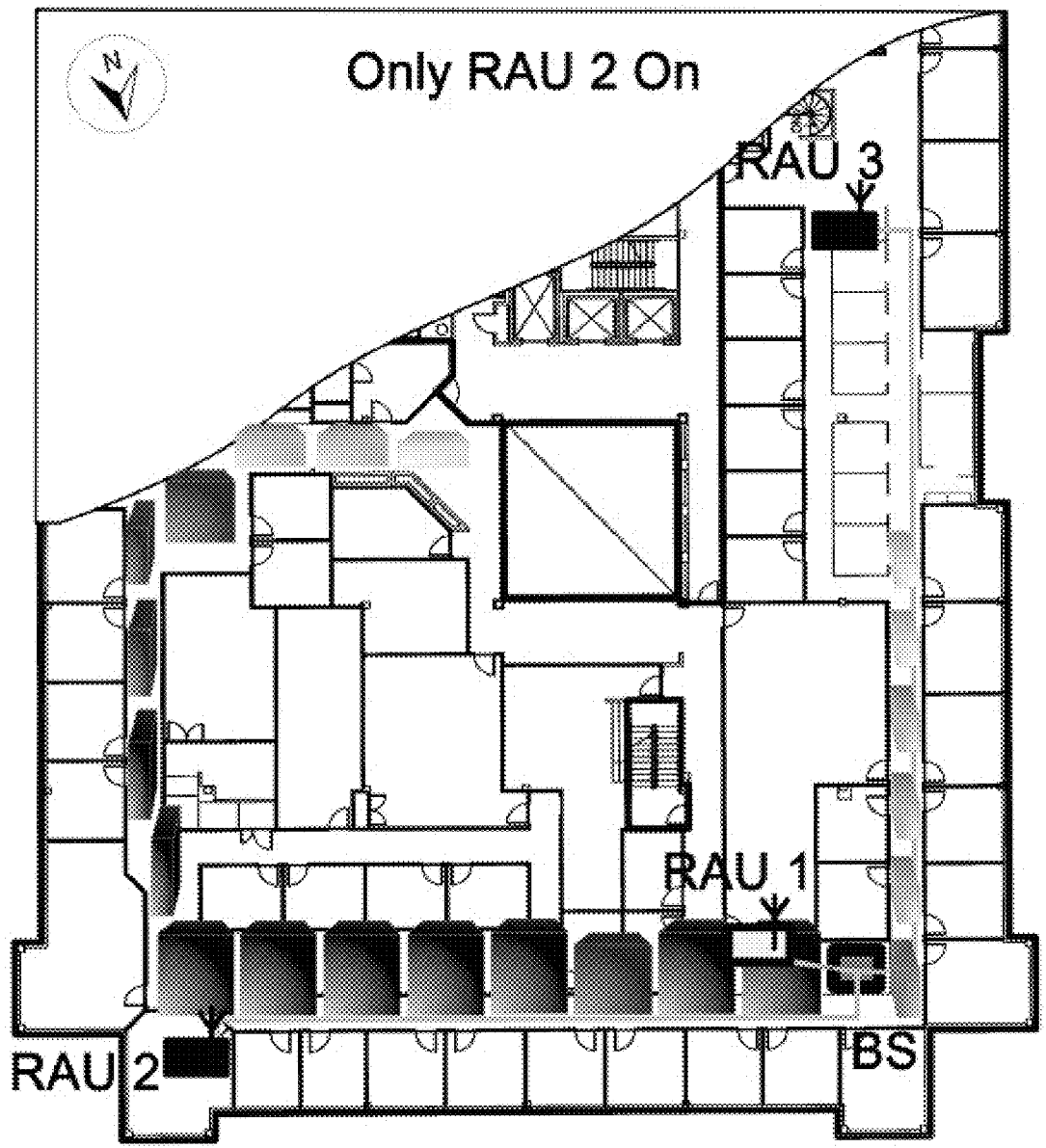
Figure 5C:
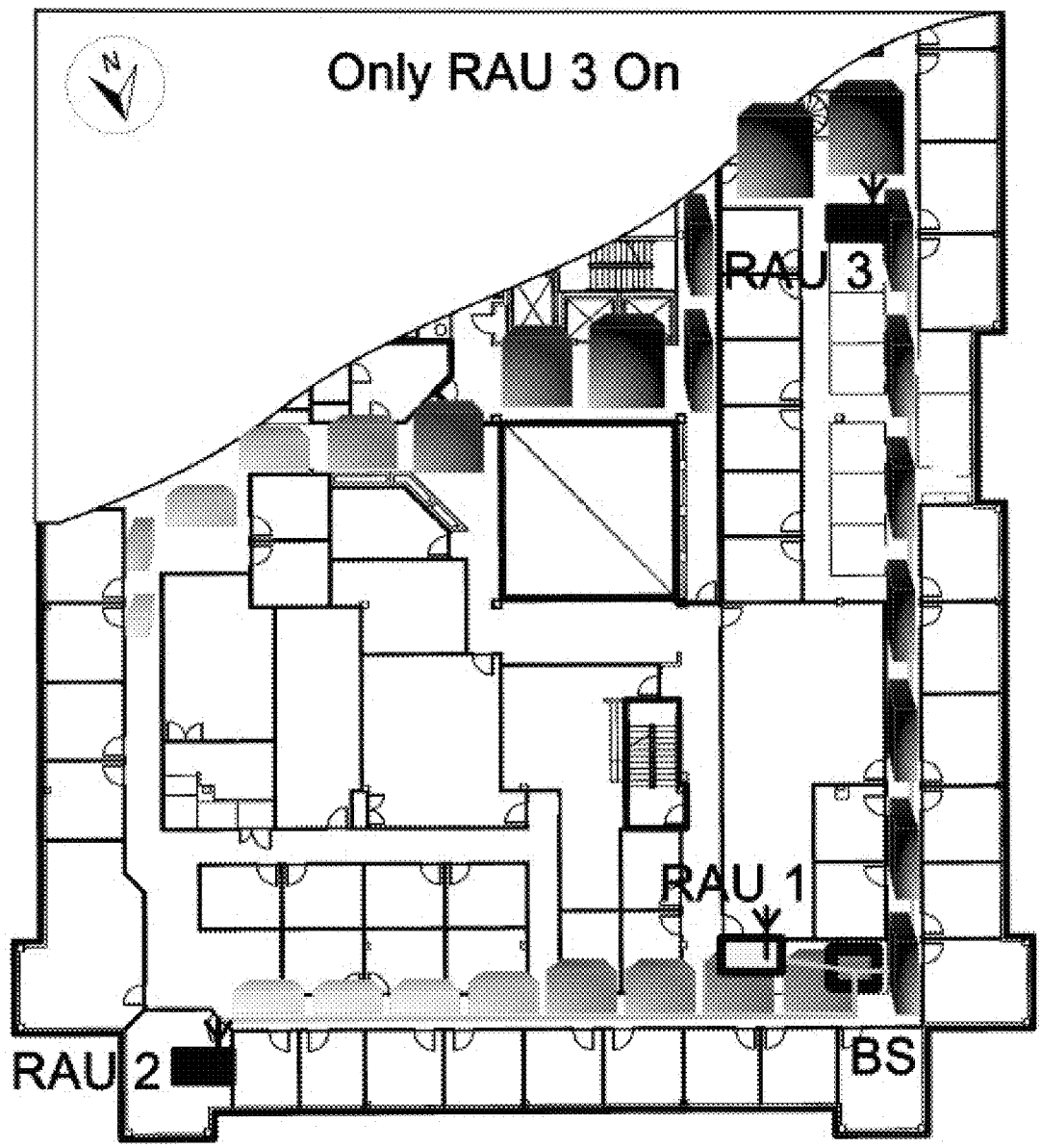
Figure 5D:
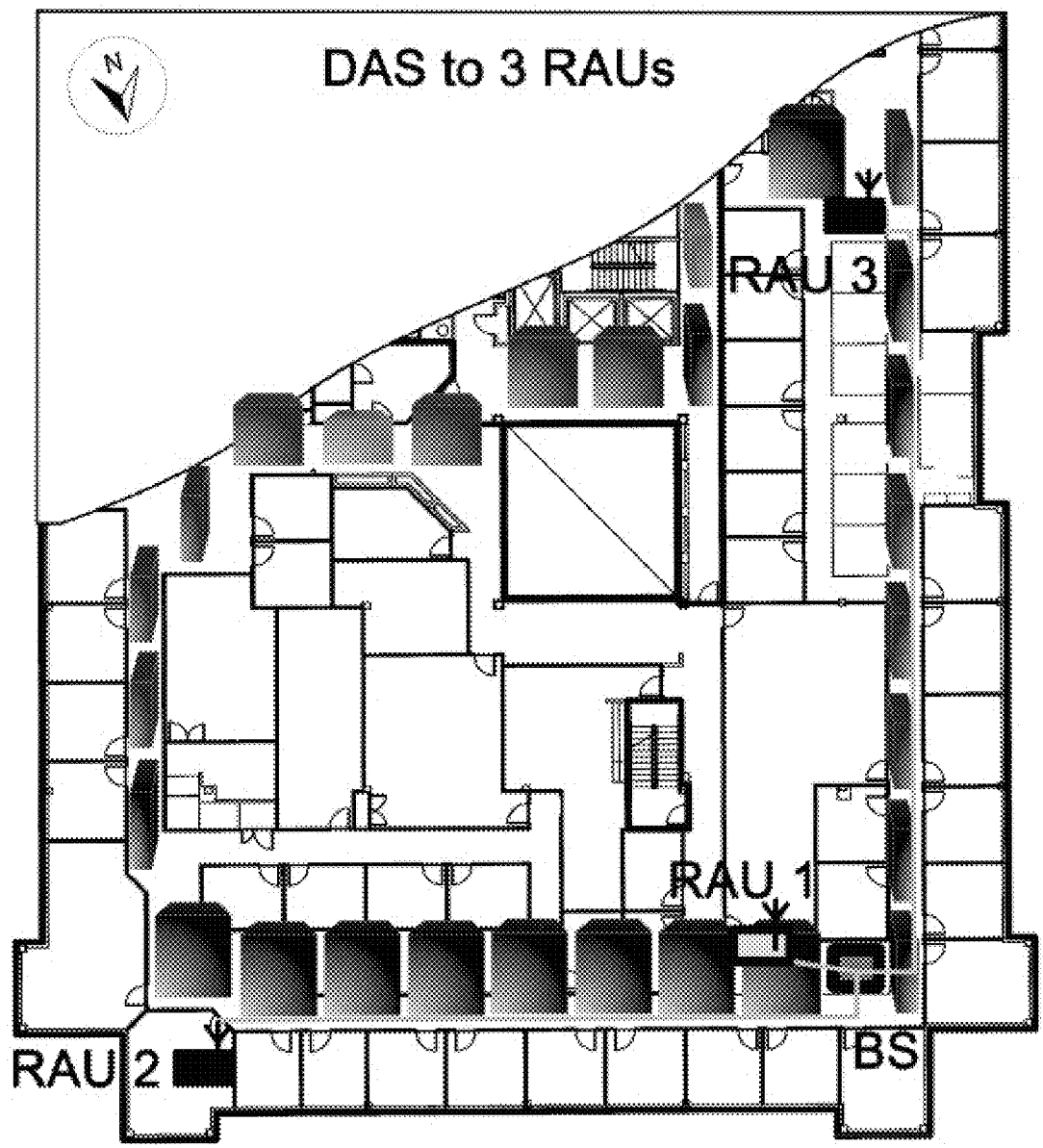

First, we try to understand the wireless footprint of our testbed. Our in-building testbed is shown in FIG. 5(a). BBU pool with multiple WiMAX BSs (BBUs) is located at one corner of the floor, and three RAUs are distributed at the three highlighted locations.

The coverage area of each RAU is tested individually as shown in FIGS. 5(a,b,c), with real-time downlink IP traffic throughput, (measured by a netbook equipped with a WiMAX card), serving as the metric. The tested areas are along the hallways in the building. As we can see, when only one of the RAUs is activated, maximum throughput is achieved when the MS is close to that RAU, and then the throughput decays as the MS moves away. Next, all the RAUs were switched on simultaneously at the BBU pool. The same WiMAX signal at 2.61 GHz with 10 MHz bandwidth is distributed from a single BBU to all the RAUs to realize a DAS configuration and the throughput of the covered area is measured as in FIG. 5(d). It can be seen that over the entire measured area, the throughput maintains above 6 Mb/s, which significantly extends the coverage compared to that of an individual RAU. Note that the throughput results incorporate rate adaptation, whereby the modulation and coding scheme (MCS) is dynamically adjusted for a client based on channel conditions. The maximum achievable throughput is around 13.9 Mb/s for a single user occupying the whole 10 MHz bandwidth in our system.

Figure 7A:
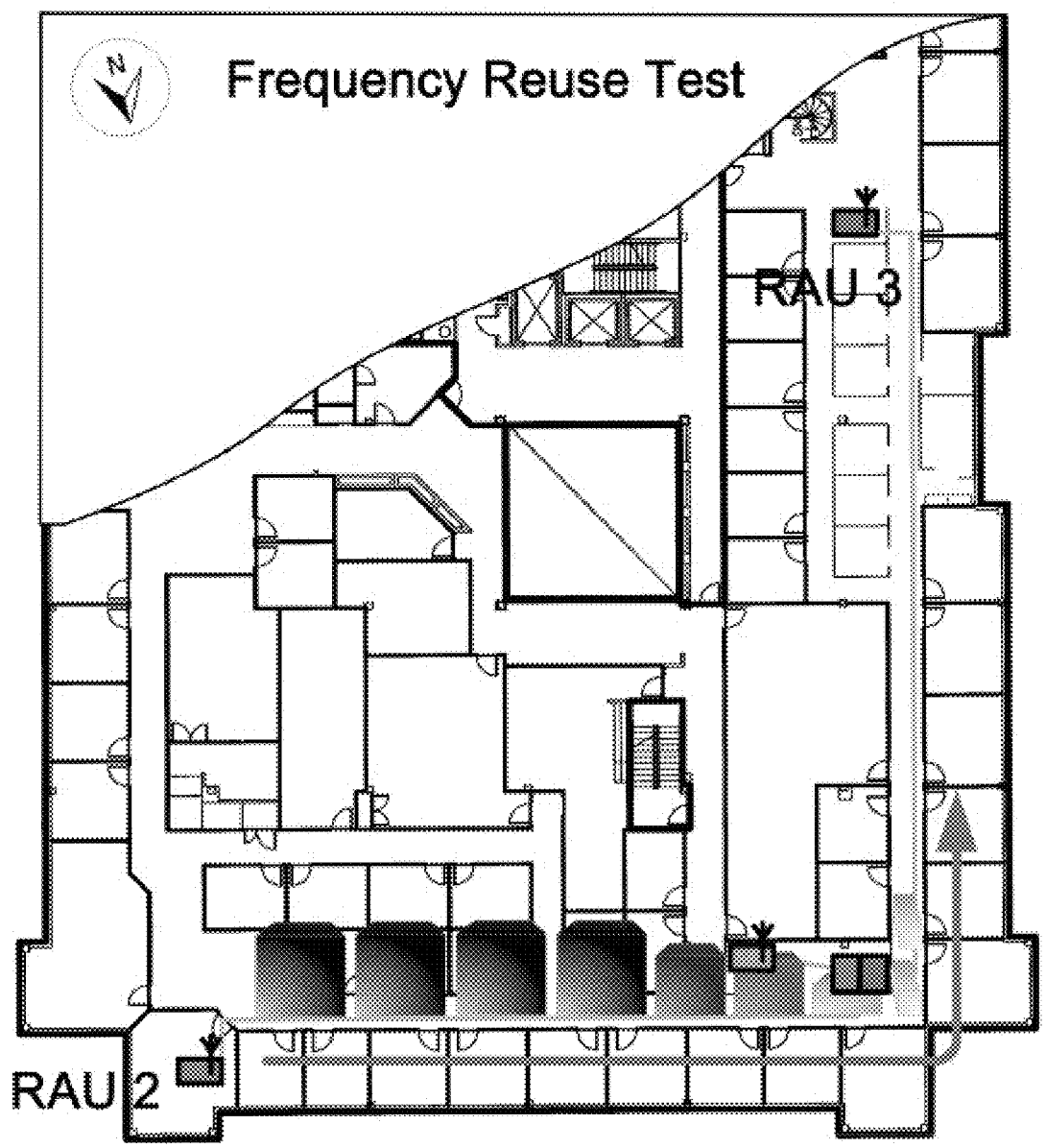
FIGS. 7(a) and 7(b) depict interference tests.
Figure 7B:
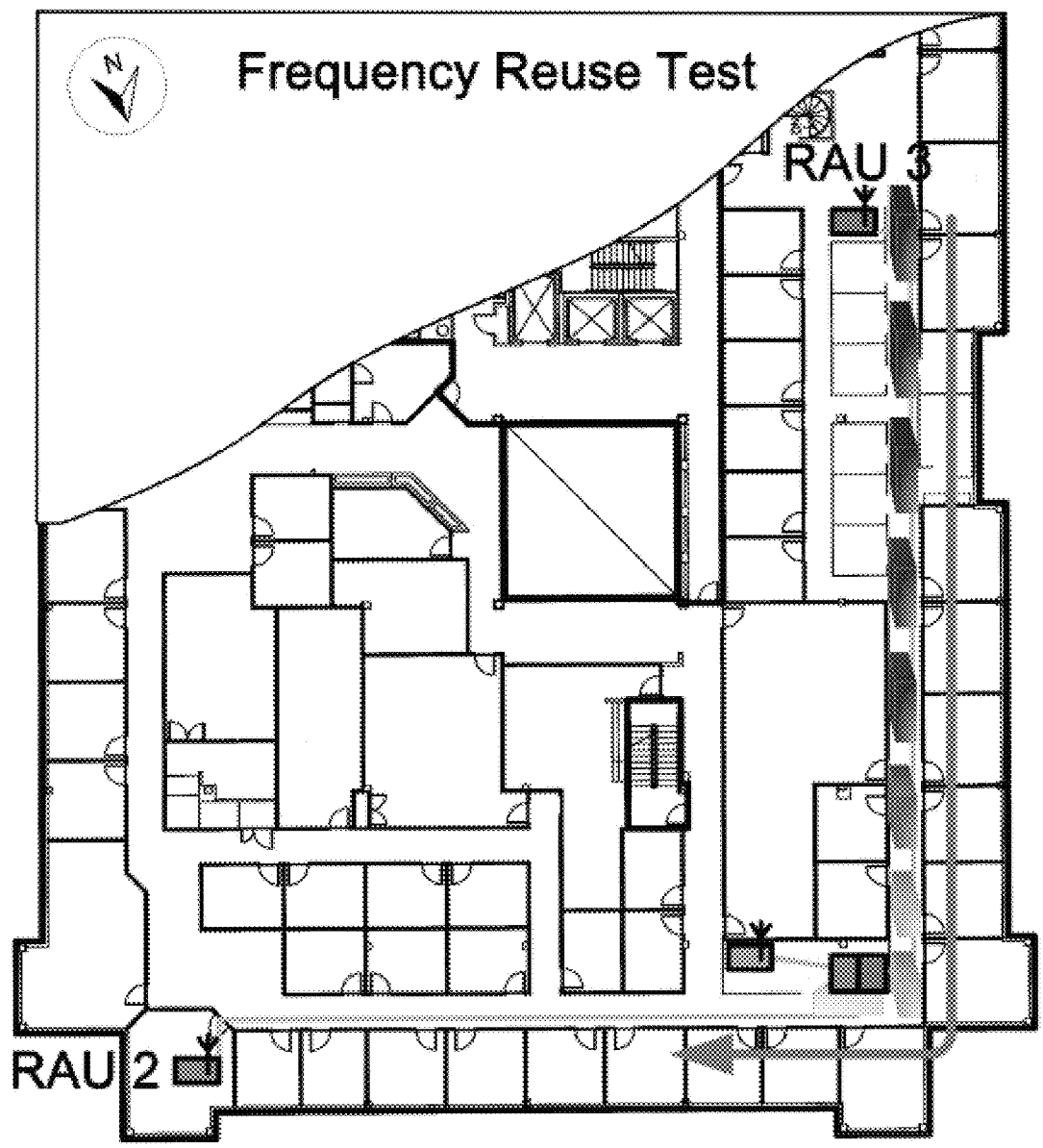

In a small cell configuration, where different signals are sent to different RAUs, an FFR-based approach is needed to address interference between cells. To determine the frequency reuse factor, we first need to measure the interference dependencies between the 3 cells. We serve RAU 2 and 3 from two different BBUs (BBU 1 and 2, respectively) on the same frequency band (2.61 GHz with 10 MHz BW). Then an MS associated with BBU1 through RAU2 is moved towards RAU3 to test the interference from RAU3 especially at the cell edge. The measured throughput results are shown in FIG. 7(a). Similarly an MS associated with BBU2 through RAU3 is moved towards RAU2 to test the resulting interference as shown in FIG. 7(b). Comparing with individual RAU coverage results (FIG. 5)), we find that the impact of interference between RAU 2 and 3 is very small as long as the client remains in the same corridor as the RAU, but is severe otherwise. Further, from FIG. 7, one can extrapolate the severity of the interference between RAU1 and RAU2/RAU3. Based on these dependencies, a frequency reuse factor of two is adopted in our set-up, i.e. RAU 2 and RAU 3 re-use the same (half of) frequency band, while RAU 1 uses a different (other half of) frequency band.

B. Catering to Heterogeneous User and Traffic Profiles

To understand the applicability of configurations (DAS and FFR) to heterogeneous user and traffic profiles, we conduct experiments with both static and mobile users.

Figure 6A:
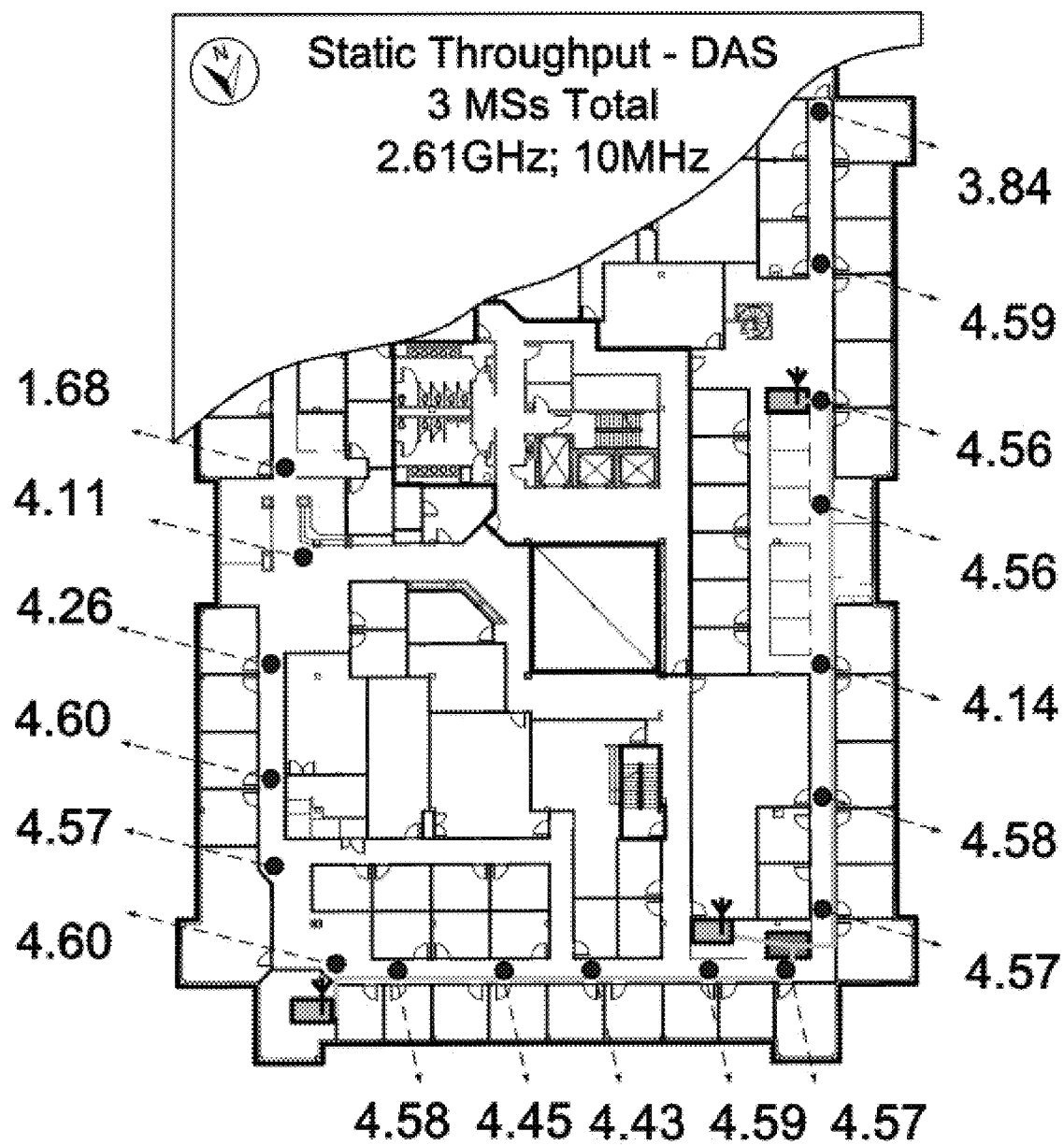
FIGS. 6(a) to 6(d) depict static user tests.
Figure 6B:
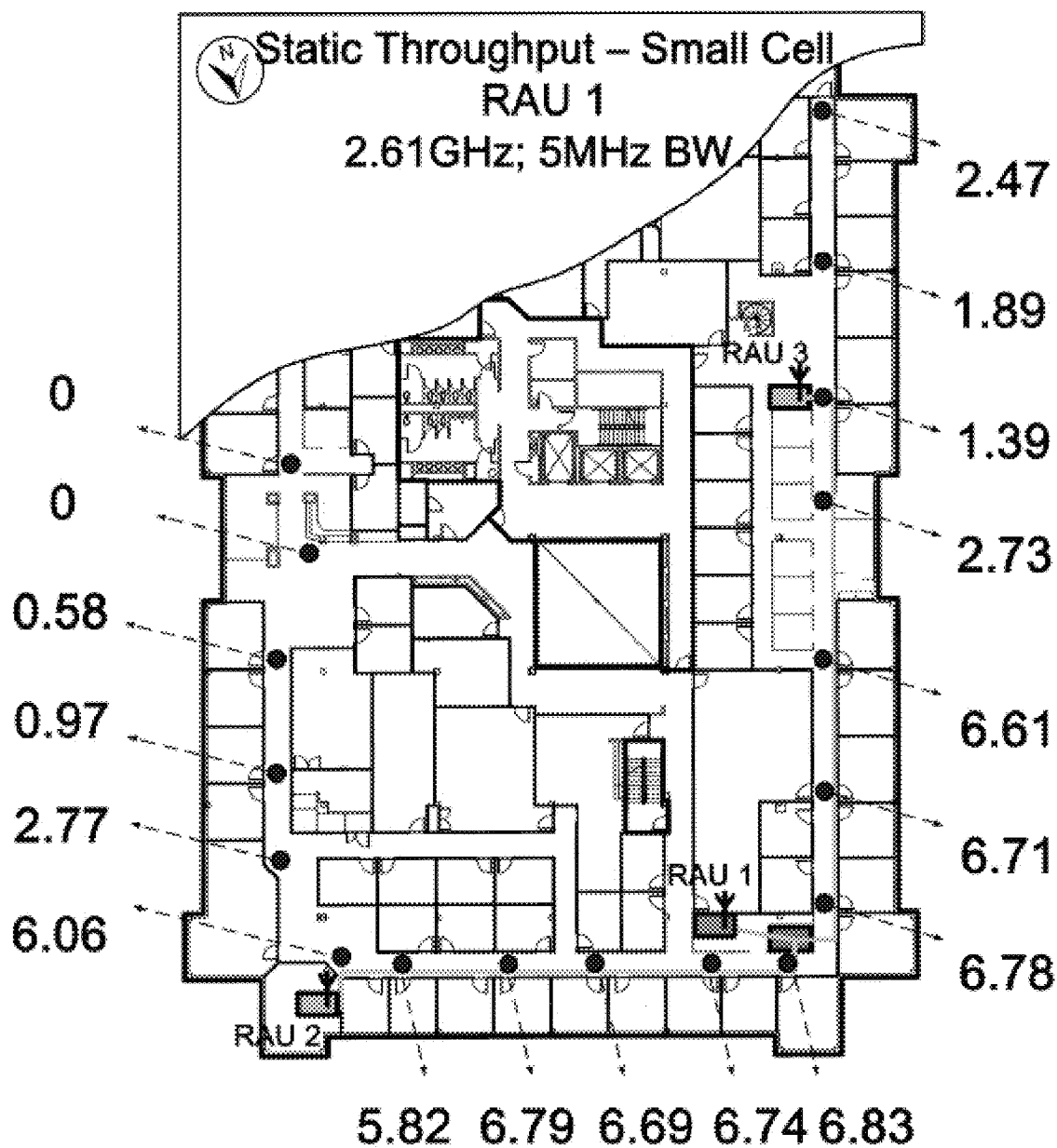
Figure 6C:
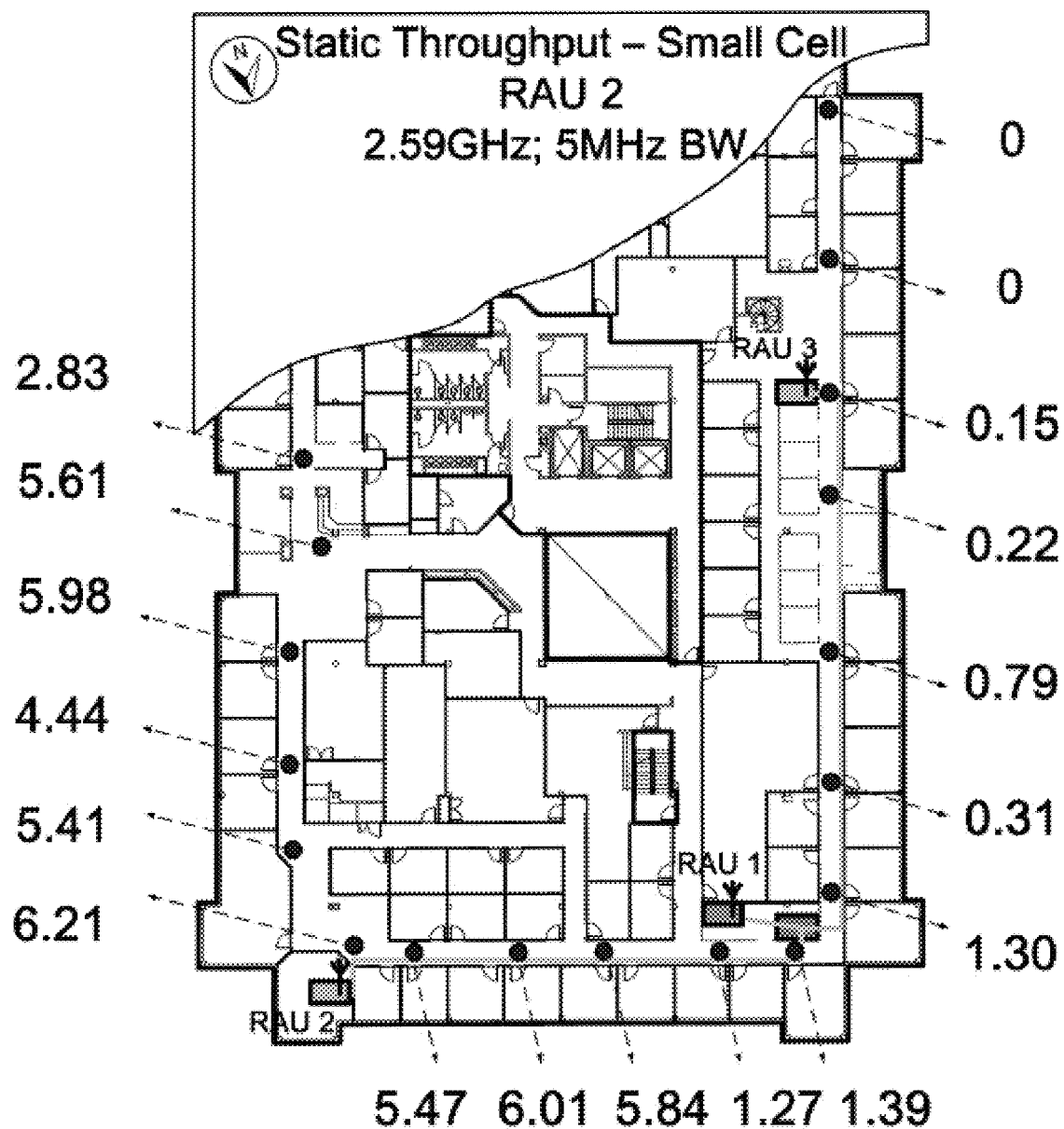
Figure 6D:
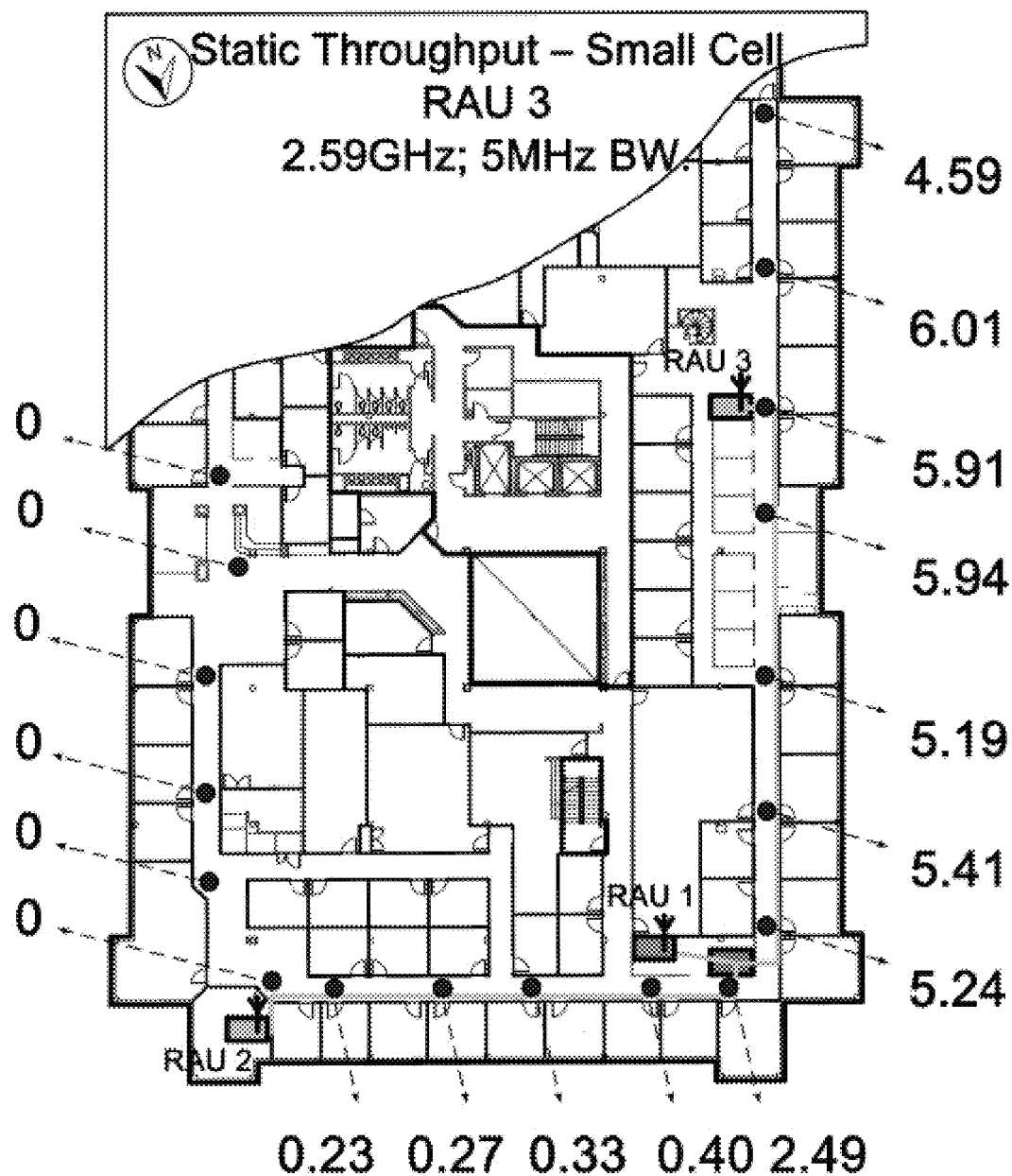

1) Static Users: We consider the DAS configuration in FIG. 5(a) with three MSs, all being associated with BBU1 and hence sharing the 10 MHz spectral resource among them. The measured throughput of one of the three MSs at different locations is shown in FIG. 6(a). Throughput is averaged over 20 seconds of measurement at each of the locations, with the MS being stationary. Measurements at multiple locations are presented to give a more complete picture of DAS performance over a wide area. The maximum aggregate throughput, of the DAS configuration is about 13.8 Mb/s (over all three MSs). This maximum throughput is achieved when each of the static users is close to one of the RAUs with good channel conditions. However, due to the coverage advantage of DAS, a near maximum system throughput can still be achieved in a relatively large area.

Figure 8A:
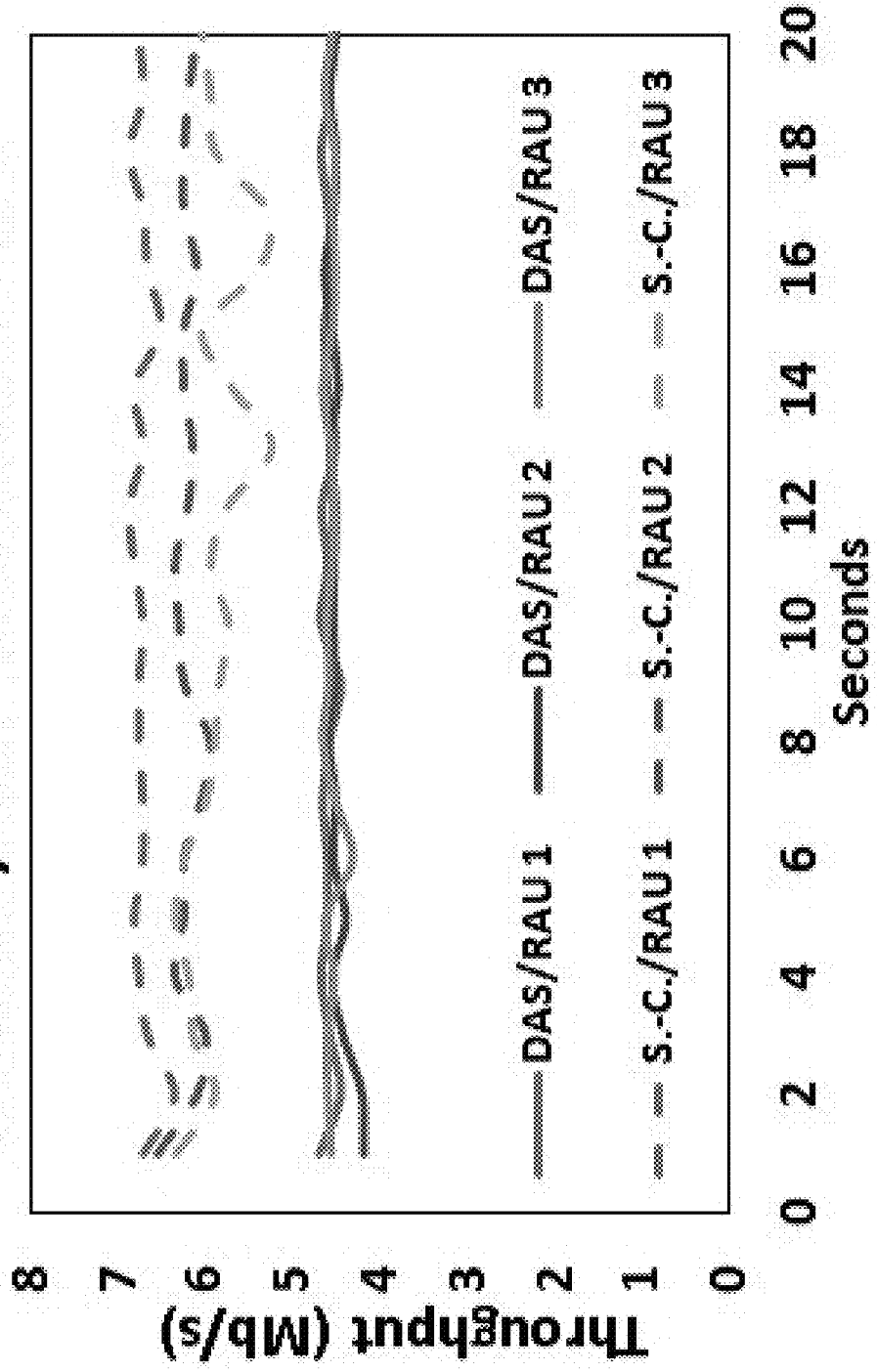
FIGS. 8(a) to 8(c) depict DAS vs. dynamic FFR.

Next, we consider the FFR (small cell) configuration. Here, three BBUs in the pool are connected to the three RAUs with a one-to-one mapping—RAU 1 to BBU1 at 2.61 GHz with 5 MHz bandwidth, RAUs 2 and 3 to BBU2 and BBU3 respectively at 2.59 GHz with the same 5 MHz bandwidth. The use of 5 Mhz is to emulate a frequency reuse factor of two. The one-one mapping allows different RAUs to generate different frames for frequency reuse. Similar to the DAS configuration, three static MSs are considered in the service area. But each MS is associated with only one RAU. The measured throughput (at MS) for each RAU at different locations is shown in FIGS. 6(b,c,d). As the results indicate, the maximum throughput for the MS in the small cell of RAU 1 is around 6.79 Mb/s; while for MSs in small cells of RAU 2 and 3, it is around 6 Mb/s. This can be attributed to the varying channel conditions at different frequencies (2.61 GHz and 2.59 GHz). From FIG. 8(a), for one set of MS locations (MSs in service areas of their respective RAUs), the overall system throughput for the FFR configuration can be seen to be around 18.79 Mb/s, which is 36% more than that in the DAS configuration.

While DAS requires only one BBU for its operation (energy savings compared to 3 BBUs in FFR), the benefits of its coverage (for static users) is far outweighed by the underutilization of capacity (due to broadcast). Hence, from a performance standpoint, for static users with high load, employing small cells in the FFR mode (with future extensions to CoMP) is the optimal approach. However, if the users' net load is low, then the performance advantage of FFR (reuse) is lost, allowing DAS to be the optimal approach from an energy standpoint.

Figure 8B:
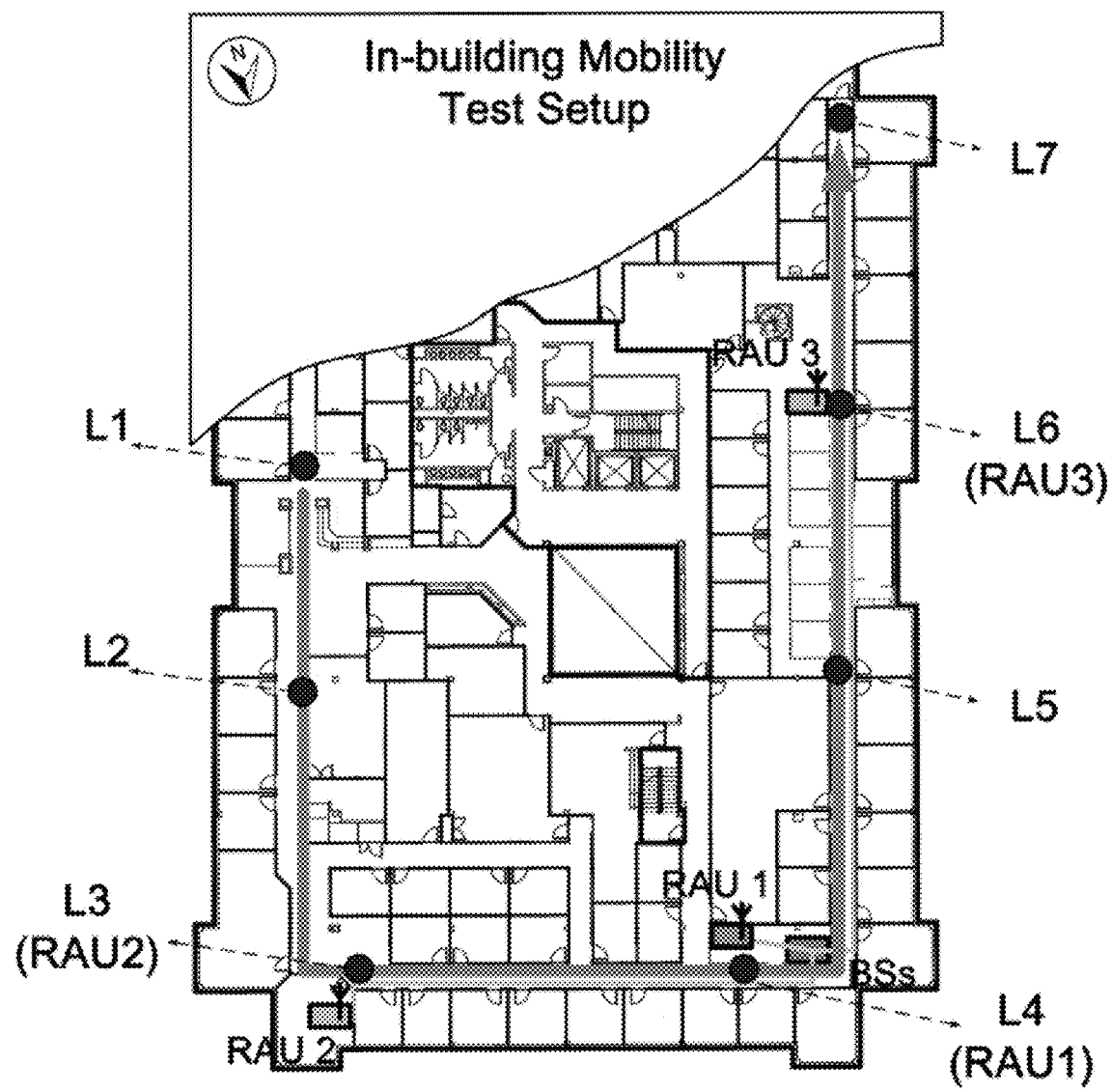

2) Mobile Users: We consider mobility experiments both indoors and outdoors. The in-building testbed is the same as in FIG. 5(a), except that MSs are now moving along the hallway as shown in FIG. 8(b). The mobility path is from position L1 to position L7, The marked red points along the path serve as checkpoints to ensure a MS moves with uniform speed across different experiments. The DAS and FFR configurations are similar to that in FIG. 6.

Figure 8C:
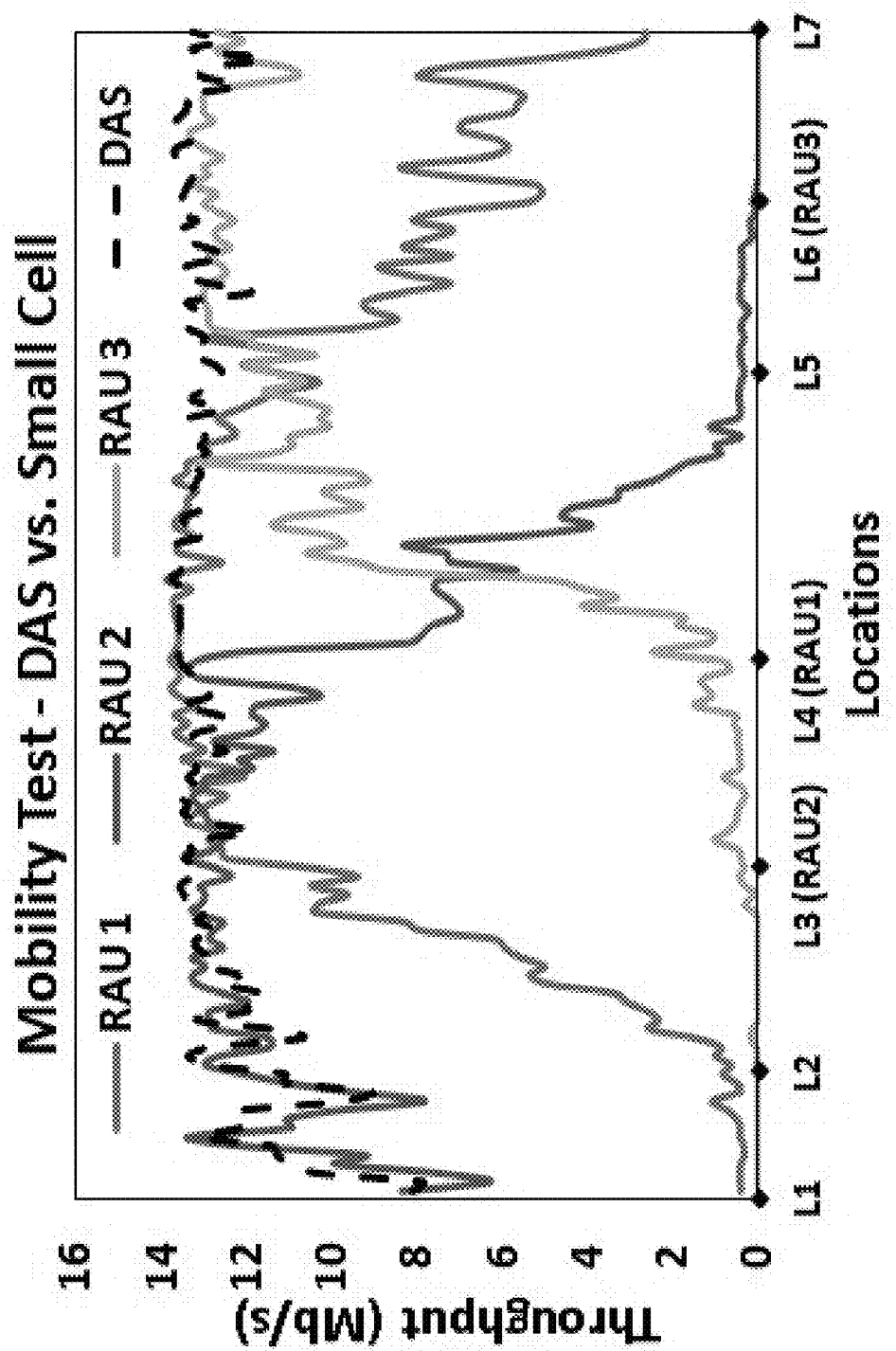

While coverage during mobility and hence handoff is not an issue for DAS, it is a big challenge for FFR schemes. This is especially the case with small cells, where the frequency of handoffs increases significantly. Since the mobility performance of FFR schemes is influenced by the efficiency of the handoff algorithm employed and thresholds chosen, to isolate the impact of mobility on FFR schemes (from handoff), we take the following approach. An MS is associated to one of the RAUs in the FFR mode during its entire mobility path, and its throughput measured at a 1 s interval. This is repeated by associating the MS with the other two RAUs sequentially. The resulting three throughput curves in the FFR mode are compared with that in the DAS mode, where the MS receives simultaneously from all the 3 RAUs in FIG. 8(c).

In the DAS mode, the mobile user receives close to maximum throughput over the entire mobility path. However, in the FFR mode, once the mobile user moves out of the small cell's coverage area, the throughput drops quickly and eventually the connection is lost. Note that the ideal hand-off scheme with near-zero latency and zero false triggers cannot exceed the overall envelope of the three FFR curves, which is at most the performance of the DAS mode. Given the inefficiencies of any practical handoff scheme, coupled with the increased rate of false triggers (from frequent handoffs) in small cells, it might even be infeasible to perform handoffs in small cells. While relegating to the macro-cell is one option for such mobile users, an equivalent coverage (to macrocell) can be realized with small cells through a DAS configuration along with increased capacity (from reduced path-loss). Thus, the DAS mode serves mobile users the best not just from an energy standpoint but also from a performance perspective.

Figure 10A:
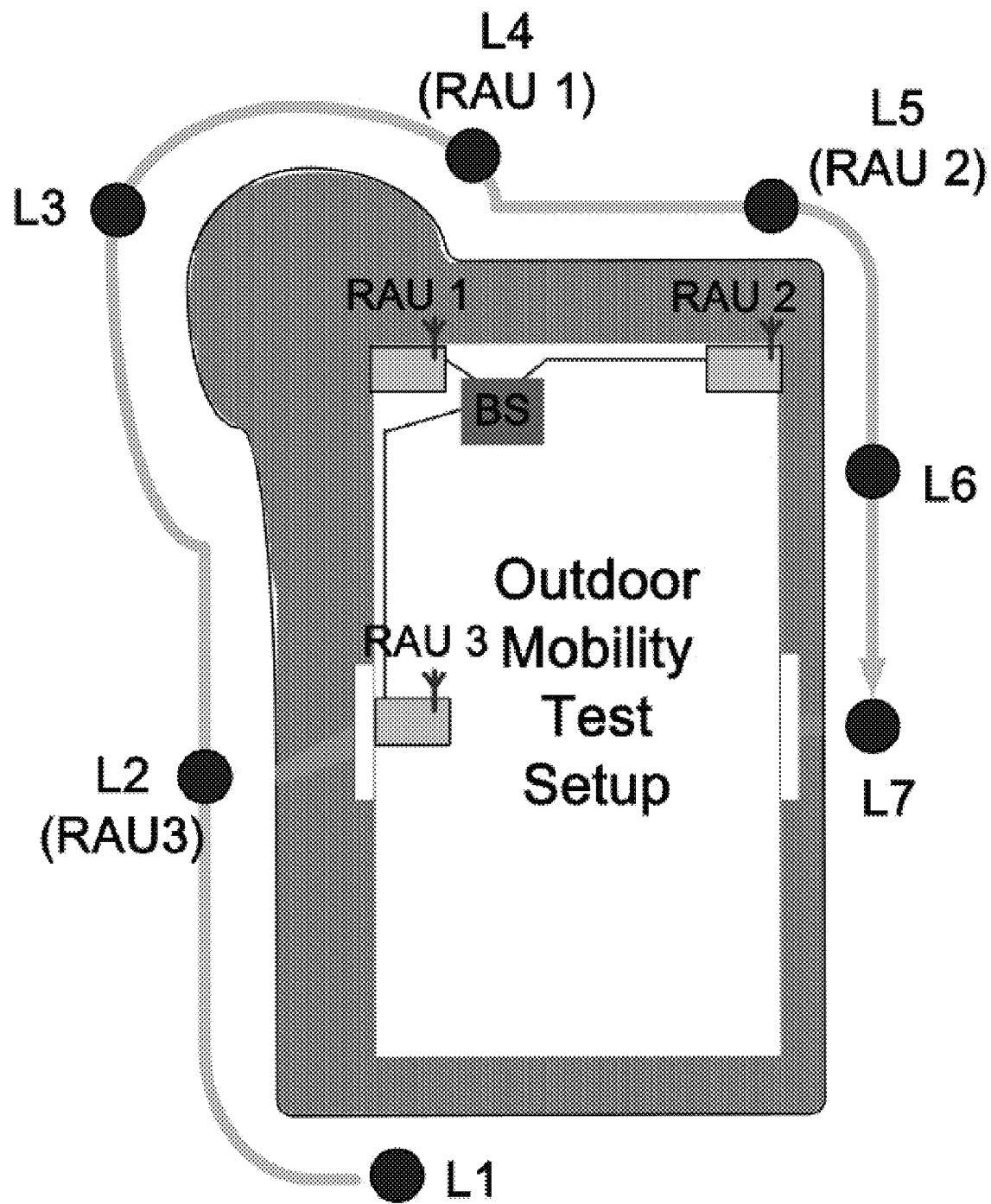
FIGS. 10(a) and 10(b) depict Outdoor Mobility.
Figure 10B:
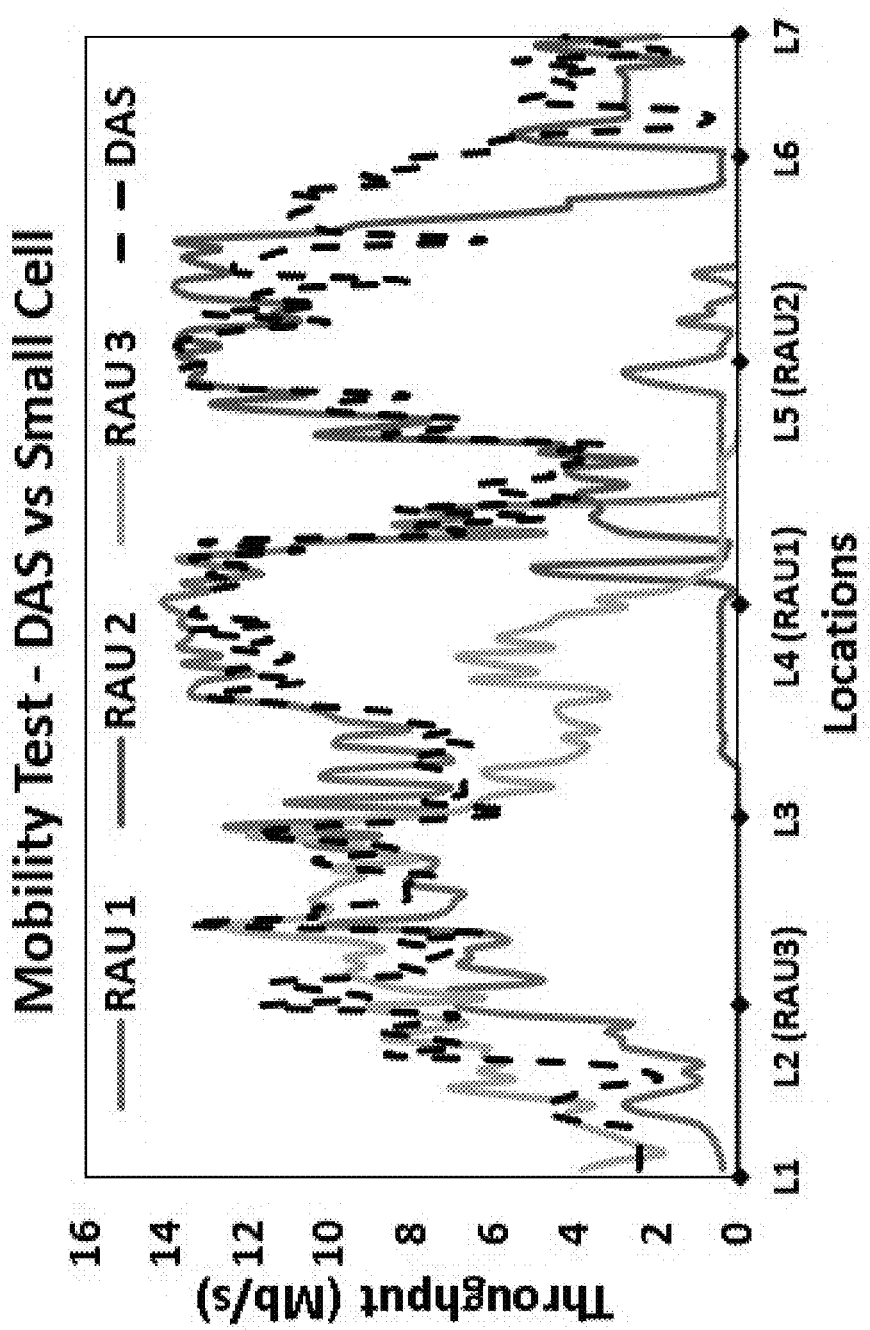

We also validate our findings by repeating the mobility experiment outdoors. The mobile user moves around the building along the pathway marked from L1 to L7 as shown in FIG. 10(a). The corresponding result is presented in FIG. 10(b), We notice that the outdoor environment is less stable than the in-building environment due to longer non line-of-sight transmission distance and stronger shadow fading from trees and obstacles. While the throughput performance of the DAS configuration is worse than its in-building performance, it still delivers the best of the coverage provided by the individual RAUs in the FFR mode.

Thus, our static and mobility experiments highlight the need for diverse backhaul configurations (one-one, one-many) to enable different wireless transmission strategies (FFR, DAS) that can cater to heterogeneous users (static, mobile) and traffic conditions effectively.

C. Reconfigurability Across Multiple Operators

Figure 9A:
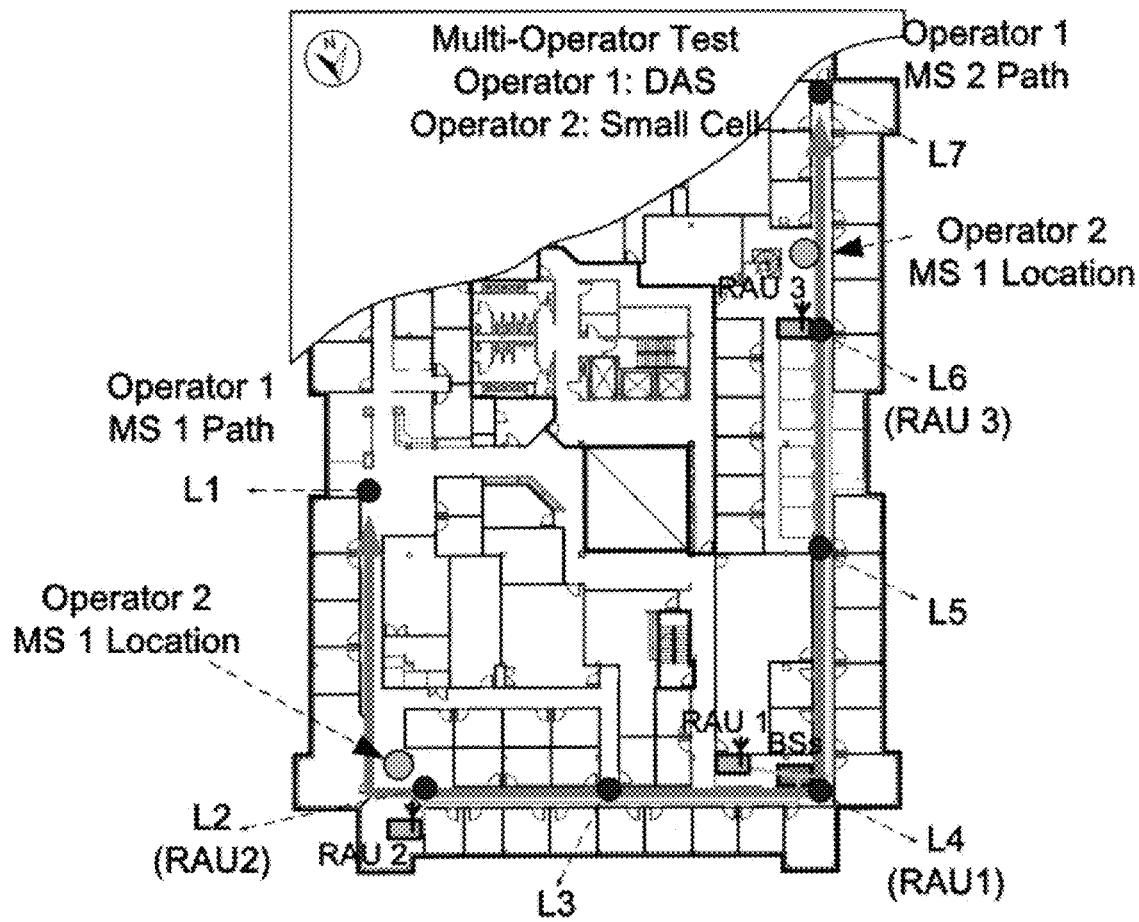
FIGS. 9(a) to 9(c) depict multi-operator Tests.

To demonstrate the capability of multi-operator co-existence with independent backhaul and RAU configurability, we conducted the following in-building two-operator test. The test setup is illustrated in FIG. 9(a). Operator 1 occupies 2.61 GHz with 10 MHz bandwidth and employs DAS configuration to serve its two mobile MSs with mobility paths from L1 to L7 and vice versa respectively. Operator 2, on the other hand, employs 2.59 GHz to serve its two static users near RAU 2 and 3 respectively (marked by yellow dots), using an FFR configuration to maximize capacity. Hence, at RAU 1, only one optical wavelength (1553 nm) carrying 2.61 GHz RF signal is received and converted to RF domain for operator 1's DAS configuration. However, at both RAU 2 and 3, two wavelengths carrying two different RF signals are received and recovered without any interference between them. One wavelength (1553 nm) carries RF at 2.61 GHz for the DAS mode of operator 1, while the other wavelength (1547 nm) carries RF of 2.59 GHz for the FFR mode of operator 2.

Figure 9B:
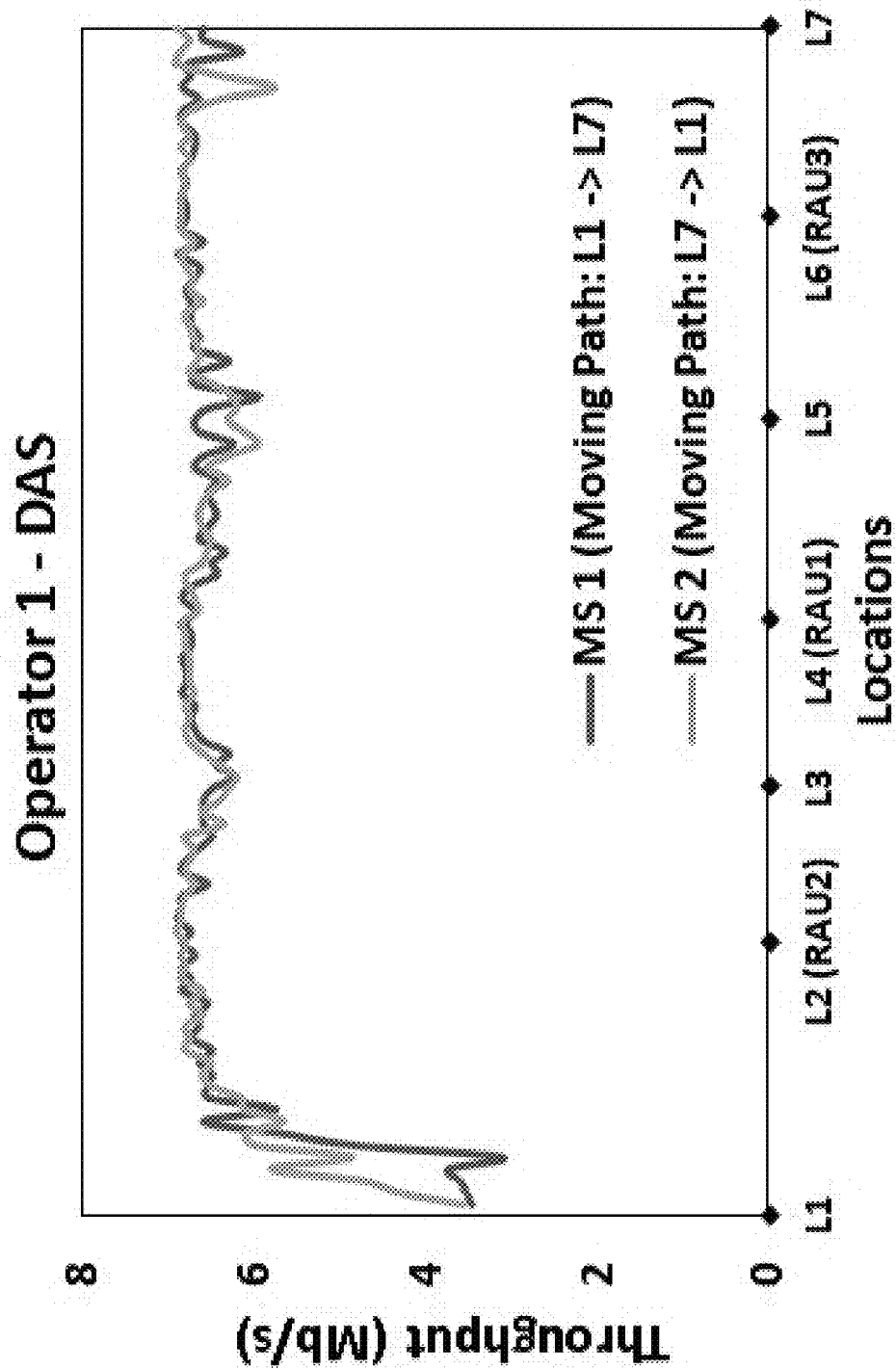
Figure 9C:
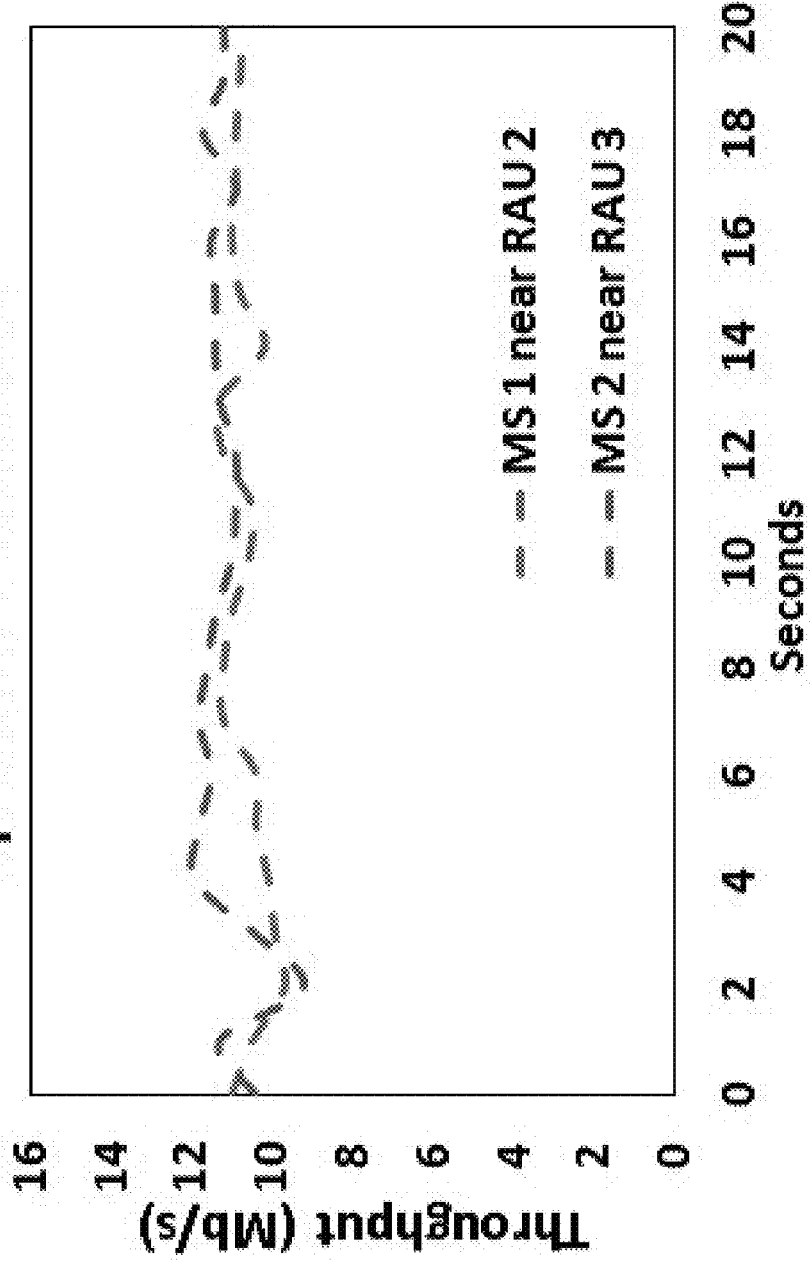

From the measured throughput in FIG. 9(b), we can see that the two mobile users experience very stable throughput from their DAS configuration, while moving from one end of the network to the other. Sharing of the 10 MHz bandwidth between the two MSs, reduces their individual absolute throughput. With FFR used by operator 2, since there is no interference between RAU 2 and 3, both the static MSs can reuse the whole 10 MHz bandwidth at 2.59 GHz, resulting in an increased individual and hence system throughput as shown in FIG. 9(c).

Thus, different operators can flexibly configure a shared network of RAUs to cater to different user and traffic profiles and hence optimize their system performance independently. Further, the sharing of distribution fibers and RAU among different operators does not induce any interference to their RF signals. This clearly demonstrates the feasibility and flexibility of multi-operator co-existence in FluidNet.

D. Reconfigurability within a Single Operator

Figure 11A:
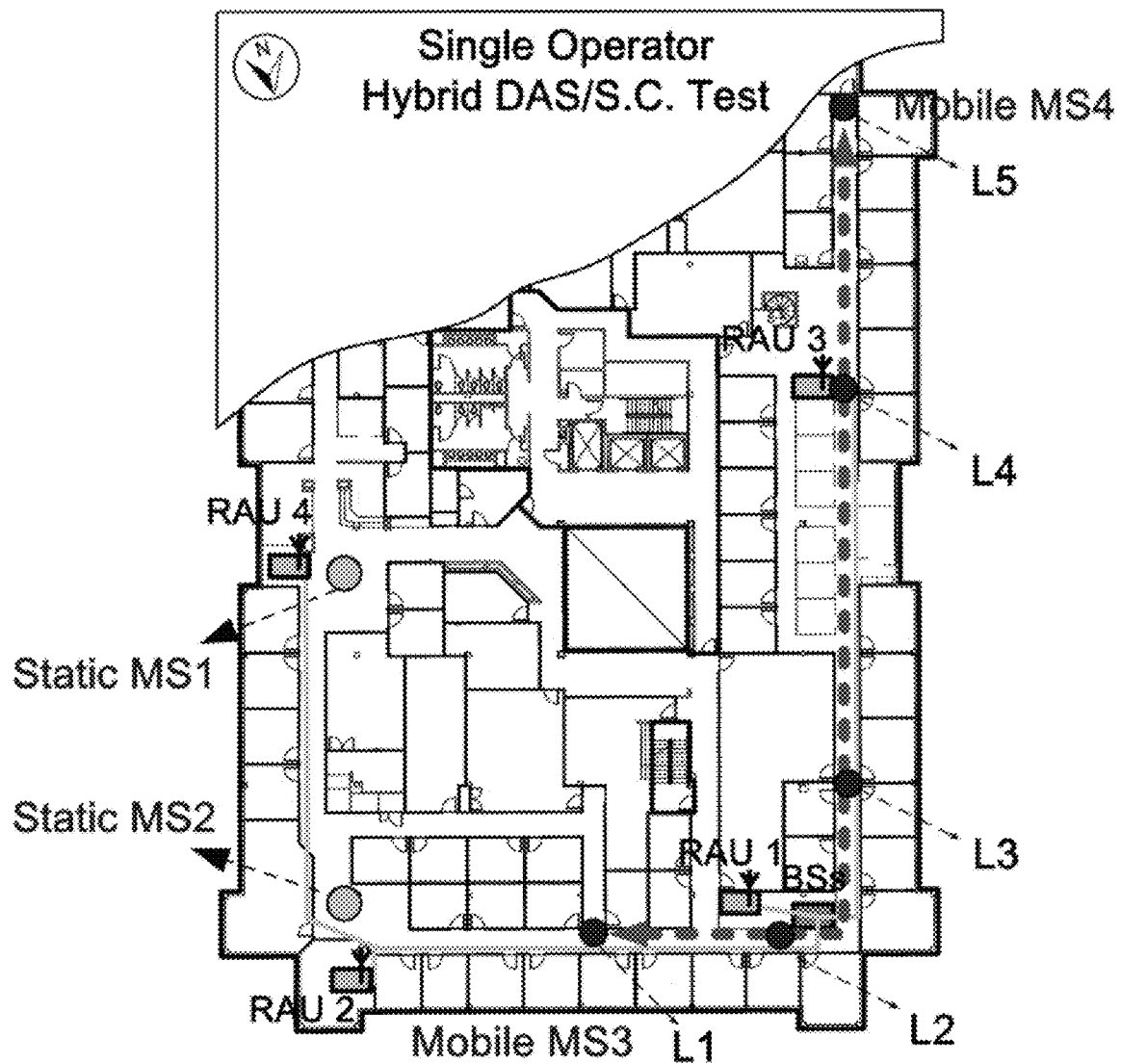
FIGS. 11(a) and 11(b) depict single operator set-up with heterogeneous users.

Even for a single operator, flexible configuration of backhaul and RAUs is essential to cater to varying concentration of user profiles in different regions of the network. To see this, consider the following 4 BBU, 4 RAU set-up as shown in FIG. 11(a). We have 4 MSs in the network, two of which are static near RAU4 and RAU2 respectively on one side of the network, while the other two are mobile, moving between RAU1 and RAU3 on the other side of the network.

Figure 11B:
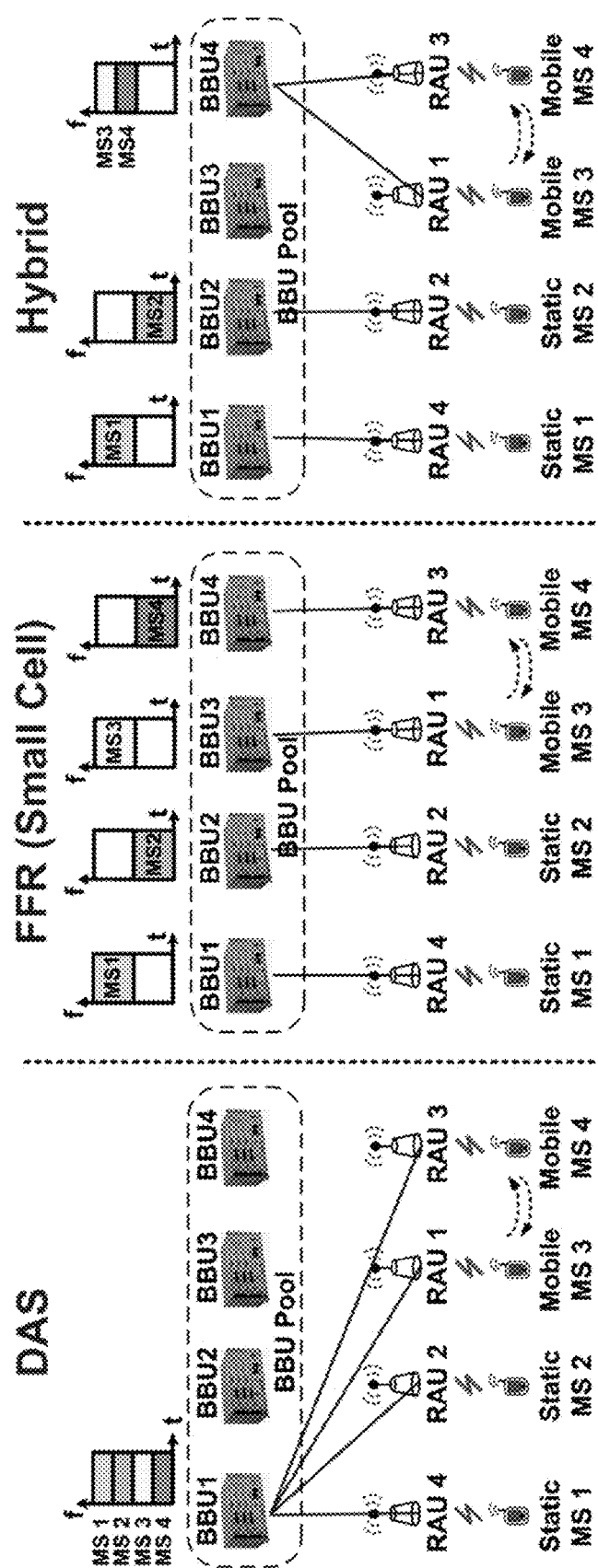
Figure 12A:
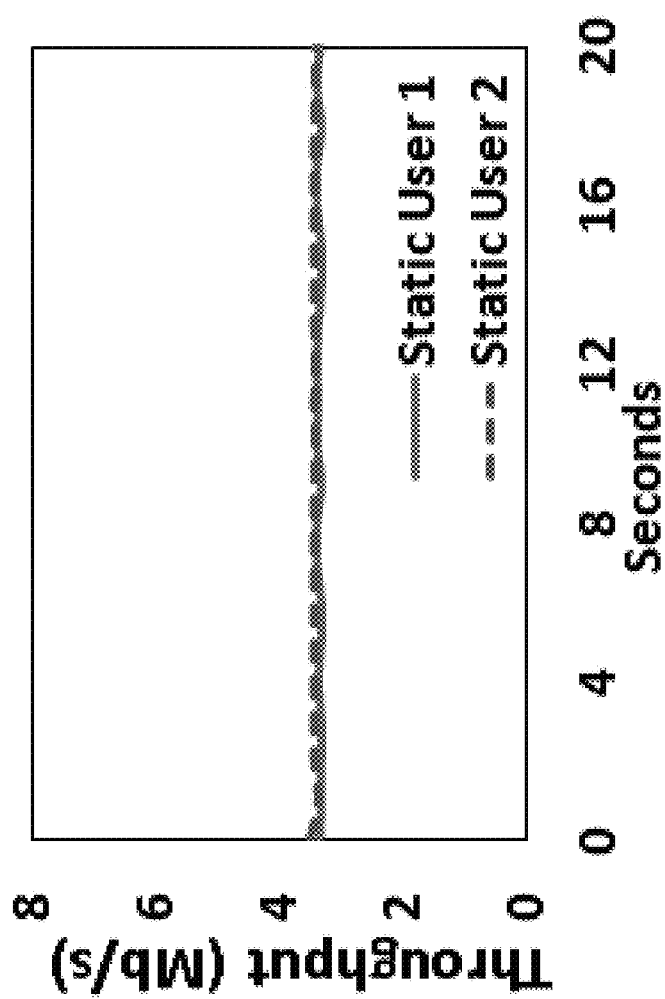
FIGS. 12(a) to 12(d) depict performance of fixed (DAS, FFR) configurations.
Figure 12B:
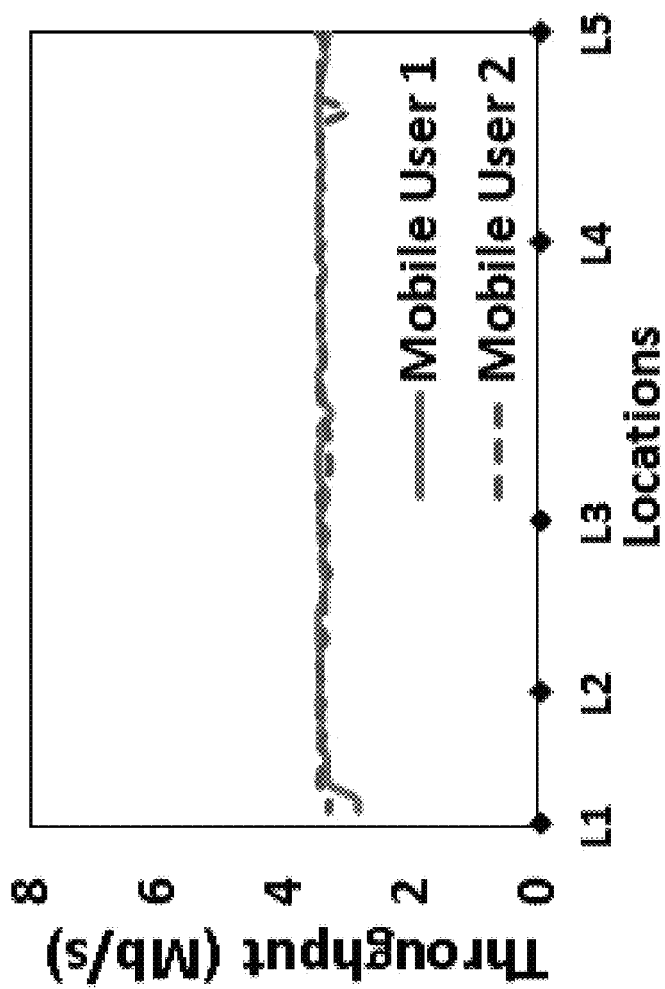
Figure 12C:
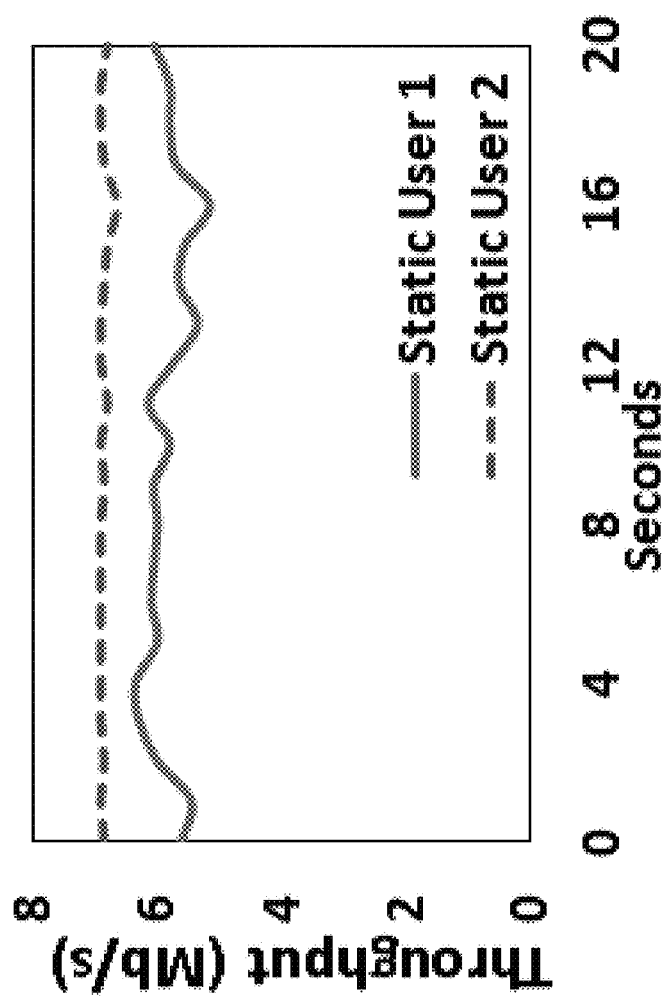
Figure 12D:
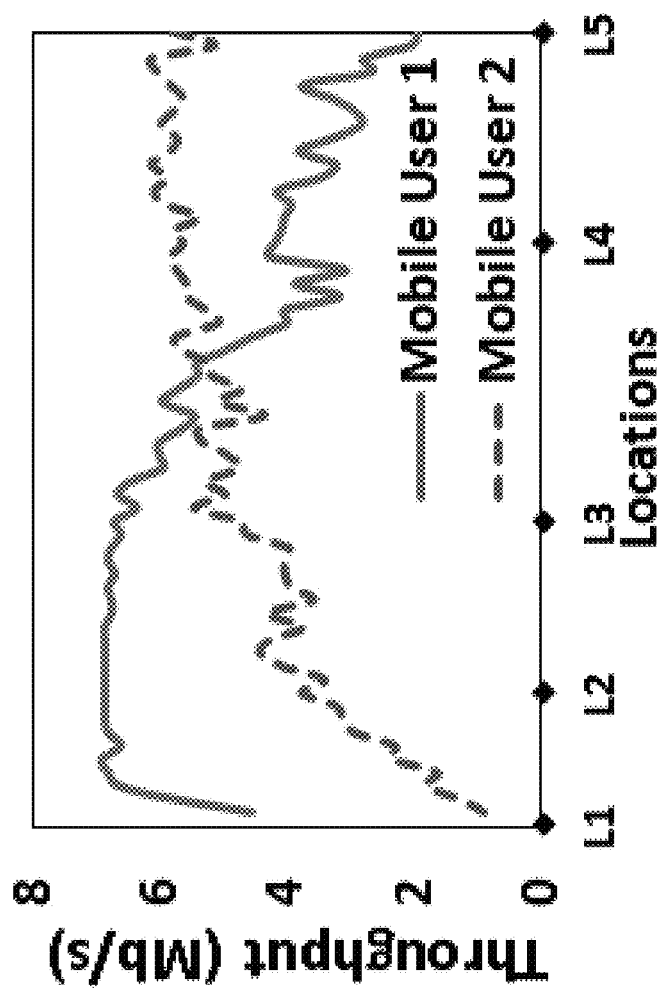

We consider three configurations: DAS, FFR, and Hybrid (DAS+FFR) as shown in FIG. 11(b). For DAS, the 10 MHz bandwidth at 2.61 GHz is used to serve all 4 MSs through a single BBU. For FFR, interference between adjacent RAUs, necessitates a frequency reuse factor of two. Hence, the total 10 MHz bandwidth is split into two 5 MHz blocks, where RAU4 and RAU1 reuse the same frequency band (3 MHz on 2.61 GHz), while RAU2 and RAU3 reuse the same frequency band (5 MHz on 2.59 GHz). With each RAU potentially serving a different MS, 4 BBUs are need to serve all the MSs in the FFR configuration. In the hybrid configuration, a frequency reuse factor of two is still used between RAU 4, RAU2, and RAU1/3 (as one unit). While RAUs 2 and 4 serve the two static MSs, a DAS configuration is used between RAU1 and RAU3 to serve the two mobile MSs, resulting in a net use of 3 BBUs.

Figure 13A:
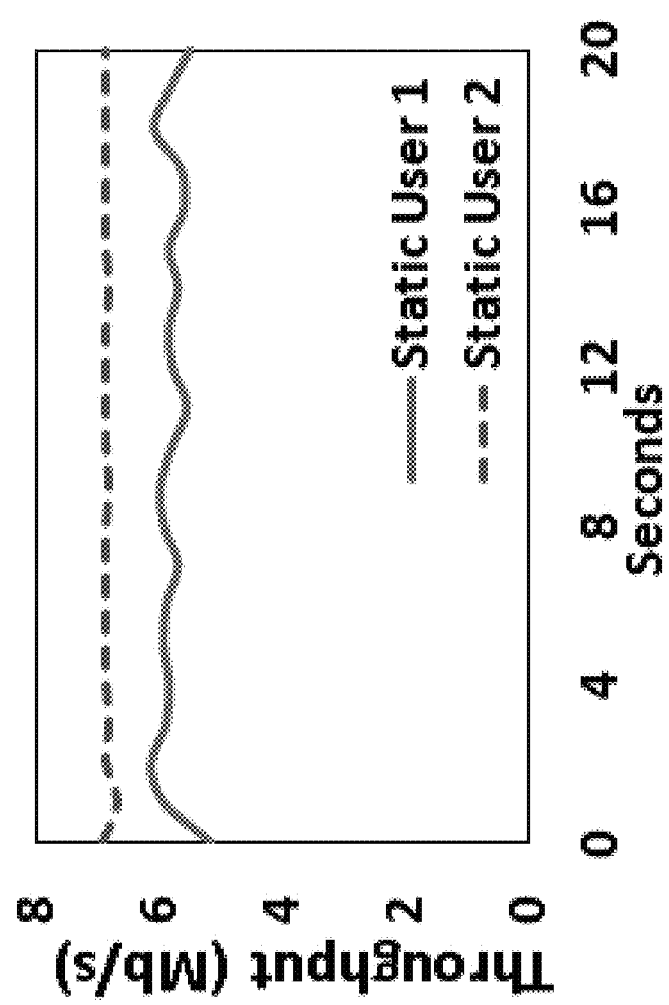
FIGS. 13(a) and 13(b) depict performance of hybrid (DAS+FFR) configurations.
Figure 13B:
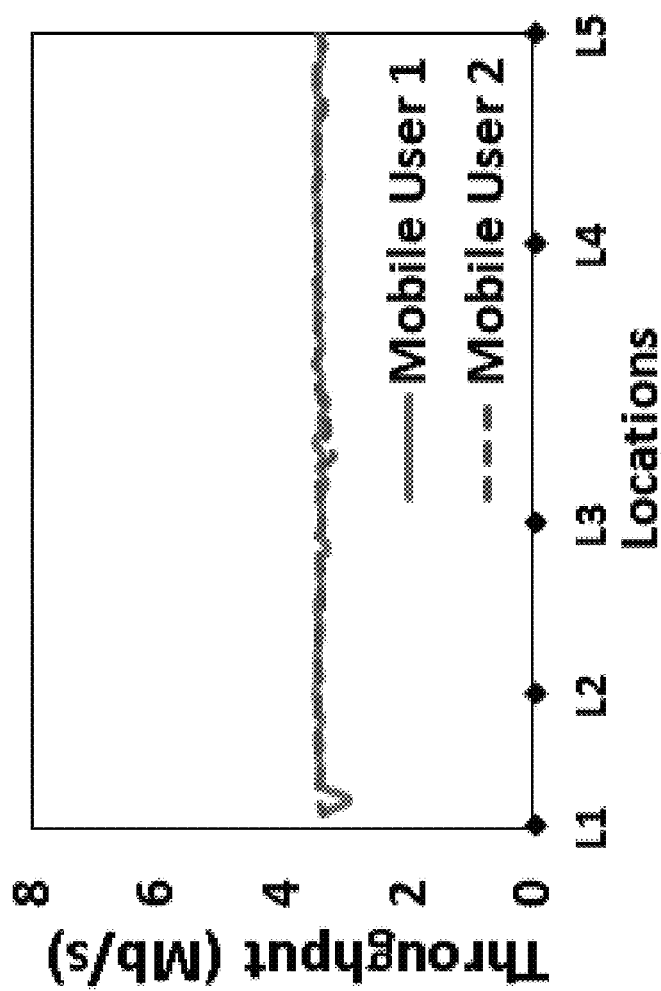

The resulting performance of static and mobile MSs in the different configurations is presented in FIGS. 12 and 13 respectively. Three inferences can be made:
(i) In DAS, both static and mobile MSs have similar throughput around 3.5 Mb/s (FIGS. 12(a),(b)). While there is no throughput degradation for the mobile MSs, the overall throughput of the system is around 14 Mb/s, with the static MSs missing out on reuse. However, the need for a single BBU provides large energy savings.
(ii) In FFR, static MSs have higher throughput around 6-7 Mb/s resulting from frequency reuse (FIGS. 12(c),(d)). However, the throughput of the two mobile MSs degrades significantly near the cell edge. Given the inherent inefficiencies of handoffs, coupled with their feasibility in small cells, such degradation is inevitable. Hence, depending on the impact of mobility (and handoffs), the aggregate system throughput can be anywhere between 14 Mb/s to 28 Mb/s, not to mention the signaling overhead and complexity associated with hand-offs. Further, all 4 BBUs are needed to serve the 4 MSs in FFR, resulting in no energy savings.
(iii) On the other hand, in the hybrid configuration (FIGS. 13(a),(b)), static MSs obtain a total throughput around 14 Mb/s, which is similar to that in the FFR mode. In addition, the mobile MSs do not observe any performance degradation when moving between cells, owing to the localized DAS configuration. Thus, the overall system throughput is around 21 Mb/s with no performance degradation for any of the MSs and is achieved with 3 BBUs. Catering effectively to static and mobile MSs with the right strategy allows the hybrid configuration to provide both performance gain (over FFR and DAS), and energy savings (over FFR).

Note that users being served through DAS can also be static but with low data rate requirements, corresponding to lightly loaded small cells. Further, such traffic density can vary from one network region to another depending on time of the day, where upon our hybrid configurations can be easily adapted to track the traffic dynamics. Thus, supporting re configurability in the backhaul is essential to generating hybrid backhaul overlays and hence striking a fine balance between performance gain and energy savings.

III. Conclusions

In this work, we have motivated the need for configurable backhaul overlays for C-RAN to effectively cater to heterogeneous user and traffic profiles, while also saving energy in the BBU pool. We presented the design of our re-configurable backhaul architecture called FluidNet, as well as its implementation using radio-over-fiber for a WiMAX-based C-RAN system. Using real-world experiments, we showcased the potential performance and energy benefits delivered by FluidNet.

Going forward, we intend to address two key aspects needed to realize a complete FluidNet system: (i) profiling users accurately in order to apply appropriate wireless strategies, and (ii) designing algorithms that employ user profile and traffic load information to dynamically determine the optimal backhaul overlay to maximize system performance.

The mapping of signals from baseband units to remote radio units in a C-RAN affects the transmission strategies on the RAN as well as the energy consumption in the baseband pool. Without proper mapping, the performance, cost and energy benefits of C-RAN are limited. Existing solutions employ a one-to-one mapping for signals from a baseband unit to a remote radiounit. This restricts the possible transmission strategies on the RAN and also the potential for energy savings in the BBU pool. We propose a system and method for adaptive re-configuration of the mapping of signals from baseband units to the remote radio units. The said method incorporates traffic load and user profile information from the network in determining the appropriate mapping. The desired signal mapping is logical and is realized on the front-haul network connecting the baseband units to the remote radio units. The proposed solution provides better performance by supporting more traffic demand both from static and mobile users in the network. It also reduces energy consumption in the baseband pool of the C-RAN system. Further, it incurs low complexity and provides worst case performance guarantees in its execution.

FluidNet determines the appropriate use of DAS and FFR strategies in different parts of the network of small cells to cater effectively to spatio-temporal traffic and heterogeneous user profiles. It realizes these varied strategies on the RAN through dynamic, logical configurations (mapping of BBU signals to RAUs) on the front-haul that are determined periodically based on feedback from the network. In the process, it also aims to minimize resource and energy consumption in the BBU pool. In determining the appropriate fronthaul configurations and hence strategies to apply in different parts of the network, FluidNet applies the following set of operations periodically at every epoch (say several tens of minutes).

Figure 32:
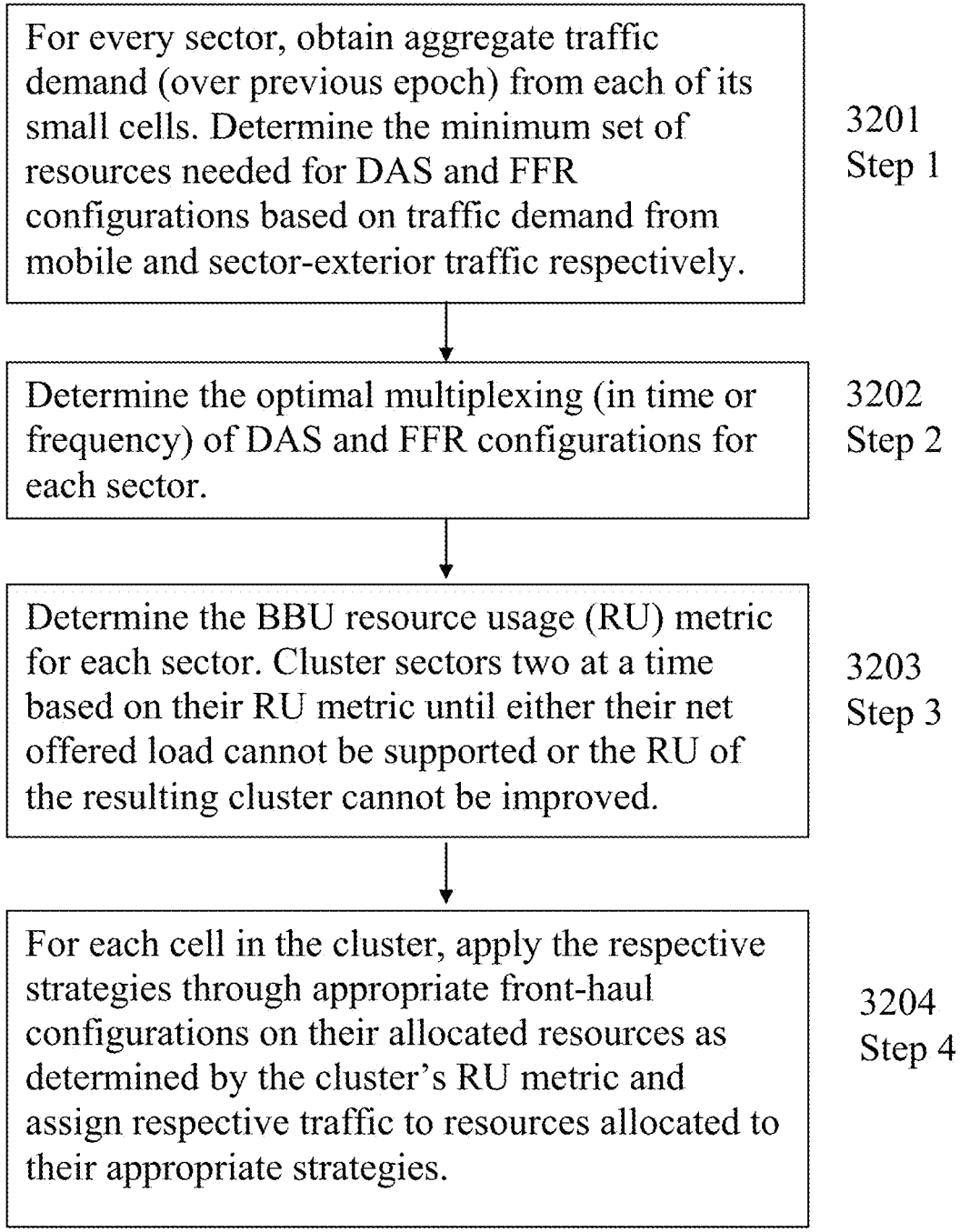
FIG. 32 depicts a set of operations that FluidNet applies periodically.

Referring to FIG. 32, each of the steps can be elaborated as follows:

Step 1a (block 3201): Each sector aggregates the radio resource (traffic) demands from mobile traffic in each of its small cells. The minimum radio resource demand needed for its DAS configuration is then the smallest number of OFDMA resources needed to satisfy the net mobile traffic demand.

Step 1b (block 3201): Similarly, to determine the minimum radio resource demand for FFR, it aggregates the cell-exterior traffic from all its small cells that are on the edge of the sector.

Step 2 (block 3202): Since users of multiple profiles may be inter-twined in a sector, FluidNet enables hybrid configurations that allow joint application of both DAS and FFR strategies to cater to all kinds of user and traffic profiles simultaneously. FluidNet multiplexes DAS and FFR strategies in each sector in either time and/or frequency resources and determines the optimal split of spectral resources between these two strategies for the hybrid configuration in each sector.

Step 2a (block 3202): Once the minimum radio resource demand are known for DAS and FFR, FluidNet then determines the minimum amount of additional spectral resources needed for FFR to satisfy the net traffic demands in each sector. This can be done in an iterative manner or using binary search in arriving at the optimal split of spectral resources between DAS and FFR in each sector.

Step 3a (block 3203): We define a metric called the BBU resource usage (RU) metric. This captures the effective number of BBUs needed to run and provide signals to DAS and FFR strategies in each sector. While a single BBU is sufficient for realizing a DAS configuration (since one-many signal mapping from BBU to RAUs in DAS), as many BBUs as the number of small cells in the sector is needed for a FFR configuration (one-one mapping in FFR). The RU is determined by, for example, the following formula:

$$RU(b_i, n_i) = b_i \cdot 1 + (B - b_i) \cdot n_i,$$

where $n_i$ is the number of small cells in sector i and $b_i$ is the number of spectral resources allocated to its DAS configuration, while B is the total number of available spectral resources.

Step 3b (block 3203): Based on the spectral resource split between DAS and FFR configurations in each sector, the RU metric is computed for each sector.

Step 3c (block 3203): FluidNet clusters sectors two at a time based on their RU metric until either their net offered load cannot be supported or the RU of the resulting cluster cannot be improved. Clustering helps improve the RU of configurations that are applied in the network.

Step 3d (block 3203): Clustering is done using a graph coarsening approach. All sectors within the same cluster will employ the resulting RU of the cluster in determining the use of spectral resources towards DAS and FFR in their respective sectors.

Further System Details

Cloud-based radio access networks (C-RAN) have been proposed as a cost-efficient way of deploying small cells. Unlike conventional RANs, a C-RAN decouples the baseband processing unit (BBU) from the remote radio head (RRH), allowing for centralized operation of BBUs and scalable deployment of light-weight RRHs as small cells. In this work, we argue that the intelligent configuration of the front-haul network between the BBUs and RRHs, is essential in delivering the performance and energy benefits to the RAN and the BBU pool, respectively.

We then propose FluidNet—a scalable, light-weight framework for realizing the full potential of C-RAN. FluidNet deploys a logically re-configurable front-haul to apply appropriate transmission strategies in different parts of the network and hence cater effectively to both heterogeneous user profiles and dynamic traffic load patterns. FluidNet's algorithms determine configurations that maximize the traffic demand satisfied on the RAN, while simultaneously optimizing the compute resource usage in the BBU pool. We prototype FluidNet on a 6 BBU, 6 RRH WiMAX C-RAN testbed. Prototype evaluations and large-scale simulations reveal that FluidNet's ability to re-configure its front-haul and tailor transmission strategies provides a 50% improvement in satisfying traffic demands, while reducing the compute resource usage in the BBU pool by 50% compared to baseline transmission schemes.

1. Introduction

Mobile network operators are facing the pressure to increase the capacity and coverage of their radio access networks to meet the exponential growth in data traffic demand. While leveraging the increased spatial reuse from smaller cells is a promising direction, every new cell adds to the capital and operational expenses borne by the operators. To address this problem, cloud-based radio access network (C-RAN) architectures have been considered by several operators and service providers as a cost-efficient way of realizing small cells. Unlike typical RANs where the baseband units (BBUs) and the radio units are situated together, the C-RAN concept (depicted in FIG. 14) migrates the BBUs to a datacenter (i.e., the BBU pool) hosting high performance general purpose and DSP processors, while providing high-bandwidth optical transport (called the front-haul) to the remote antennas called remote radio heads (RRHs). This decoupling allows for sophisticated centralized techniques for interference management, where the BBUs in the pool can seamlessly cooperate to improve the RAN capacity. In addition, the deployment of radio units is made light-weight and can be realized in a fast and scalable manner for small cells.

In this work, we argue that the front-haul that is unique to a C-RAN has a critical role in delivering its performance and cost benefits. We note that although the BBUs are decoupled from the RRHs in terms of physical placement, there exists a one-to-one logical mapping between BBUs and RRHs in that one BBU is assigned to generate (receive) a signal (e.g., LTE or WiMAX frame) to (from) an RRH (although the mapping can change over time). This one-to-one mapping allows for generating a distinct frame for each small cell (deployed in the form of a RRH), which is key for enhancing the network capacity via techniques such as dynamic fractional frequency reuse (dynamic FFR) or coordinated multi-point transmissions (e.g., LTE CoMP). We contend that this notion of a fixed, one-to-one mapping is not optimal in a practical cellular network deployment for two reasons.

RAN Performance: First, these techniques primarily apply to static users. The mobile users will have to bear frequent handoffs (exacerbated by smaller cells) and the associated performance penalties. In addition, tracking a mobile user's location and channel may be difficult for such techniques. In fact for mobile clients, a traditional distributed antenna system (DAS) is arguably better suited. In a DAS setting, the same signal (carrying the user's data) is transmitted simultaneously by multiple small cells to provide coverage benefits (which in turn reduces handoffs) and diversity gain. DAS can be realized by changing the one-to-one to a one-to-many logical mapping in the C-RAN front-haul.

BBU Energy Consumption: Second, the one-to-one mapping requires several BBUs to be active and generating frames, which consumes energy in the BBU pool. However, the enhanced capacity of techniques such as may not be needed in all parts of the network or at all times (e.g., 50% of cells carry 5% of net traffic). When the traffic load is low in a region (e.g., coverage area of multiple small cell RRHs), a single BBU may suffice to serve the offered load (via a DAS mapping). This in turn reduces the number of BBUs and hence the compute resources (e.g., CPU cores, DSPs), thereby allowing energy savings in the BBU pool.

Given the above observations, we envision a C-RAN architecture with a novel, flexible front-haul that supports one-to-one as well as one-to-many logical mappings between BBUs and RRHs. Our vision is to utilize this architecture to address the traffic needs of users (static and mobile) while leveraging the energy savings made possible by the traffic load heterogeneity (i.e., temporal and spatial load variations in the network).

Towards realizing this vision, we present FluidNet—a flexible C-RAN system for small cells that houses an intelligent controller in the BBU pool, which dynamically re-configures the front-haul (at coarse time scales) based on network feedback to cater effectively to both heterogeneous user and traffic profiles. This allows FluidNet to maximize the amount of traffic demand satisfied on the RAN for both static and mobile users, while at the same time optimizing the compute resource usage in the BBU pool. Briefly, FluidNet adopts a two-step, scalable approach: based on spatial traffic distribution and demand from users, FluidNet first determines the optimal combination of configurations (one-to-one and one-to-many, i.e., DAS and FFR strategies) needed to support the traffic demand from a set (termed sector) of small cells. Then, it employs a novel and efficient algorithm (with an approximation factor of $3/2$) to consolidate (cluster) the configurations of multiple sectors in the network to further reduce the compute resource usage without compromising on the traffic demand satisfied. FluidNet is both standards and technology agnostic. It allows for desirable features such as co-existence of multiple mobile operators and technologies (LTE, WiMAX, WiFi) in the same C-RAN, while employing different front-haul configurations tailored to each of their respective traffic.

We prototype FluidNet on a small-scale WiMAX C-RAN testbed with 6 BBUs and 6 RRHs, employing radio-over-fiber (RoF) as the front-haul. With FluidNet's algorithms, the logical BBU-RRH configurations are determined and executed on the fly. Real-world experiments with COTS WiMAX clients show that featuring flexible front-haul configurations and hence strategies, allows FluidNet to provide a 50% improvement in traffic demand satisfaction, while also reducing the compute resource usage in the BBU pool by 50% compared to baseline DAS and FFR strategies. Complementary, standards-calibrated (3GPP) simulations for large networks show that the clustering component in FluidNet helps further reduce the compute resource usage by 50% during low traffic load periods. Our contributions are as follows:

We propose FluidNet—a light-weight, scalable framework to determine the optimal use of strategies (DAS, FFR) to cater to dynamic user and traffic profiles, while realizing them through appropriate configurations that help minimize compute resource usage in the BBU pool.

We design efficient algorithms with performance guarantees in determining the appropriate configurations.

We build a small-scale C-RAN system with 6 BBUs-RRHs; prototype FluidNet on it; and conduct over-the-air experiments, complemented by standards-calibrated large-scale simulations to demonstrate its feasibility and benefits.

2. Background 2.1 C-RAN Primer and Related Work

Figure 14:
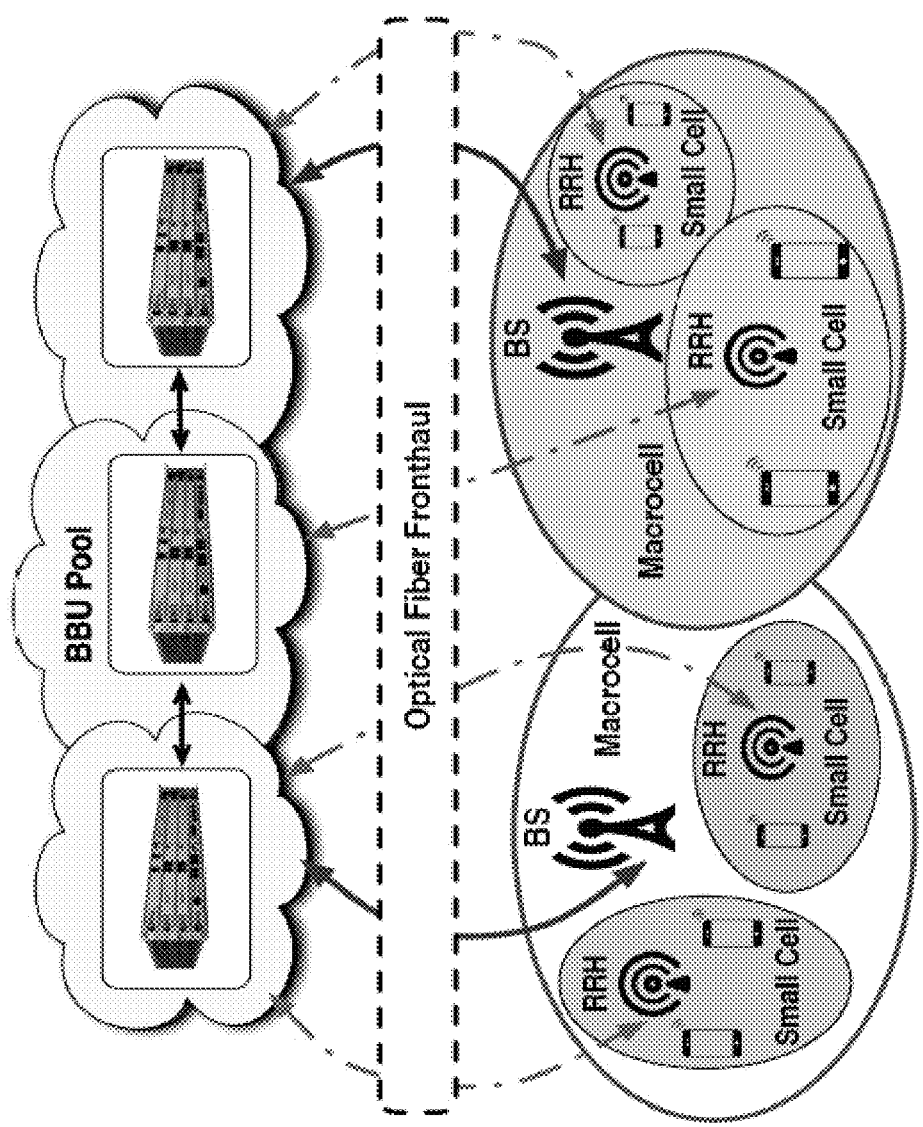
FIG. 14 depicts a C-RAN architecture.

The C-RAN architecture, depicted in FIG. 14, includes three components: (i) remote radio heads (RRH), (ii) pool of baseband units (BBUs), and (iii) the front-haul (optical fiber based transport network).

RRHs: These are simple, light-weight radio units with antennas. Several proposals have focused on making RRHs power-efficient and scalable to support multiple bands and technologies (e.g., 3G, 4G).

BBU Pool: This helps migrate bulk of the base station (BS) processing of a large set of cells to a datacenter, allowing for easier realization of interference (e.g., CoMP, HetNet) and mobility management solutions.

On the energy front have looked at the bene?ts of switching off entire macrocell BSs based on prevailing traffic conditions. Moving the processing to a central entity in C-RAN allows for fine-grained use of resources in the pool and hence better energy savings (evaluated in Section 7). Further, these savings can be obtained without having to switch off an entire BS (allowing RRHs to be ON) and hence sacrificing performance or coverage.

For the BBU pool, there are several proposals for the use of heterogeneous platforms consisting of general-purpose processors as well as DSPs for compute-intensive baseband functions. Recently, [1] focused on assigning processor cores in a homogeneous platform to different BBUs in the pool, to meet latency requirements. Being complementary to [1], we focus on optimizing the use of BBUs themselves, which has an impact not only on compute resource usage in the BBU pool (especially in a heterogeneous platform) but also on RAN performance.

Front-Haul: Optical fiber with wavelength multiplexing serves as the front-haul and distributes signals from the BBU pool to the RRHs either as (i) digitized radio signals over CPRI (common public radio interface), or (ii) analog radio signals via radio-over-fiber (RoF). While CPRI is more robust than RoF over long distances, it requires more transport bandwidth. Optical front-haul is already used in several DAS deployments. Recently, articulated the need for a re-configurable front-haul in a C-RAN, but did not off}400er a solution. Our focus is to design and build a dynamically re-configurable front-haul along with the intelligence to adaptively determine the appropriate configurations.

2.2 Overview of Strategies

Fractional Frequency Reuse (FFR): FFR is the mechanism for radio resource management (RRM) in cellular networks, whereby inter-cell interference is addressed. Unlike WiFi, the synchronous operation of downlink (BS-MS) and uplink (MS-BS) transmissions across cells requires transmissions to be intelligently scheduled to manage interference. In the popular 1-3 FFR scheme for macrocell networks, the spectrum is divided into four fixed-size bands. One band is used by all the cell-interior clients (in each cell), who do not see interference due to the close proximity to their BS, while the other three bands are used (by cell-exterior clients) in an orthogonal manner between the three sectors (FIG. 15) of a ceil to mitigate interference with sector of adjacent cells. Thus, while the band used by cell-interior clients is reused in each cell, the reuse of the other three bands are subject to the spatial reuse possible. Recently, dynamic FFR approaches have been proposed specifically for small cells, and determine the number and size of bands to be used by each small cell only based on the aggregate traffic demand from its cell-interior and cell-exterior clients; they allow for better spectral utilization and do not rely on planned sectorization (unlike macrocells). Note that the FFR schemes only determine the set of spectral resources assigned to cells—scheduling of clients within those resources is done by each cell locally (based on per-client feedback) to leverage multi-user diversity.

We adopt an FFR in FluidNet, although other FFR schemes can also be easily used. While point-to-point MIMO is automatically incorporated in FFR, other cooperative techniques such as multi-user MIMO and co-ordinated multi-point transmissions (CoMP) can also be applied under FFR.

Distributed Antenna Systems (DAS): In DAS, a common signal from a single source is delivered to multiple RRHs and transmitted simultaneously. This provides larger coverage and has been adopted by operators for both indoors and outdoors. Unlike FFR that is focused on capacity, increasing the foot-print of the signal across multiple transmit points (small cells) under-utilizes the spectrum in DAS without scope for any spectral reuse.

Relation Between Strategies and Configurations: Since interfering cells will be operating on potentially different spectral bands in FFR, different frames (with specific preamble, control, etc.) have to be generated for each cell, thereby requiring a one-to-one logical mapping (configuration) between a BBU and an RRH. This is the conventional mapping considered in C-RAN currently. However, in DAS, a single frame is transmitted by multiple RRHs, which in turn can be accomplished using a single BBU, thereby requiring a one-to-many mapping.

3. Motivation and Model
3.1 Motivation for a Reconfigurable Front-Haul

Figure 16:
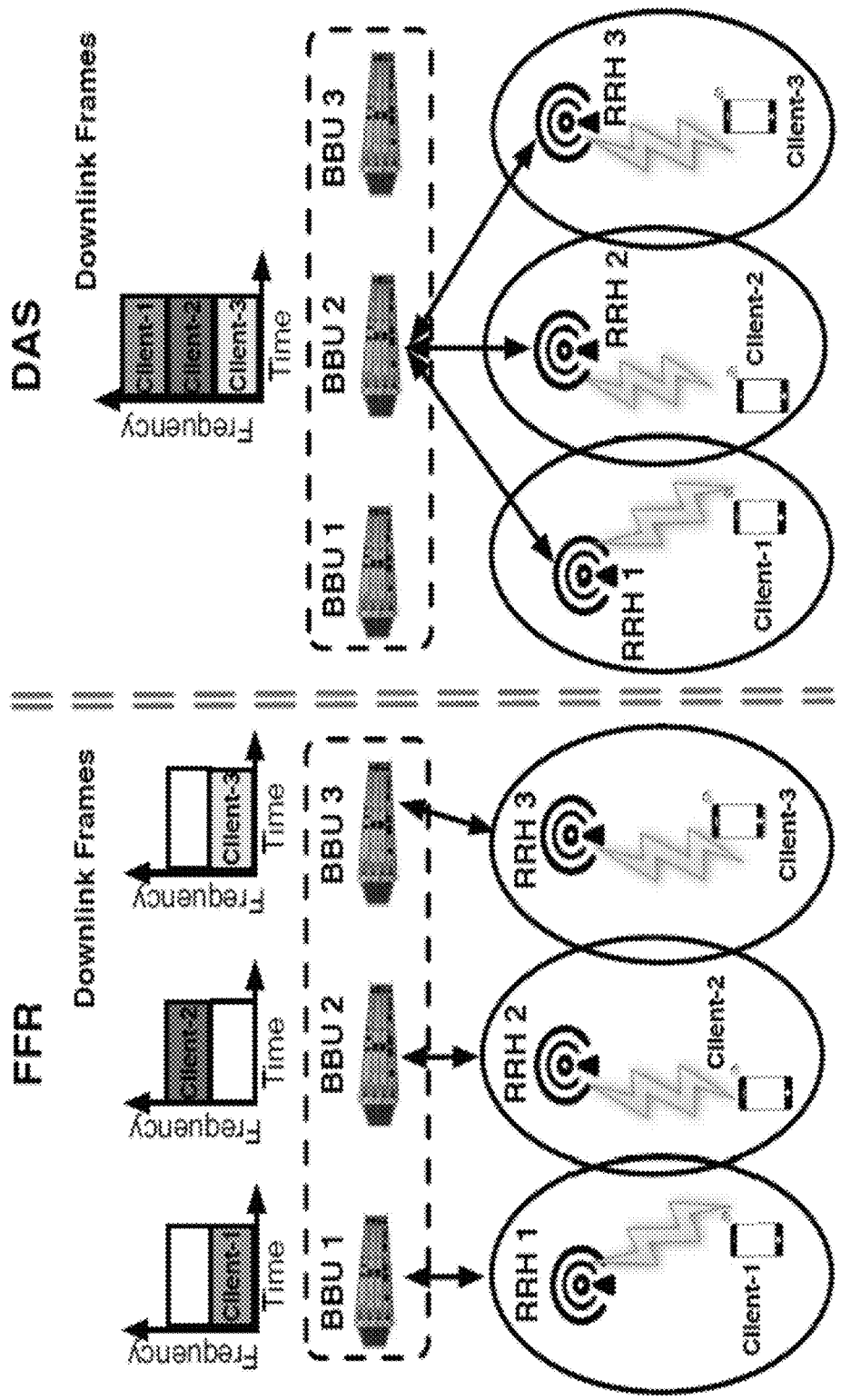
FIG. 16 depicts 3 BBU-RRH setup for DAS vs FFR.

With the help of a simple experiment conducted on a WiMAX C-RAN testbed (details in Section 6), we now motivate why a one-to-one signal mapping between BBUs and RRHs is highly sub-optimal. Consider a system with 3 BBUs and 3 RRHs, serving three clients as shown in FIG. 16, where each RRH interferes with its neighbor™s client.

Figure 17A:
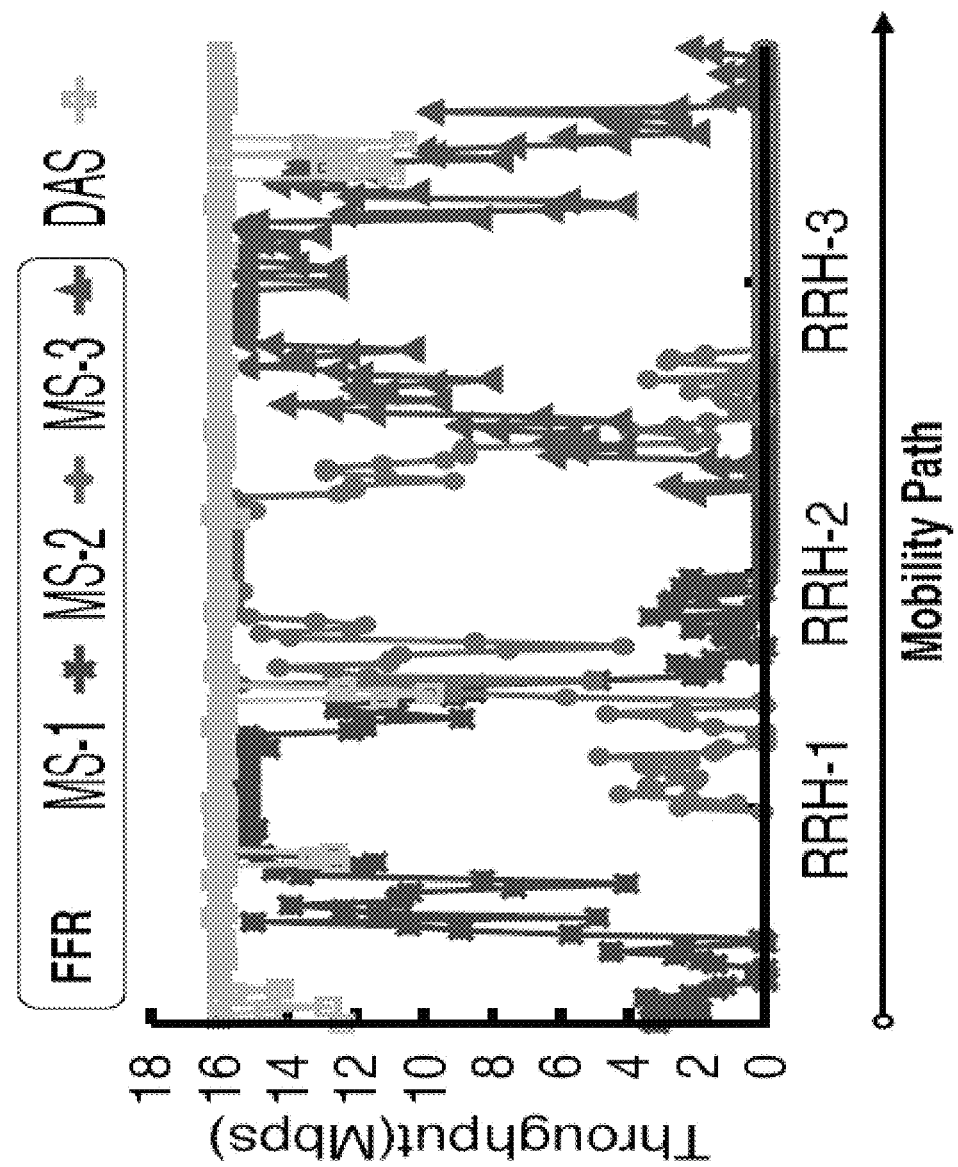
FIG. 17 depicts (a) an effect of mobility and (b) an effect of traffic load.
Figure 17B:
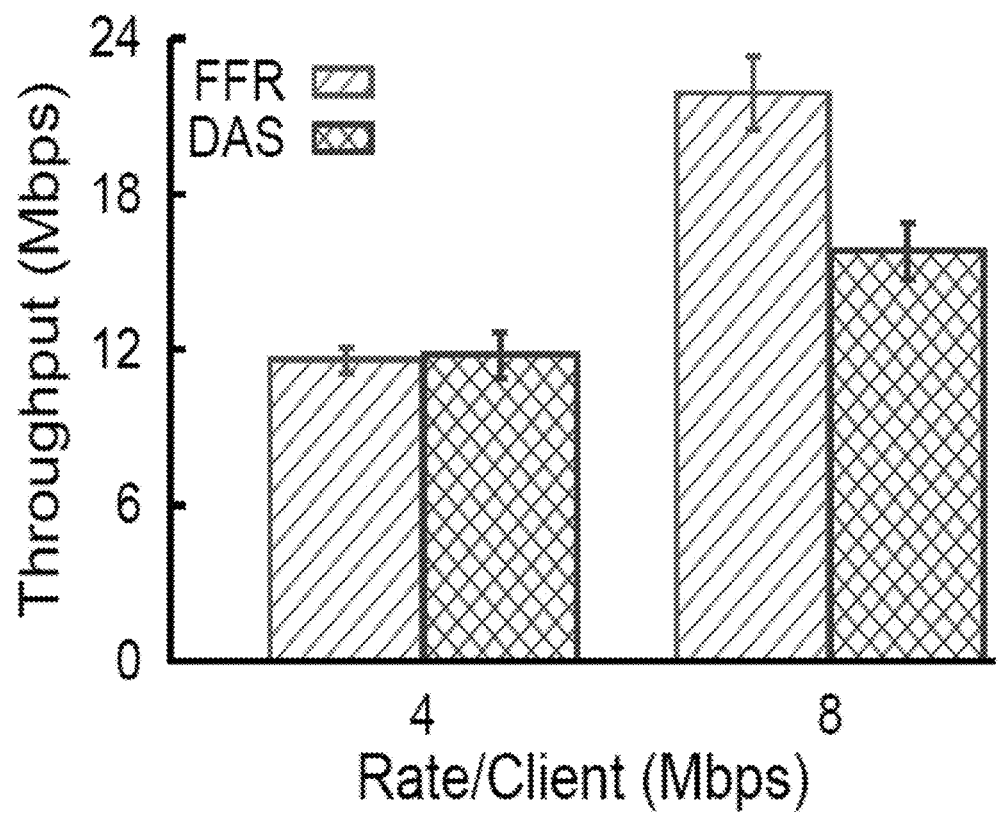

1) Traffic Heterogeneity: Consider a scenario, where the clients are static, but their data rate varies (see FIG. 17(b)). When the total rate (e.g., 8 Mbps per client=24 Mbps) exceeds the max. data rate supported by all the sub-channels in one frame ($\approx$16 Mbps in our testbed), the increased capacity with FFR (by reusing orthogonal half of sub-channels as in FIG. 16) is essential to meet the tra c demand, while DAS is limited to one frame™s capacity of 16 Mbps. On the other hand, at low load (e.g., 4 Mbps per client), DAS's capacity is sufficient to serve the clients with just one BBU, allowing the other two BBUs to be off. This is unlike in FFR, where all the BBUs have to be active to generate different frames to the RRHs; it lowers compute resource usage and thus enables significant energy savings in the BBU pool.

2) User Heterogeneity: Now, let all the three clients be mobile, moving between the 3 RRHs. Catering to the mobile clients through dynamic FFR. from individual RRHs is very challenging for multiple reasons—(a) with small cells, there are frequent handoffs, whose associated latency has an adverse impact on throughput, (b) there is increased signaling load on the front-haul and the mobile core network due to frequent handoffs, (c) it may be hard to track the mobile user to specific small cells to efficiently apply dynamic FFR and leverage reuse. Even notwithstanding such drawbacks and assuming ideal hando s for FFR, FIG. 17(a) clearly shows DAS™ ability to deliver consistent coverage and performance for mobile users. Note that while relegating the mobile user to the macrocell is one option, DAS is ideal for such mobile users, since it achieves a coverage similar to a macrocell, while also increasing the link capacity (through shorter links and diversity gain, see FIG. 16).

Thus, while dynamic FFR is best suited for static users in high traffic load conditions, employing DAS also has benefits both from RAN performance (for mobile traffic) as well as BBU resource usage (for low traffic) perspectives. Given this, it is imperative for the front-haul to be re-configurable to realize flexible combinations of one-to-one and one-to-many BBU-RRH mappings.

3.2 Problem Definition
3.2.1 Network Model

Figure 15:
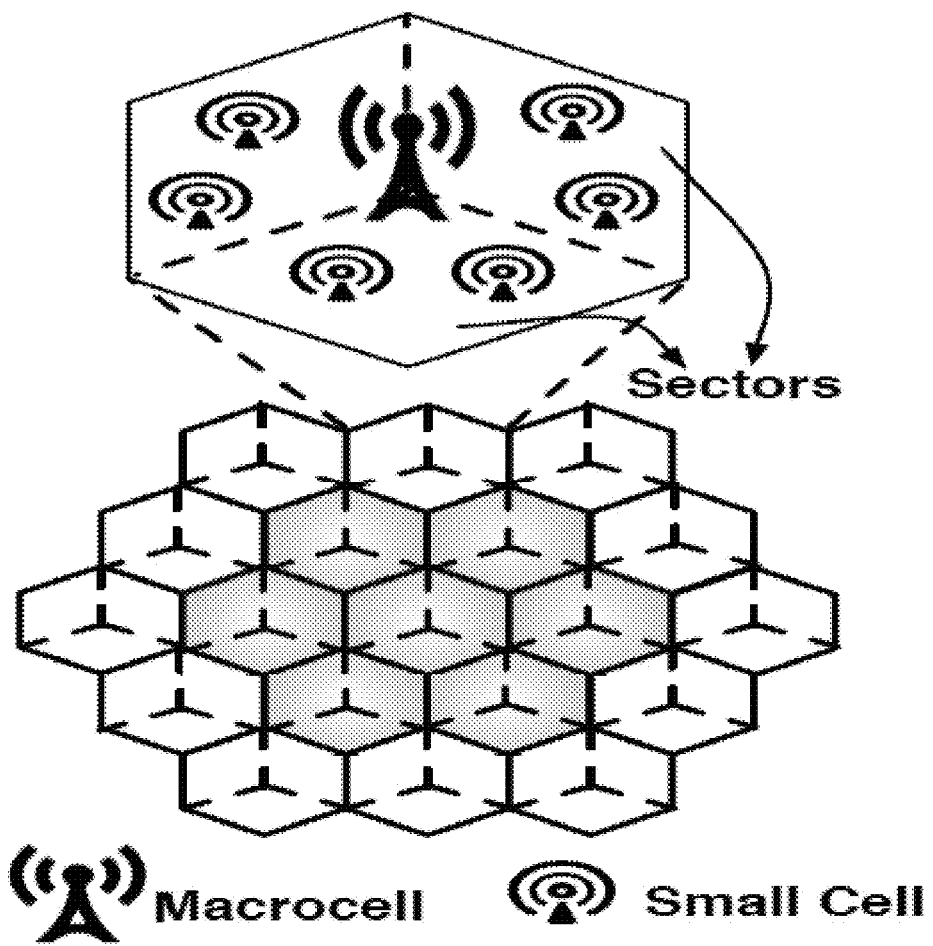
FIG. 15 depicts network deployment.

Given that small cells have to co-exist with macrocells, we consider a large number of small cells to be deployed as an under-lay to an operator's macrocell network (FIG. 15). Since a macrocell will interfere with the small cells, thereby limiting their spatial reuse ability, two kinds of RRM solutions have been considered in literature: (i) macrocells and small cells operate on different carrier frequencies, and (ii) both use the same frequency but orthogonalize their radio resources at coarse time scales. We consider the former model and focus entirely on the downlink operation of small cells for ease of exposition. However, our solutions are equally applicable to the latter model and to uplink as well. Further, while small cells themselves could be deployed in an un-planned manner, we leverage the over-lay of macrocells and borrow the notion of logical sectors (from macrocells) to refer to the location of small cells.

3.2.2 Objective

Recall from Section 3.1 that while FFR (one-to-one configuration) supports the maximum amount of traffic through reuse, it does not save on computing resources in the BBU pool. On the other hand, while DAS (one-to-many configuration) minimizes the resource usage and caters to mobile traffic, it under-utilizes the spectrum. By appropriately employing FFR and DAS in combination in different parts of the network, FluidNet's goal is to strike a fine balance between them. Specifically, subject to the primary requirement of supporting as much traffic (D) as the optimal configuration ($D_{OPT}$), FluidNet strives to minimize the corresponding amount of compute resources needed in the BBU pool (resource usage RU, defined in Sec. 4) for the purpose.

$$\min_{\Gamma} RU_{\Gamma}, \text{ subject to } D \geq \lambda \cdot D_{OPT} \quad (1)$$

where $\Gamma$ represents a possible configuration, and $\lambda$ is the fraction of (optimum) traffic demand that must be satisfied (e.g., $\lambda$=0.99). The optimal configuration would depend on the relative composition of mobile and static traffic and their priorities ($D_{OPT}$=$D_{FFR}$ when there is only static traffic demand). We assume mobile traffic to be prioritized over static traffic, albeit other models are also possible. Also note that minimization of compute resource consumption is only subject to satisfying as much of the traffic demand as possible and does not come at the expense of the latter.

BBU Usage as a Resource Metric: The main components of energy consumption in a traditional base station (BS) are those of air conditioning ($\approx$2 KW) and the BS equipment itself ($\approx$0.7 KW). A C-RAN system helps towards both these components by not only simplifying the cell site to a RRH (eliminating the need for air conditioning), but also consolidating the BS processing in the BBU pool. With respect to the latter component, reducing the number of BBU units and hence the frames that need to be processed, has a direct impact on energy consumption for two reasons. (1) BBU processing involves layer 1 (framing, FFT/IFFT, decoding, etc.), layer 2 (HARQ, resource/QoS scheduling, etc.) and layer 3 (connection management) functions. While layer 3 and part of layer 2 can be handled by generic processors, some of the time-sensitive layer 2 (resource scheduling) and layer 1 (framing, FFT/IFFT, decoding) functions are typically handled by dedicated DSPs for each BBU. (2) When DAS is employed, the traffic demand of multiple cells is handled without any spectral reuse. Hence, while the (traffic) load-dependent processing component is limited to that needed to handle the total number of slots (e.g., resource blocks in LTE) in a single frame, the basic processing component (FFT/IFFT) scales with the number of cells (frames) and soon dominates the former (see [1] for realistic values). Note that optimizing the BBU usage is complementary to assigning compute resources (e.g., GPPs) to the BBUs themselves, for which solutions such as [1] can be leveraged.

4. Design Elements in FluidNet

We motivate FluidNet's design by addressing key aspects relevant to the operation of transmission strategies and its impact on the compute resource usage in the BBU pool.

4.1 Granularity and Choice of Configurations

A strategy (configuration) is applied to a set of small cells. In macrocells, each sector has its own cell ID and is the smallest granularity for RRM operations. Given this, FluidNet adopts sector (referring to set of small cells located within the logical sector) to be the minimum granularity for configurations.

Depending on the user and traffic profiles in a sector, one has to determine the appropriate transmission strategy: DAS or FFR. However, picking either DAS or FFR in isolation often results in in-sufficient or spare spectral resources respectively, in handling the offered traffic load. Hence, FluidNet employs a flexible combination of DAS and FFR (called hybrid configurations) in each sector. It devotes the right fraction of spectral resources between the two configurations, thereby supporting the offered traffic load with the least possible use of BBU resources.

4.2 Realization of Hybrid Configurations

Figure 18:
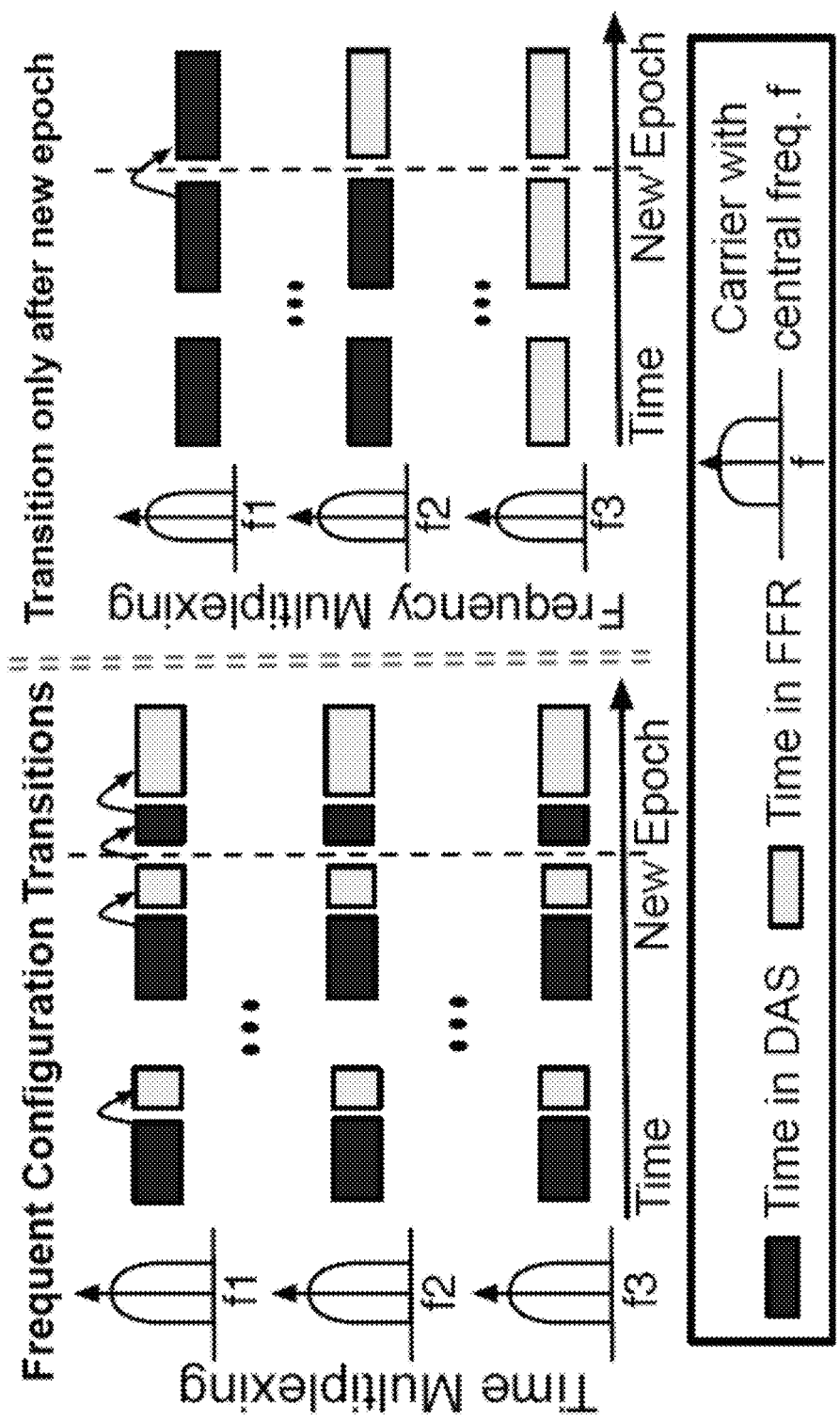
FIG. 18 depicts realization of hybrid configurations.

Since two configurations cannot co-exist in the same time-frequency resource, hybrid configurations have to be multiplexed either in time or frequency. If multiplexed in time, a hybrid configuration can be realized at the granularity of an epoch spanning several super-frames (10 ms each in LTE), where a contiguous subset of the sub-frames (1 ms each) operate in a DAS configuration, while the rest operate in FFR. If multiplexed in frequency, the operator's spectrum can be divided into coarse spectral blocks (separate carriers in a multi-carrier scenario such as LTE-advanced; e.g., similar to orthogonal channels in WiFi), which are then split between the two configurations (see FIG. 18). The fraction of carriers allocated to the configurations is such that the traffic load is satisfied with the least possible use of BBU resources. Since a DAS configuration minimizes the use of BBU resources but supports the least amount of traffic, this is equivalent to finding the largest allocation to the DAS configuration that is capable of sustaining the offered load.

Note that, frequency-multiplexing allows appropriate number of BBU resources to be assigned to each carrier (based on the configuration using it), which do not have to be changed unless the hybrid configuration itself is updated (which happens at coarse time scales; order of minutes). This is unlike time-multiplexing, where the assignment of BBU resources has to be re-mapped even within a hybrid configuration, i.e. switches between DAS and FFR (granularity of super-frames—tens of ms). Although feasible, the time scales of the latter may limit the potential for resource and energy savings in the BBU pool. Hence, FluidNet adopts multiplexing configurations in the frequency domain.

4.3 Clustering for Reduced Resource Usage

In regions of the network with low traffic load, it is possible to support the traffic demand from multiple sectors jointly with a single DAS configuration. While aggregating such sectors reduces the compute resource usage in the BBU pool, it must be done in a scalable manner. FluidNet proposes a novel clustering mechanism for this purpose.

To capture the BBU resource usage for a hybrid configuration in a sector, we define the resource usage metric, RU:

$$RU(b_i, n_i) = b_i \cdot 1 + (B - b_i) \cdot n_i \quad (2)$$

where, $n_i$ is the number of small cells in sector i and $b_i$ the number of carriers (out of B total) allocated to its DAS configuration. In every carrier, the number of BBU units needed for DAS is one, while it is equal to the number of small cells (n) for FFR. Thus, RU captures the effective number of BBU units needed to support the offered load on the given spectral resources (OFDMA resources in B carriers).

Using the RU metric, FluidNet employs a scalable algorithm (details in Section 5) that clusters two neighboring sectors (i and j) at a time, until either their net offered load cannot be supported or the RU of the resulting cluster (i∪j) cannot be improved, i.e., $$RU(b_{i \cup j}, n_i + n_j) > RU(b_i, n_i) + RU(b_j, n_j) \quad (3)$$

where $b_{i \cup j}$ captures the new split of carriers between DAS and FFR in the cluster). While applying DAS to serve user traffic on $b_{i \cup j}$ resources is straight-forward (shared between users without any reuse), dynamic FFR now has to be applied on $B - b_{i \cup j}$ carriers for a larger number of cells $(n_i + n_j)$. The latter, being a non-trivial RRM process, could become computationally intensive as the size of the cluster increases. Hence, for large clusters, FluidNet can run its FFR solution separately in each cluster's constituent sectors (for scalability), albeit on the same set of $B - b_{i \cup j}$ carriers.

4.4 Handling User Mobility

So far we had assumed that the offered traffic load in a sector or cluster can be scheduled on any of the carriers operating on either DAS or FFR. Recall that for mobile (mainly vehicular) users, a DAS configuration is essential not just for reducing compute resource usage but even for performance. Identifying such mobile users can be done in many ways (e.g., mobile operator maintains user's mobility state). Then the offered traffic load from vehicular users can be isolated from the rest of the traffic and scheduled on resources supporting the DAS configuration. Hence, the net traffic load from mobile users in a sector or cluster would place a constraint on the minimum number of carriers that need to be allocated to its DAS configuration. Subject to this constraint, the rest of the operations (resource allocation, multiplexing, clustering, etc.) are performed as mentioned above.

4.5 Handling Interference Across Sectors

Figure 19A:
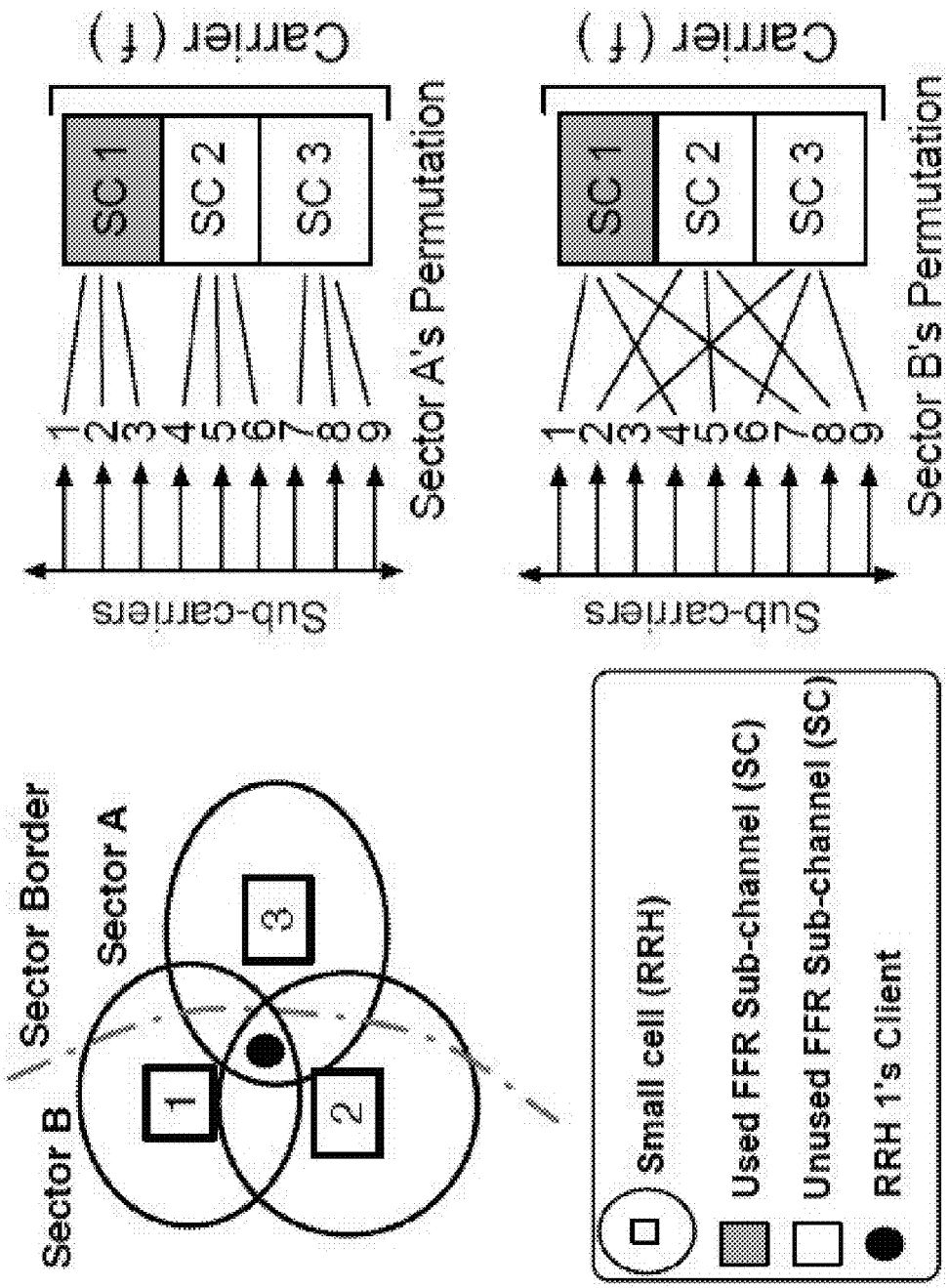
FIG. 19 depicts (a) handling inter-sector interference and (b) a sector graph.

Since FFR is executed at the sector granularity for scalability, interference is managed only between cells within a sector. The conventional (simple) solution to handle interference across sectors (or clusters) is to consider all external interference as noise. A more sophisticated approach is to make implicit provisions in the transmission strategy of a sector for alleviating interference across sectors (and hence clusters) without any coordination. Recall that, in a carrier allocated to FFR, only a subset of the sub-channels (called resource blocks in LTE) are used by any of the cells in the sector to account for intra-sector interference (e.g., cells 1 and 2 in FIG. 19(a)). When coordination across sectors is allowed, these sub-channels would be further chosen so as to avoid interference between sectors. However, in the absence of any coordination (for scalability), the sub-carriers constituting the sub-channels in the carrier can be permuted differently across sectors. While this does not provide the same performance as performing FFR over the interfering sectors jointly, it does provide an interference averaging (alleviating) effect (cells 1 and 3 in FIG. 19(a)). Note that, this is not possible when operating in DAS, where all sub-channels in the carrier are used in every interfering sector.

FluidNet determines the sector-exterior traffic that is prone to interference from neighboring sectors and operates it in an FFR configuration to alleviate interference. Hence, similar to the minimum set of carriers needed for DAS (for mobile traffic), FluidNet reserves a minimum set of carriers for FFR to accommodate sector-exterior traffic.

5. Algorithms in FluidNet 5.1 Overview of Solution

The sequence of operations in FluidNet for every epoch (spanning several minutes) is as follows.

Step 1: For every sector, obtain the aggregate traffic demand (over the previous epoch) from each of its small cells. Determine the minimum set of carriers needed for the DAS and FFR configurations based on traffic demand from mobile and sector-exterior traffic respectively.

Step 2: Determine the optimal multiplexing (in frequency) of DAS and FFR. configurations for each sector. This would automatically classify the appropriate traffic that needs to be scheduled on a particular configuration. Based on the resulting allocation of carriers to the configurations, determine the RU metric for the sector.

Step 3: Cluster sectors two at a time based on their RU metric until either their net offered load cannot be supported or the RU of the resulting cluster cannot be improved.

Step 4: For each cell in the cluster, apply the configurations on their allocated carriers as determined by the cluster's RU metric and assign respective traffic to carriers allocated to their appropriate configurations. We now describe each of the steps in detail.

5.2 Estimation of Radio Resource Demand

Each small cell maintains an estimate of the aggregate traffic demand from its users in the current epoch (of length T s). Given a traffic demand ($d_{c,u}$ in bits) from a user u in cell c, this is translated to the corresponding radio resource demand per sub-frame (i.e. OFDMA resource slots/ms). For this, the average MCS (modulation and coding rate, $l_{c,u}$) used to serve the user in the epoch is kept track of and used to obtain the radio resource demand per sub-frame as $$r_{c,u} = \frac{d_{c,u}}{T \cdot 1000 \cdot \ell_{c,u}}$$

slots. Each cell (c) classifies its net user traffic demand $d_c$ as either mobile or non-mobile. The non-mobile category is further classified as cell-exterior or cell-interior traffic (for FFR purposes) based on presence or absence of interference respectively from neighboring small cells. At the end of the epoch, every cell (c) then provides 3 parameters as input to the central controller: aggregate radio resource demand from mobile ($d_{c,mob}=\Sigma_{i\in mob}r_{c,i}$), cell-interior ($d_{c,ext}=\Sigma_{i\in ext}r_{c,i}$) traffic. Note that with centralized processing in C-RAN, there is no associated feedback overhead in providing this information.

Each sector (j) then further aggregates the radio resource demands from mobile traffic in each of its small cells ($D_{j,mob}=\Sigma_{c\in j}d_{c,mob}$). The minimum radio resource demand needed for its DAS configuration is then the smallest number of carriers needed to satisfy the net mobile traffic demand, i.e. $b_{DAS}=\min_{b \cdot M \geq D_{j,mob}} b$, where M is the number of OFDMA resource slots on each carrier. Similarly, to determine the minimum radio resource demand for FFR, it aggregates the cell-exterior traffic from all its small cells that are on the edge of the sector ($D_{j,ext}=\Sigma_{c\in edge(j)}d_{c,ext}$), scales them by $\alpha=0.25$, and obtains $b_{FFR}=\min_{b \cdot M \geq \alpha D_{j,ext}} b$. Note that approximately only half of the cell-exterior traffic of the sector-edge cells will be vulnerable to other small cells from neighboring sectors. Further, every alternate sector-edge cell would be able to reuse the radio resources in the sector. Accounting for both these aspects, reduces the radio resource demand approximately by a quarter that is captured by $\alpha$.

Remarks: (1) Since aggregate traffic demand from a sector of small cells changes slowly at coarse time scales, determining configurations for every epoch (order of minutes) based on the aggregate demand is both appropriate and robust. For the same reason, it also suffices to estimate the approximate radio resource demand from sector exterior traffic. (2) FluidNet requires only one parameter (mobile traffic demand) from each small cell in addition to those already required by FFR schemes (i.e. cell-interior and cell-exterior traffic demands). However, one can eliminate the former and simplify FluidNet's design by not catering to mobile and sector-exterior traffic separately (i.e. $b_{DAS}=b_{FFR}=0$).

5.3 Optimal Sector Configuration

With the estimates of aggregate radio resource demands, FluidNet determines the optimal split of carriers between DAS and FFR configurations in a sector (j) as follows. With $b_{DAS}$ and $b_{FFR}$ serving as the minimum number of carriers needed for the DAS and FFR configurations, FluidNet uses an iterative approach (Algorithm 1) to determine the optimal split ($b_j$, B−$b_j$) by starting with $b_{FFR}$ as the minimum set of carriers needed for FFR and allowing it to expand till the radio resource demand can be satisfied or if the limit of B−$b_{DAS}$ carriers is reached. Since mobile and sector-exterior traffic demands are already accounted for, to check if net radio resource demand can be met, FluidNet essentially needs to check only if the remaining resource demand ($\Sigma_{c\notin edge(j)} d_{c,ext}+\Sigma_{c\in j}d_{c,int}$) can be accommodated by the current split (say b, B−b) in the iteration, with b−$b_{DAS}$ and B−b−$b_{FFR}$ carriers in DAS and FFR configurations respectively. Note that this would involve running an FFR scheme on B−b−$b_{FFR}$ carriers first (step 3), wherein to maximize the amount of traffic demand satisfied through FFR, the cell-interior traffic ($\Sigma_{c\in j}d_{c,int}$) that provides maximum spatial reuse is assigned to FFR prior to the cell-exterior traffic ($\Sigma_{c\notin edge(j)}d_{c,ext}$). The remaining traffic demand (D−$D_{FFR}$) is then scheduled through DAS on the b−$b_{DAS}$ carriers (step 4).

If the total number of carriers B is small, then a simple, sequential iteration (with increments of one carrier) would suffice. However, if B is large, then the FFR operation in each iteration could be computationally expensive. In this case, FluidNet employs binary search, where the split is moved to the left if the traffic demand cannot be met (steps 8-9), and moved to the right if spare resource slots ($f_{DAS}$, normalized to total # resource slots in a carrier M) remain in DAS configuration after demand satisfaction (steps 5-6). It converges at the split (say $b_j$), where the number of carriers allocated to FFR cannot be further reduced, while still satisfying the demand. Binary search reduces the number of iterations and hence FFR operations from linear (O(B)) to logarithmic (O(log₂(B))). After convergence, the RU of the sector is computed using Eqn. 2 as RU($b_j$, $n_j$).

---
Algorithm 1
Optimal Configuration for Sector j
---
1:    Initialize $b_{low} = b_{DAS}$, $b_{high} = B - b_{FFR}$, $b = b_{high}$, $D = \Sigma_{c \notin edge(j)} d_{c,ext} + \Sigma_{c \in j} d_{c,int}$
2:    while $b_{high} \neq b_{low}$ do
3:        ($f_{FFR}$, $D_{FFR}$) = Schedule_FFR( $B - b_{FFR} - b$, D)
4:        ($f_{DAS}$, $D_{DAS}$) = Schedule_DAS($b - b_{DAS}$, $D - D_{FFR}$)
5:        if $f_{DAS} > 0$ then
6:
$$b_{low} \leftarrow b; b \leftarrow \frac{b + b_{high}}{2}; b_{cur} \leftarrow b$$
7:        else
8:          if $D - D_{FFR} - D_{DAS} > 0$ then
9:
$$b_{high} \leftarrow b; b \leftarrow \frac{b + b_{low}}{2}$$
10:          end if
11:        end if
12:    end while
13:    $b_j \leftarrow b_{cur}$
---

In addition to RU, every sector keeps track of two metrics: spare radio resources ($\beta_j$) and reuse factor ($r_j$) in the sector (for use in clustering). Note that since minimum set of carriers are determined for FFR configuration, spare resource slots, if any, will appear only in the DAS configuration. This is normalized to the total number of slots (M) in each carrier to yield $\beta_j$. Similarly, reuse factor determines the number of actual resource slots needed to support the traffic demand in the sector (and captures the average reuse resulting from FFR):

$$r_j = \frac{\sum_{c \in j} d_{c,mob} + d_{c,ext} + d_{c,int}}{(B - \beta_j)M}.$$

THEOREM 5.1. FluidNet's iterative scheme converges to the optimal split of carriers between FFR and DAS configurations in each sector w.r.t. the objective in Eqn. 1.

5.4 Properties of RU Metric

We present properties of the RU metric that are relevant for clustering. For ease of exposition, we do not consider mobile traffic in the discussions.

PROPERTY 5.1. When two sectors i,j are clustered, the split of carriers in the resulting cluster has to be the minimum of those in the constituent sectors ($b_{i \cup j} = \min\{b_i, b_j\}$) to maximize RU.

PROPERTY 5.2. RU metric does not satisfy the "local" property, i.e. if clustering sectors i,j,k improves the RU, then this does not mean that clustering a subset of its constituent sectors also improves RU.

$$RU(b_{i \cup j \cup k}, n_i + n_j + n_k) \leq \sum_{\ell = \{i,j,k\}} RU(b_\ell, n_\ell)$$

$$! \Rightarrow RU(b_{i \cup j}, n_i\_n_j) \leq RU(b_i, n_i) + RU(b_j, n_j)$$

PROPERTY 5.3. To cluster sectors i and j (with say $b_i \leq b_j$), we need all of the following to be satisfied.

1. Both sectors must have spare radio resources in the DAS configuration, i.e. $\beta_i < b_i$ and $\beta_j < b_j$.
2. The aggregate traffic from the DAS and FFR configurations of the two sectors must be satisfied by the new split of carriers in the cluster. Equivalently, $b_j - r_j(b_j - b_i) \leq \beta_i + \beta_j$.
3. The RU of the resulting cluster must be improved. Equivalently, $$b_j \leq \frac{n_j}{n_j - 1} b_i.$$

5.5 Clustering of Sectors

Based on the above established properties, FluidNet designs a light-weight clustering algorithm (Algorithm 2) to improve the RU of configurations applied in the network. Representing as a graph G=(V,E), each sector forms a vertex in the graph, while an edge e=(u, v) exists between two vertices (u and v) if the corresponding sectors are adjacent (Step 1). Each edge e carries a weight ($w_e$), which evaluates property 5.3 in identifying if the corresponding sectors u and v can be clustered, and if so assigns the resulting RU of the cluster as its weight ($w_e$=RU (min$\{b_u, b_v\}$, $n_u + n_v$)). If however, clustering is not feasible, then this is denoted by $w_e = \infty$ (Step 2).

---
Algorithm 2 Clustering of Sectors
---
1:  Construct Sector Graph: G = (V, E), V = {sectors}, E = {e = (u, v)} : v = N(u)
2:  $w_e$ = RU(min$\{b_u, b_v\}$, $n_u + n_v$) if Property 5.3 is satisfied; and $w_e = \infty$ otherwise
3:  Let G' = (V', E'); initialize V' = V, E' = E
4:  while (1) do
5:    Pick u = Rand (V')
6:    Select v* = arg min$_{v:e=(u,v) \in E} w_e$
7:    if v* ≠ ∅ then
8:        Contract (u, v*) in V', i.e. (u, v*) → u'
9:        Add edges in E', (u', v) : (u, v) ∈ E or (v*, v) ∈ E
10:      Update edge weights in E' $w_{e'}$, ∀e' = (u', v) : v ∈ N(u') &v ∈ V'
11:    else
12:      Exit
13:    end if
14:  end while
15:  Output clustered graph G' = (V', E')
---

With the above weighted graph, FluidNet clusters sectors through a graph coarsening approach. At each step, it picks a random vertex u (Step 5), then selects the neighboring vertex v (Step 6) that when clustered together minimizes the resulting RU (v=argmin$_{e \in E} w_e$, where e=(u, v)). It then contracts u and v, along with edges between them to a new clustered node u' (Steps 7-9). Weights of edges incident on u and v are updated after the contraction (Step 10). The process is repeated until no more clustering is possible. Each vertex in the final graph (v∈V') represents the clustering of sectors in the network for improved RU (Step 15). Further, the RU of each clustered node, represents the common split of carriers between the DAS and FFR configurations for all sectors in that cluster.

Figure 19B:
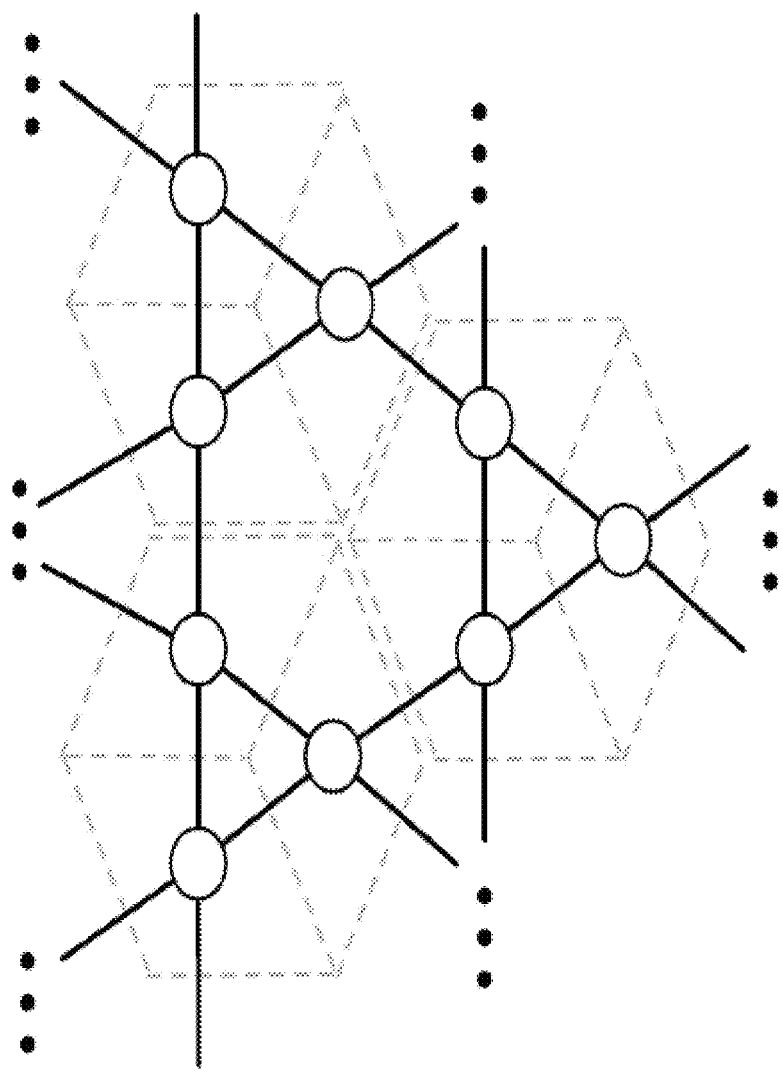

Recall that RU does not satisfy the local property (property 5.2). Hence, while local clustering schemes are light-weight and scalable, they might miss out on potential clusters that improve the RU. To reduce the impact of such sub-optimality, FluidNet leverages the structure of the sector graph as follows. The logical 3-sector operation of macrocell networks results in a graph that has only cliques of size 3 and cycles of size 6 (see FIG. 19(*b*)). This special form of G is called a "sector graph". Hence, FluidNet includes the following optimization, where in addition to computing the weight of each edge, it also computes the weight of each clique ($w_{(u,v,w)}$=RU $(\min\{b_u, b_v, b_w\}, n_u+n_v+n_w)$). Hence, it first starts contracting (clustering) all possible cliques ( $$\frac{|V|}{3}$$

in number) before moving to the contraction of edges. This would help improve RU from potential 3-sector (clique) clusters, which would not otherwise result from their constituent 2-sector (edge) clusters.

As with most clustering problems, it can be shown that the problem of finding the network-wide configuration with the smallest RU is NP-hard. We have the following performance guarantee for FluidNet THEOREM 5.2. FluidNet's algorithms yield network-wide transmission configurations with a RU that is within a factor of $$\frac{3}{2}$$

and 2 from the optimal for sector and general graphs respectively.

5.6 Scalable Realization

While carriers assigned to DAS and FFR (say (b', B−b')) in a cluster are fixed for an epoch and determined by the cluster's resulting RU (computed based on aggregate radio resource demands from previous epoch), DAS and FFR strategies are applied to appropriate incoming traffic demand at finer time scales (order of seconds) during the epoch. Further, the DAS traffic of all the constituent sectors simply share the radio resources through a common DAS configuration on b' carriers. However, the FFR for the constituent sectors is executed individually within each sector (and not jointly), albeit on the same set of B−b' carriers. This keeps the complexity of running FFR schemes low (restricted to cells in a sector). Not running FFR jointly across all sectors in the cluster will result in inter-sector interference. However, this does not hurt the estimated RU of the cluster since it is implicitly incorporated in the RU of the constituent sectors prior to clustering. Further, adopting a two-step approach—first determining the RU-optimal DAS-FFR configuration in each sector, then improving RU of the network by clustering sectors through a light-weight process, forms the key in ensuring scalability of operations in FluidNet.

6. Prototype of FluidNet 6.1 Architecture

The core intelligence of FluidNet resides in the central processing entity managing the BBU pool, which consists of two key components.

1) Resource Manager: The resource manager is responsible for two key functionalities: (i) determining the appropriate number of BBU units (using FluidNet's algorithms) needed to generate distinct frames and how these frames from BBUs are mapped to specific RRHs, and (ii) assigning compute resources (DSPs, cores, etc.) to each BBU unit. FluidNet focuses on the former functionality and is complementary to the processor scheduling problem addressed by studies with the latter functionality [1].

2) Switching Element: While the resource manager determines the logical mapping of BBU signals to RRHs, the switching element is responsible for realizing these mappings. Since some BBU frames are sent to multiple RRHs (as in DAS), while other frames are sent individually to specific ceils (as in dynamic FFR), the switching element allows for both unicast and multicast switching. Based on the configuration determined by the resource manager on a given carrier, the switch module activates the appropriate set of output ports for an incoming BBU signal depending on the intended set of recipient RRHs. Since a BBU pool may potentially serve tens to hundreds of small cell RRHs, to ensure scalability, the switching fabric may be composed of multiple smaller-size switches (as opposed to one big switch). The size of the switches may be chosen to tradeoff the level of multicasting capability (e.g., for DAS) with cost.

6.2 Implementation

Figure 20:
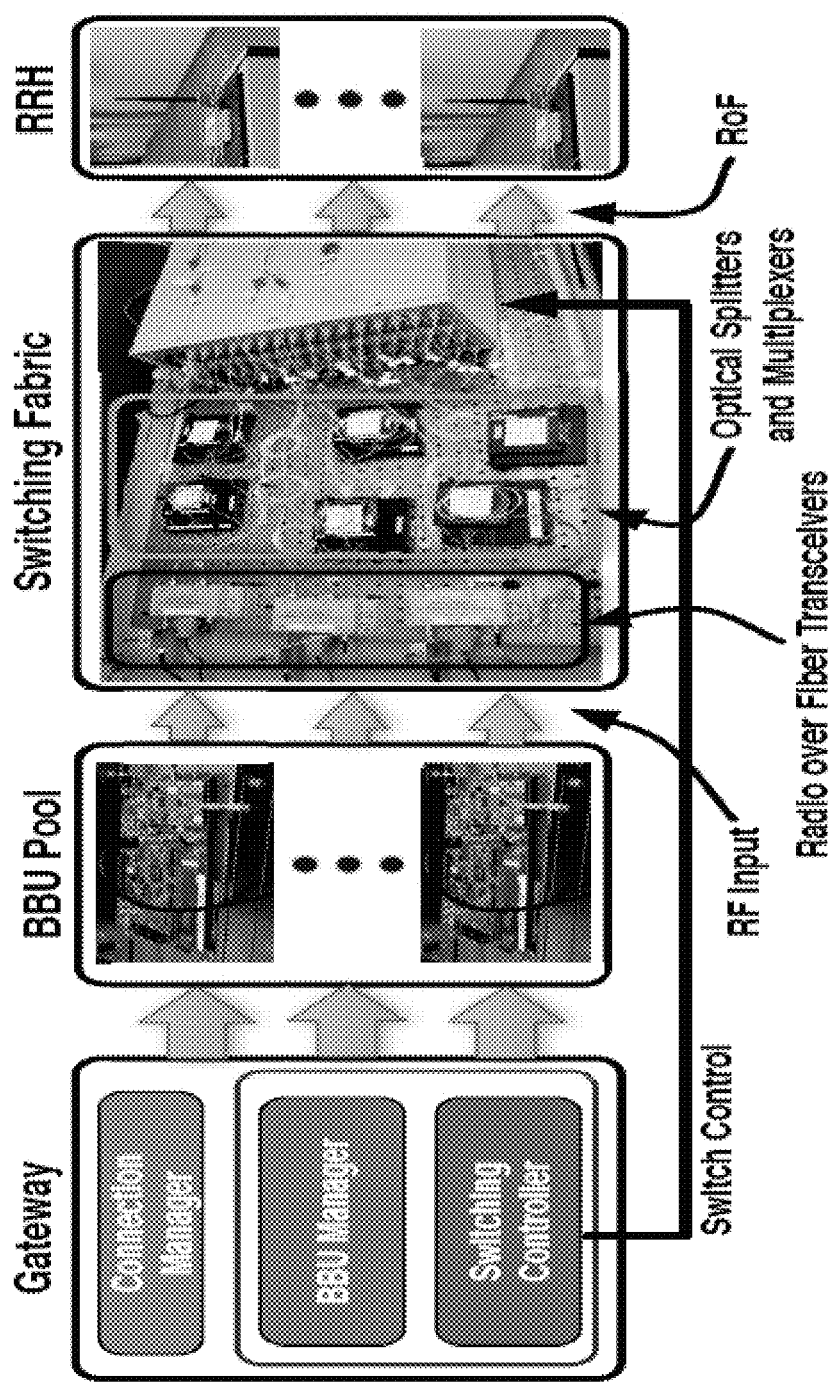
FIG. 20 depicts testbed components of FluidNet.

We have built a full-fledged, small-scale C-RAN testbed, capable of over-the-air transmissions. Given that LTE requires licensed spectrum, our set-up is currently based on WiMAX (with an experimental license). However, both LTE and WiMAX being OFDMA-based, our testbed suffices to demonstrate the proposed concepts in FluidNet that are equally applicable to LTE as well. Our testbed is depicted in FIG. 20.

BBU Pool, Clients and Gateway: Since our focus is on the front-haul configuration, we consider six WiMAX BSs (from PicoChip) directly as our BBUs. We use netbooks with USB WiMAX dongles as the clients. FluidNet's algorithms to determine configurations, are implemented in the WiMAX gateway, whose primary role is to manage the traffic flows from/to the clients. In our set-up, a single gateway is instrumented to manage all the 6 BBUs and their clients. The gateway also hosts the controller to instruct the switch for mapping of BBU signals to RRHs. We implement the controller using LabVIEW and communicate the desired configurations to the switch via serial port (RS232).

Radio-Over-Fiber: Ideally, baseband signals should be transported in the digital domain between BBU pool and RRHs to allow for scalable, low-latency switching between configurations. However, the lack of commercially available products to manipulate the baseband signals between BBU pool and RRHs in the digital domain (over CPRI), has prompted us to pick an alternate design, wherein we employ analog RF signal transmission based on radio over fiber (RoF) techniques. With latencies of about 5 μs/Km over the fiber, we have verified that RoF can retain the signal synchronization between RRHs as well as the timing constraint between downlink and uplink signals for reasonable distances of around 10 Km between the BBU pool and RRHs. With RoF, the modulated RF analog signal from a BBU is converted into an optical carrier using a COTS optical transceiver, and delivered to RRHs on a single mode optical fiber.

RRHs: Since all the signal processing (even modulation and RF up/down-conversion) is done at the BBU pool, our RRH design is simple and consists of an optical transceiver attached to an antenna. The optical wavelengths (carrying multiple RF signals) are photo-detected and converted back to the RF domain (for over-the-air transmission) by the optical transceiver. On the uplink (from RRHs to BBUs), the operations are similar but in reverse order.

Switching Element: Since BBU signals are carried as analog RoF, to realize various configurations, we enable switching in the optical domain, which is controlled from the gateway. Since our optical switch supports only one-to-one switching, we enable flexible switching (one-to-one and one-to-many) indirectly by using optical splitters and multiplexers with CWDM. While the latency in switching between configurations is negligible if implemented in the digital domain, it could be appreciable in the optical domain depending on the sophistication of the switch. With our inexpensive optical switch that reconfigures individual port switches, this could amount to 1 s. This is still acceptable if hybrid (DAS, FFR) configurations are realized in the frequency domain (across spectral carriers), where they need to be changed only with appreciable load changes at the granularity of several seconds or minutes.

The gateway controls the optical switch to turn on or off each independent path from each BBU to any RRH to create various configurations. Since each switch in our testbed is limited to supporting all configurations in a set-up with at most 4 BBUs and 4 RRHs, we employ two such switches jointly to serve our 6 BBU-RRH system.

7. Performance Evaluation
7.1 Prototype Evaluation
7.1.1 Set-up

Figure 21:
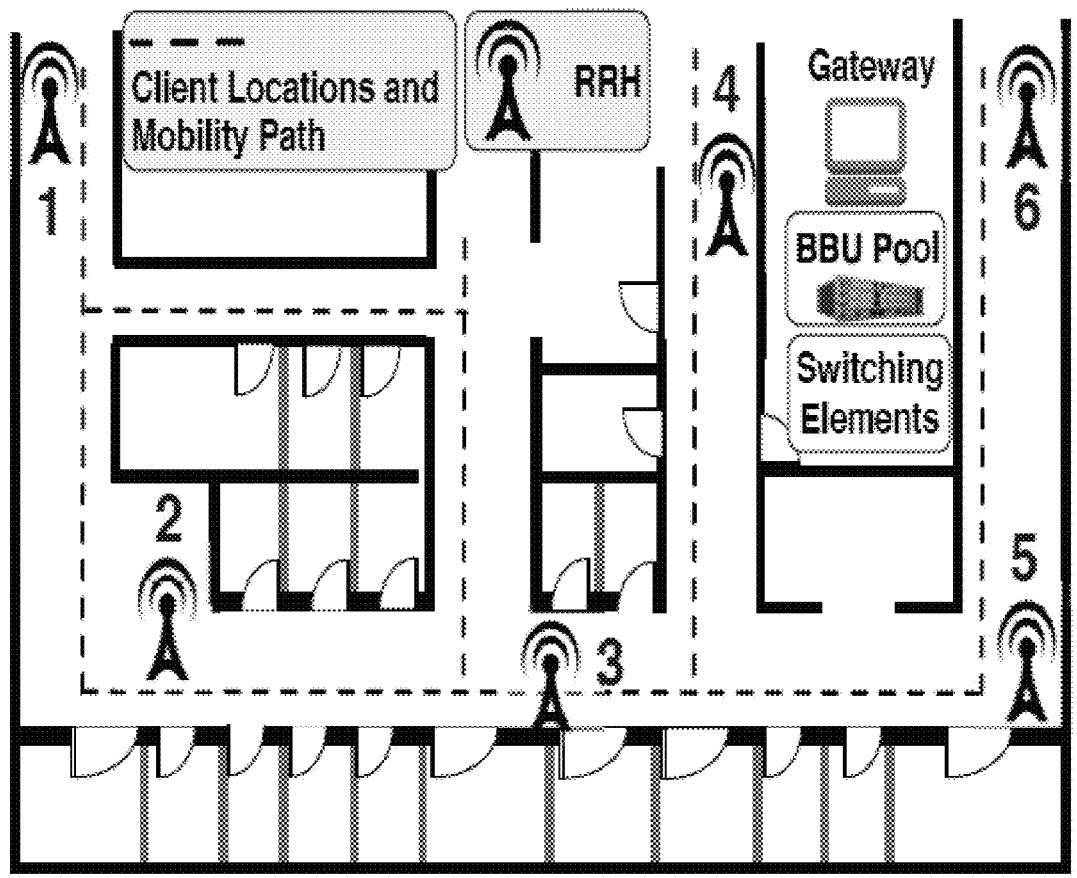
FIG. 21 depicts testbed deployment.

Testbed: Our testbed consists of six small cell RRHs deployed in an indoor office setting, driven by six physical BBUs co-located in a single room through optical fiber (see FIG. 21). There are six clients, each associated to one of the six cells. All the small cells are assumed to be in a single sector of a macrocell. The BBUs can generate WiMAX RF signals over two 10 MHz bands: at 2.59 GHz and 2.61 GHz, for which an experimental FCC license has been acquired to conduct over-the-air transmissions. Hence, we consider four spectral blocks (i.e., carriers), each with 5 MHz bandwidth to realize hybrid configurations. Since our BBUs are BSs themselves, we can operate a BS and hence an RRH on only one carrier at any given time. Due to this technical difficulty, we run DAS and FFR configurations sequentially on the appropriate blocks to realize the hybrid configuration for the sector. This would equivalently amount to 4 logical BBUs (one per carrier) per small cell and hence a maximum of 24 logical BBUs in the system.

Strategies and Metrics: We evaluate FluidNet against both the DAS scheme (labeled "DAS") and an FFR scheme (labeled "FFR") for baseline comparison (we consider other baselines in simulations). For FFR, our topology allows each small cell to operate on half the set of sub-channels, while being orthogonal to those of its neighbors. In DAS, a single BBU frame serves all the RRHs and clients. Traffic loads (2-16 Mbps) and profile (static, mobile) of clients are the parameters studied. The maximum net throughput that can be delivered in a WiMAX frame (at 64 QAM) in our set-up is around 16 Mbps for 10 MHz bandwidth. Each experiment takes 180 seconds and is repeated multiple times with varying client locations. Impact of rate adaptation is isolated by picking the MCS that delivers maximum throughput for a client (we try all MCSs). The fraction of the offered load supported and the effective number of BBU units consumed in the process are the metrics of evaluation.

7.1.2 Impact of Traffic Heterogeneity

Figure 22:
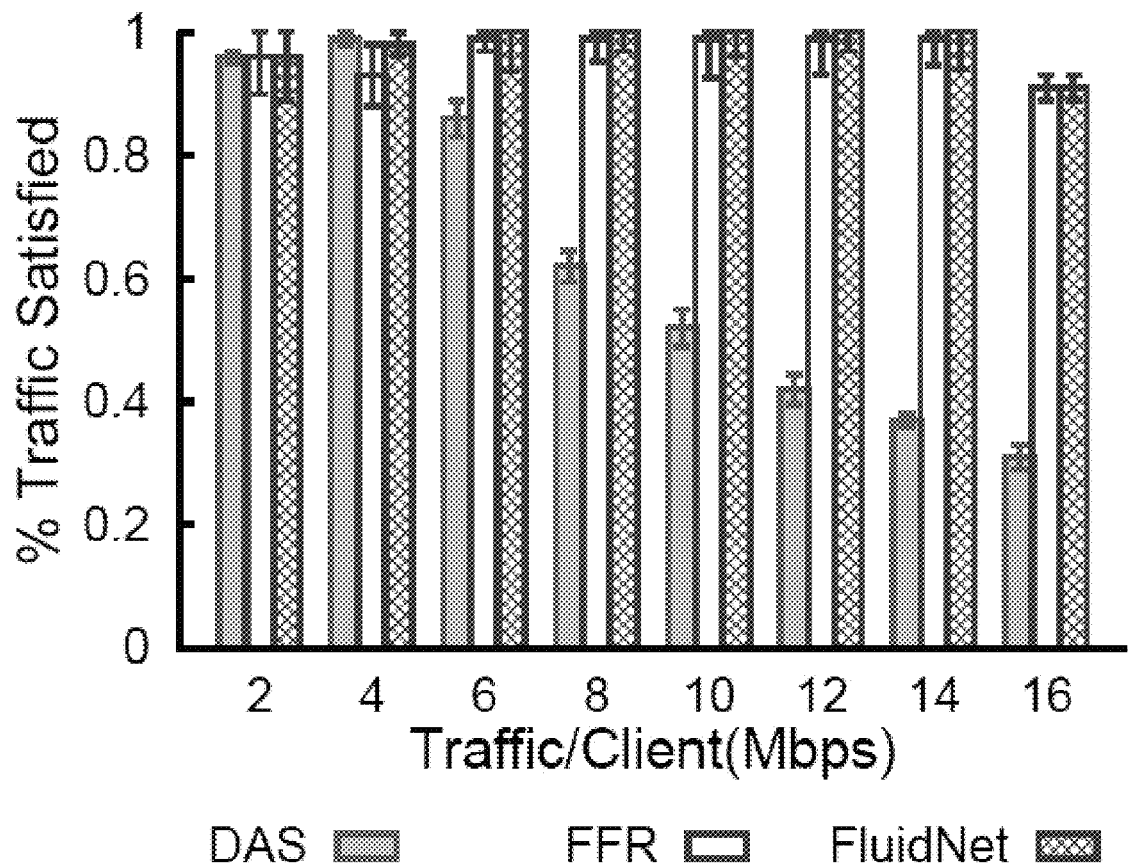
FIG. 22 depicts traffic satisfaction with variable traffic demand.
Figure 23:
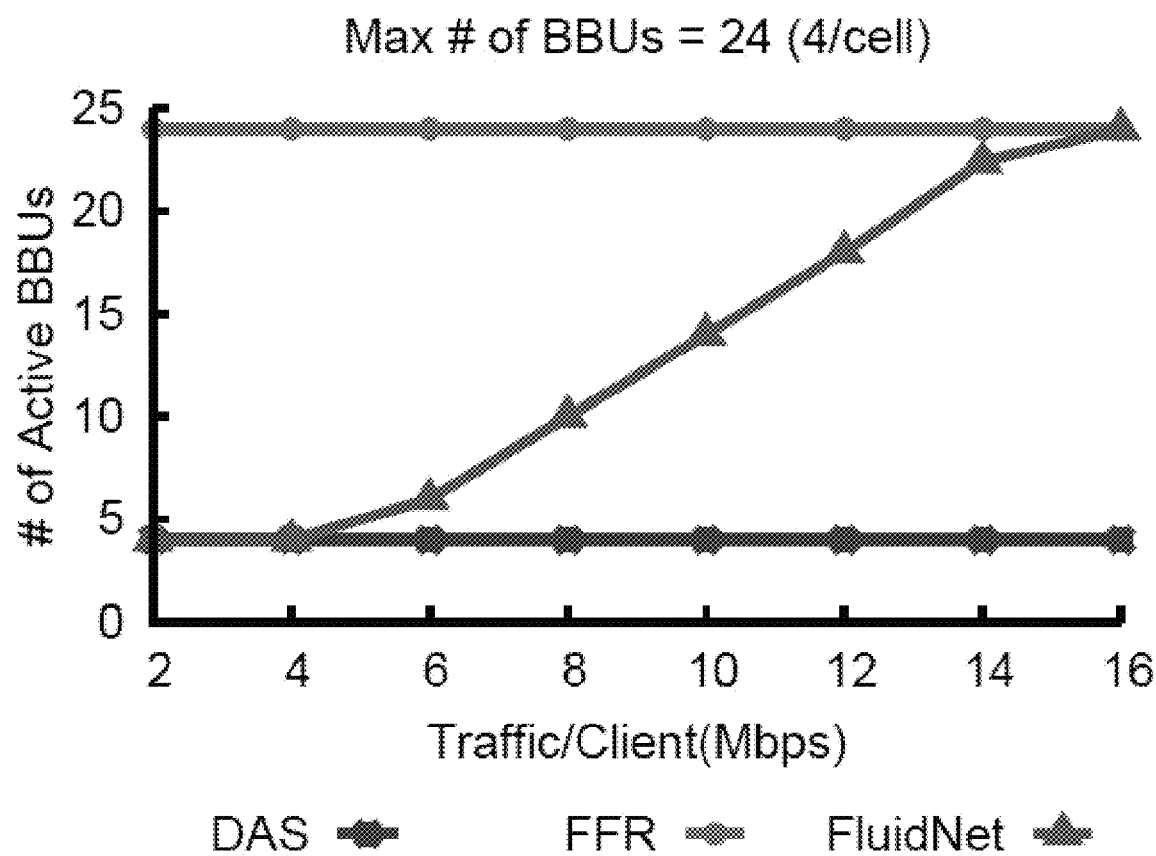
FIG. 23 depicts energy efficiency with variable traffic demand.

With six static clients, we study the percentage of average traffic satisfied and the number of BBUs required by each scheme with varying per-client traffic demand in FIGS. 22 and 23, respectively. With high load, FFR is essential to support the traffic demand, while DAS can support only a third of the demand (FIG. 22). When the load is low, DAS is sufficient and activates only a sixth of the BBUs required by FFR (FIG. 23). While FluidNet blends the best of DAS and FFR under extreme load conditions, its benefits are more pronounced in the intermediate regime (e.g., 10 Mbps demand per-client), where it outperforms both DAS and FFR. By employing hybrid configurations and adapting them to traffic profiles, FluidNet sustains twice as much traffic as DAS and requires only half the BBUs activated by FFR.

7.1.3 Impact of User Heterogeneity

Figure 24:
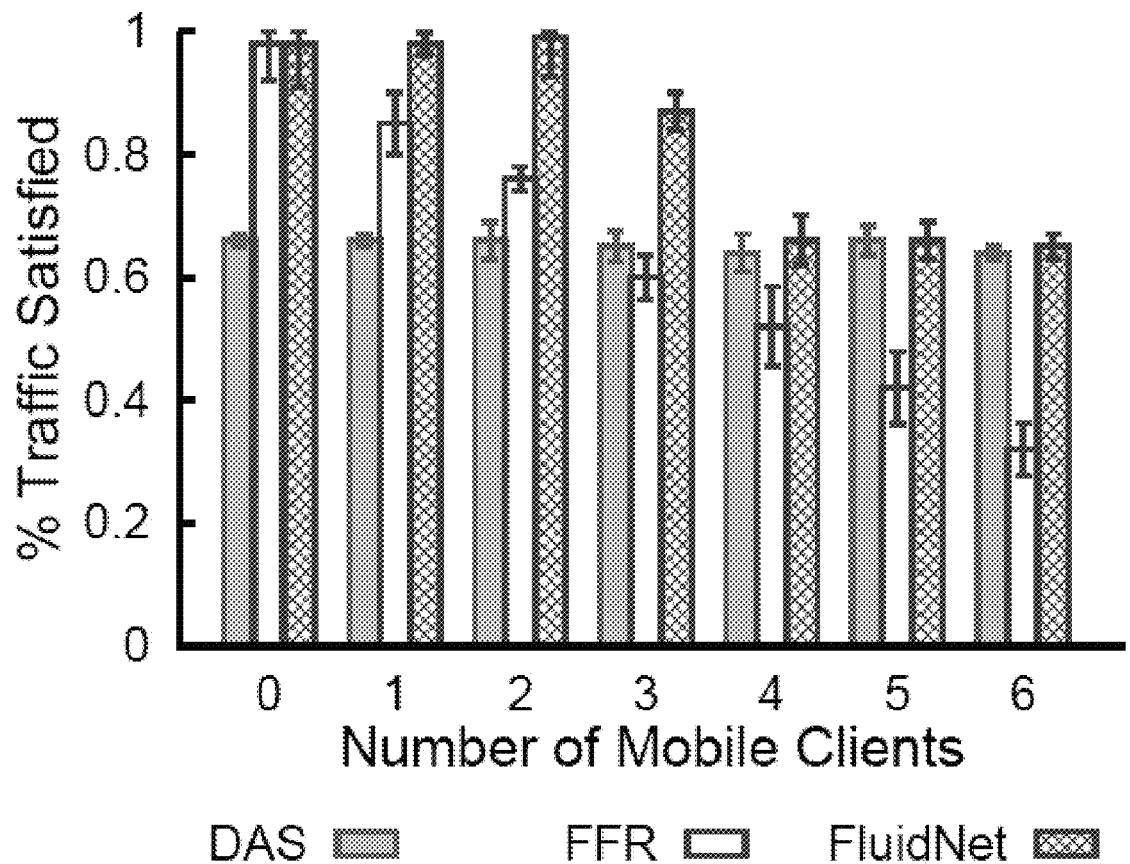
FIG. 24 depicts traffic satisfaction (mobile).
Figure 25:
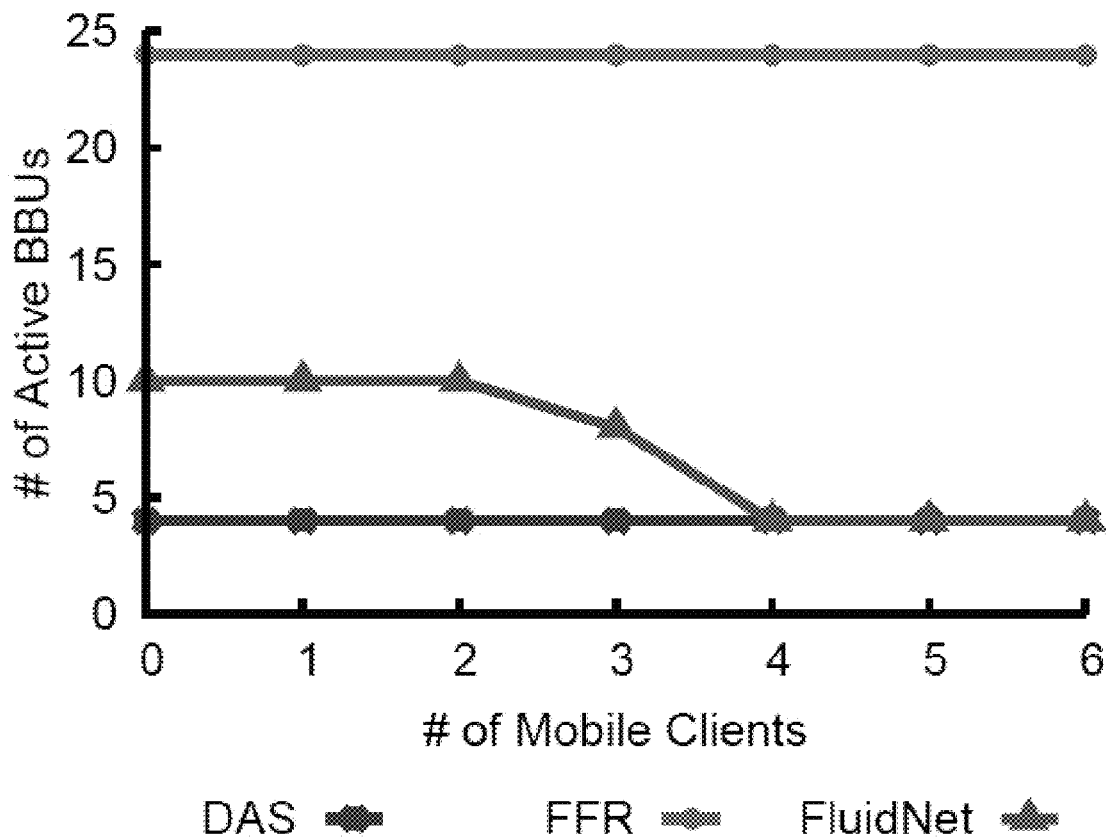
FIG. 25 depicts energy efficiency (mobile).

We vary the number of mobile clients in a six client scenario, with each client's traffic fixed at 8 Mbps. To eliminate the adverse impact of handoffs in FFR (triggers, delays, etc.), we move a mobile client at pedestrian speed only in the vicinity of its RRH (sample path in FIG. 21). In contrast, seamless coverage and lack of handovers, allow a client to be moved in all deployment areas with DAS and FluidNet. Hence, the results in FIGS. 24 and 25 are optimistic for FFR. We see that with increasing fraction of mobile traffic, FFR's performance degrades and ends up being much worse than that of DAS (FIG. 24). We observed that, even without handovers, when a client moves away from its RRH, its link deteriorates and faces high interference from the control region of frames of neighboring RRHs in FFR (only data part of the frame is protected in FFR). While DAS's coverage provides consistent link quality, it under-utilizes the spectrum when mobile traffic is low. FluidNet strikes a fine balance between the two configurations to support as much as 50% more traffic, while incurring a BBU energy consumption that is only slightly more than that of DAS.

7.1.4 Adaptation to Network Dynamics

Figure 26:
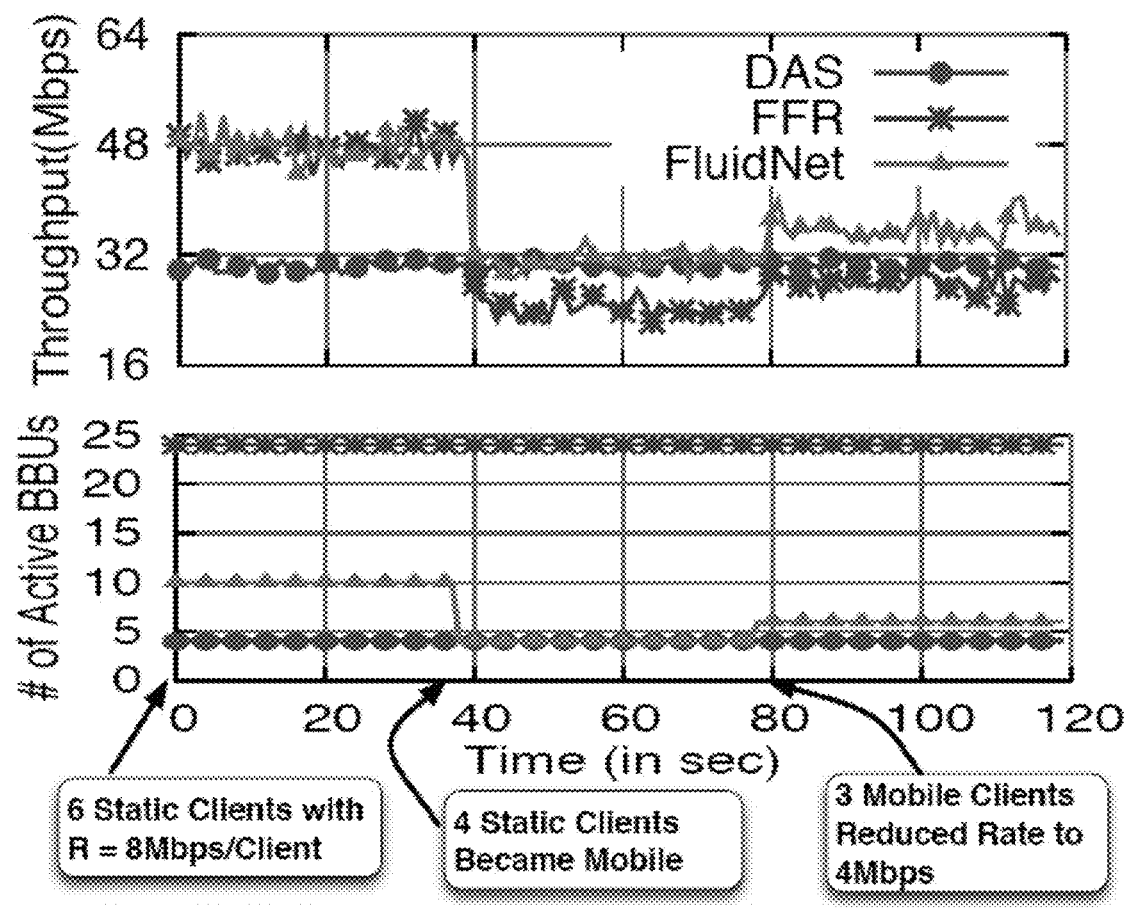
FIG. 26 depicts network dynamics.

We now evaluate FluidNet's adaptability to network dynamics. We start with six static clients, each with a 8 Mbps traffic load. Two events are triggered, one at 40 seconds into the experiment and another at 80 seconds. In the first event, four of the clients become mobile. Then at the 80 second mark, one of the mobile clients becomes static again and the remaining mobile clients reduce their rate to 4 Mbps. From FIG. 26, we see that FluidNet tracks FFR performance initially (albeit at less number of BBUs activated), when there are more static clients inducing a high traffic load. When a majority of the traffic demand becomes mobile at the first event, unlike FFR that suffers in performance, FluidNet immediately (but for a short transition delay) adapts its configuration to track DAS performance that is optimal for the updated network conditions. Similarly, when the traffic load of static clients starts to dominate, while still involving mobile clients at the second event, FluidNet employs a hybrid configuration to sustain a higher traffic load compared to both DAS and FFR, while incurring a BBU usage comparable to DAS. This clearly indicates FluidNet's ability to effectively adapt its configurations to varying network conditions.

7.1.5 Multi Operator/Technology Customization

Figure 27:
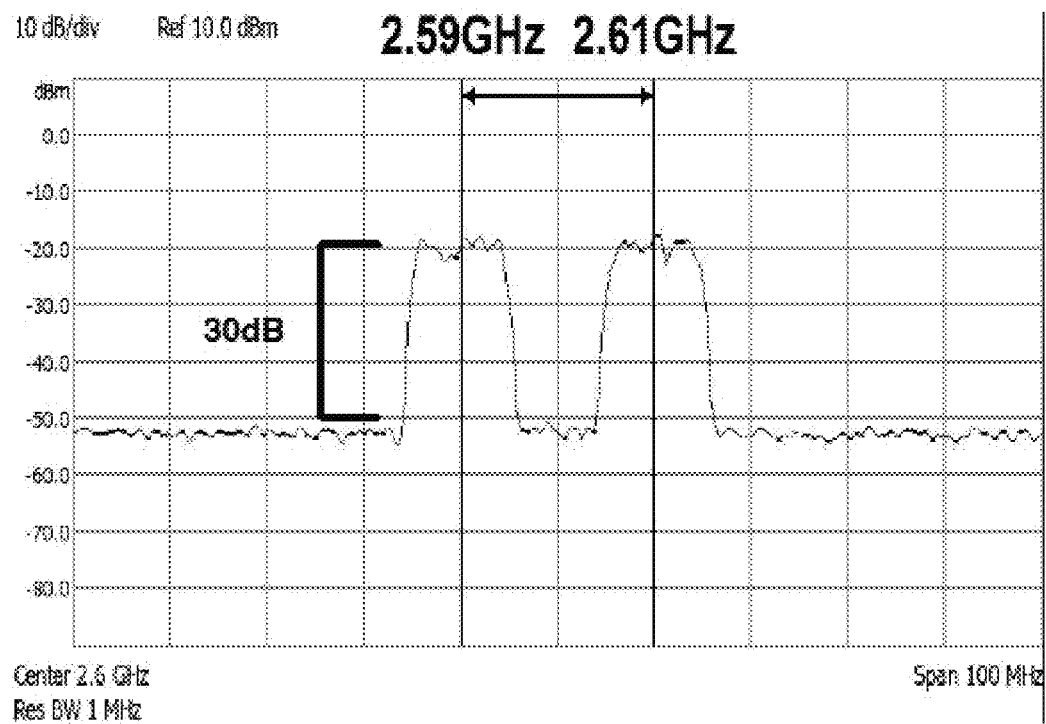
FIG. 27 depicts a signal spectrum for two operators.
Figure 28:
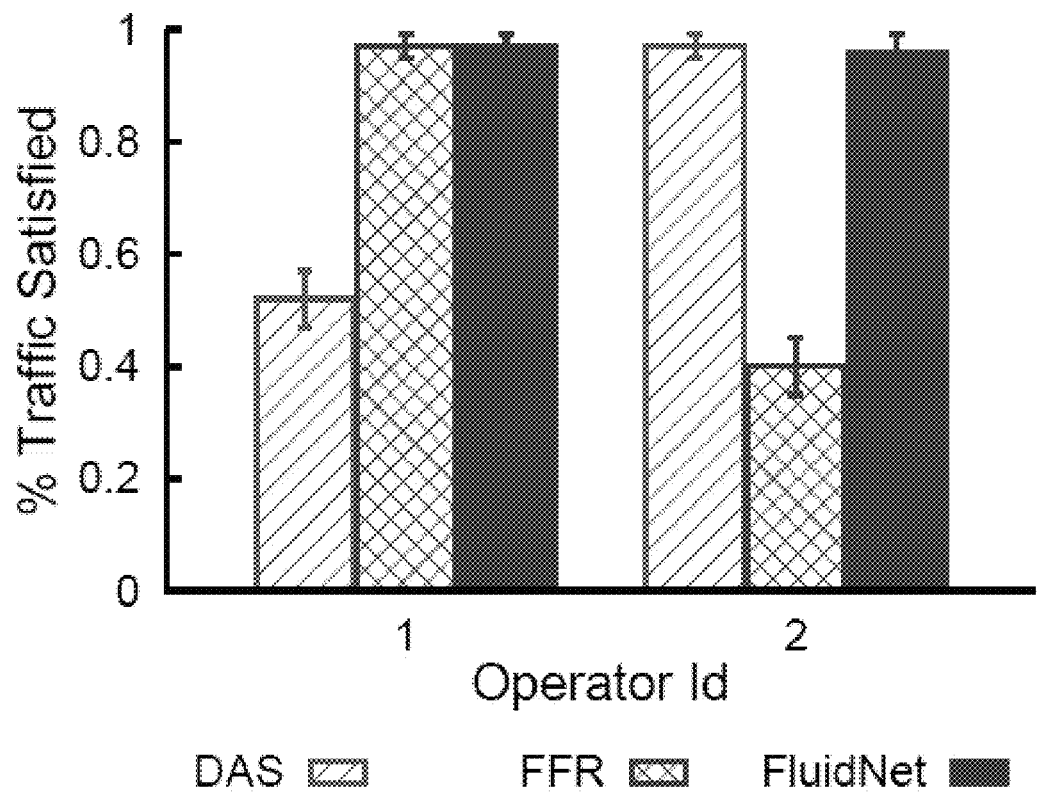
FIG. 28 depicts traffic satisfaction for two operators.

One of FluidNet's key features is its ability to allow for multiple operators to customize the configurations needed to serve their respective clients simultaneously. To illustrate this, we design an experiment with three BBUs and three RRHs. There are two operators, one operating at 2.59 GHz and the other at 2.61 GHz, each with 10 MHz bandwidth. Both operators share the same set of three RRHs to cater to three clients each simultaneously. While all clients for operator 1 are static and impose a net rate requirement of 21 Mbps, those for operator 2 are all mobile with a net rate requirement of 12 Mbps. To check transmission feasibility on our front-haul over longer distances, the fiber between BBUs and RRHs is made to be a 10 Km fiber spindle. FIG. 27 presents the spectral graph from one of the RRHs captured using a spectrum analyzer. It is clearly seen that both the operators are able to co-exist simultaneously on the same front-haul without any interference to each other's RF signal. Furthermore, this is achieved over a large distance of 10 Km, which demonstrates feasibility for an outdoor cellular deployment. Also, FIG. 28 shows that FluidNet tailors the right configuration for each operator to provide maximum satisfaction of traffic demand.

Figure 29:
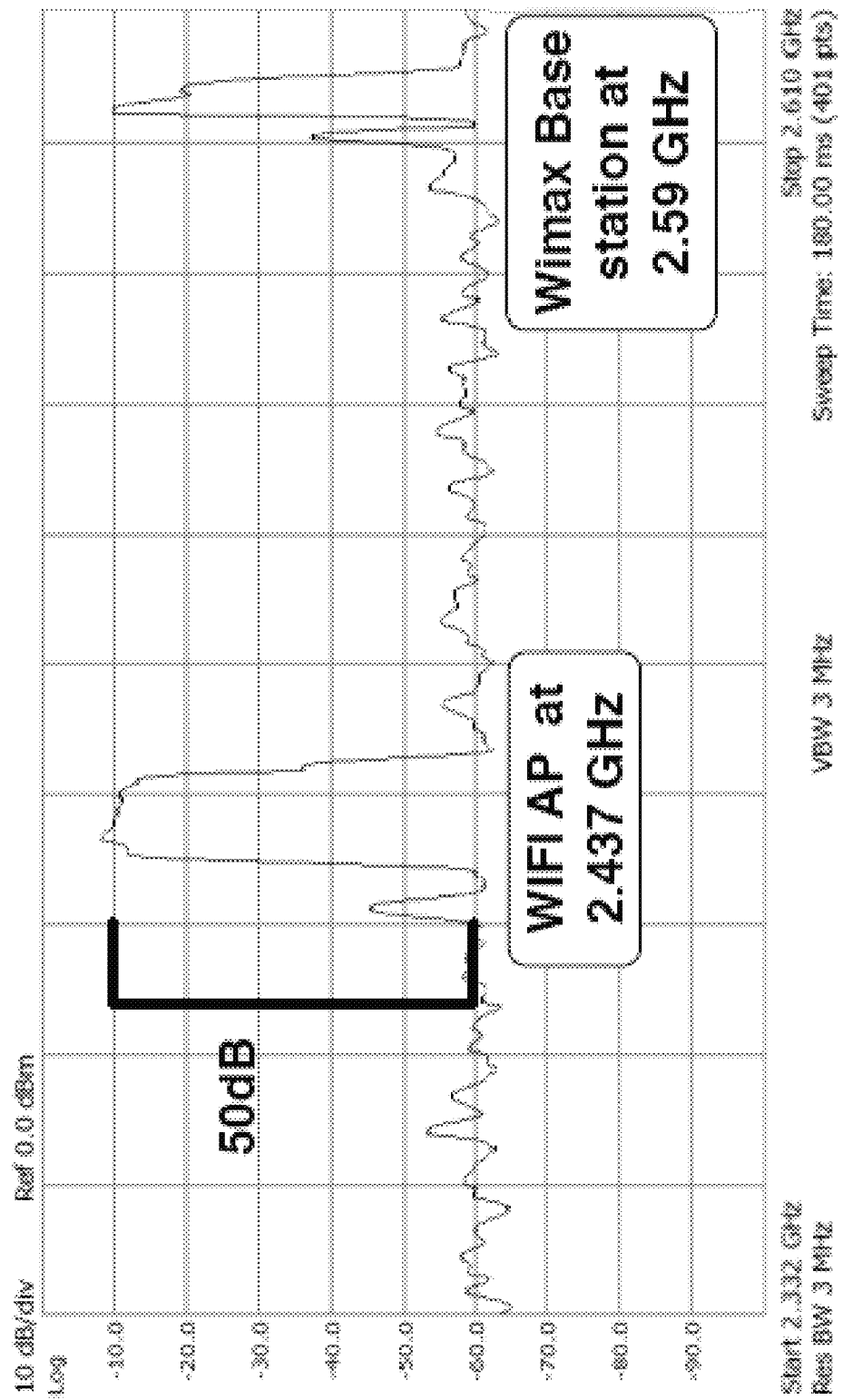
FIG. 29 depicts a signal Spectrum for WiFi+WiMAX.
Figure 30:
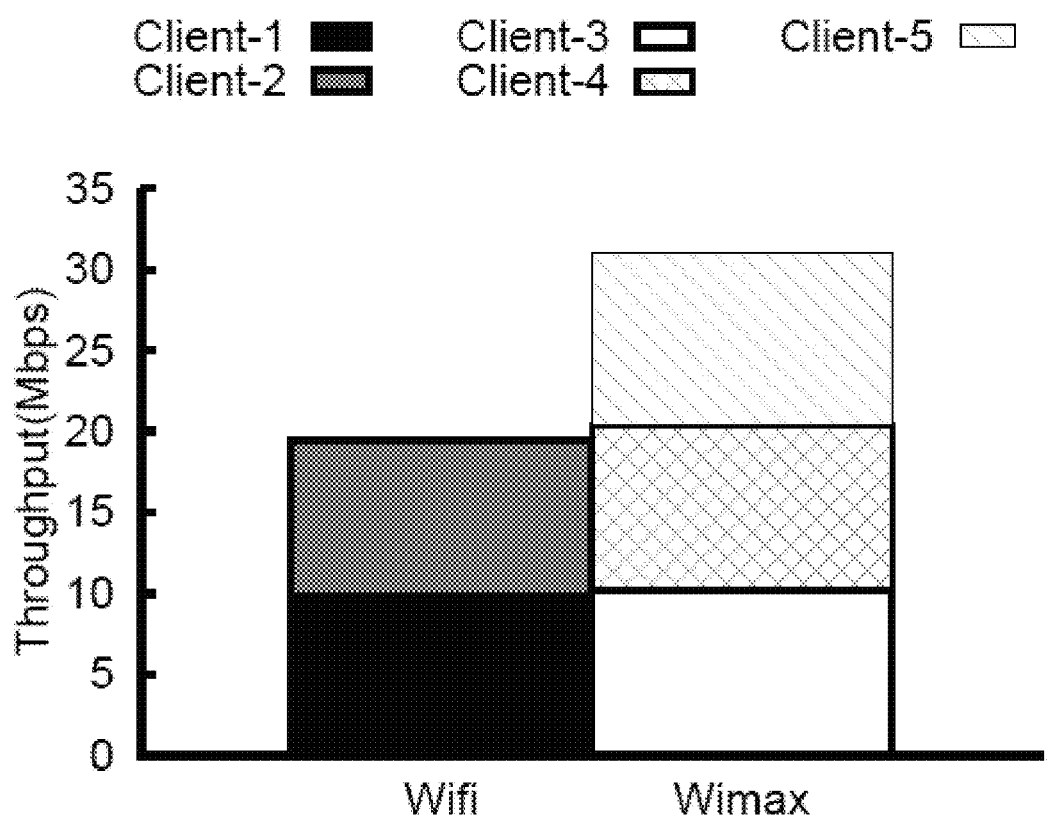
FIG. 30 depicts traffic Satisfaction for WiFi+WiMAX.

This is also evident from FIGS. 29 and 30, where a single operator uses two different access technologies (WiFi and WiMAX) to serve five clients (each with 10 Mbps traffic rate) through 3 RRHs. Two of the clients on WiFi (2.43 GHz) are static and associated to two of the RRHs, while the other three are on WiMAX (2.59 GHz) and mobile. It is interesting to see that FluidNet is capable of simultaneously supporting an asynchronous (WiFi; one-to-one for CSMA) and synchronous (WiMAX; one-to-many for DAS) access technology for the same operator. FluidNet's support for multiple operators and technologies are very useful features in a C-RAN, given the growing popularity of RAN-sharing and dual carrier small cells (for WiFi offload).

7.2 Simulation

Set-up: We use a 3GPP-calibrated system simulator to create a outdoor heterogeneous cellular network, with 19 macrocell sites (each has three sectors) and ten small cells per sector. Thus, the network has a total of 627 cells (57 macro+ 570 small) based on the scenarios defined in 3GPP 36.814. We distribute 3600 small cell clients according to the '4b' distribution. We assume that the macrocells and their clients use pre-determined spectral resources orthogonal to the ones used by the small cells and their clients, and thus ignore the interference from/to the macrocell network.

To generate traffic demands, we resort to emulating a typical operational day in outdoor cellular networks. Since we do not have access to such operator data (and public data does not exist to the best of our knowledge), we use the reported peak hour distribution from as follows. We mark each sector (and the small cells in it) as either "business" or "residential". As seen in FIG. 15, we geographically determine that the central, shaded sectors are business sectors (there are a total of 21 such sectors with 210 small cells in them) and peripheral sectors are residential sectors (36 of them exist). The small cells in a business sector bit their peak loads between 10 a.m. and 4 p.m. and residential cells have peak hours between 4 p.m. and 8 p.m. The traffic outside the peak hours is chosen such that there is a gradual increase until the peak interval and a decrease after that.

We compare FluidNet against three other schemes. The first (labeled "FFR") is a pure FFR solution running with a fixed cluster size corresponding to a macrocell (3 sectors=30 small cells). The second (labeled "DAS") is a pure DAS solution with opportunistic clustering. When the total load of neighboring sectors is less than a frame's worth of resources (i.e., the max. capacity of DAS), they are merged in a DAS cluster and thus served by one BBU. The third (labeled "GRID") is reported in and addresses energy consumption by turning small cells off during non-peak periods.

Traffic Heterogeneity: We first simulate a network where no clients are mobile. Each result is the average of five different runs with randomly selected traffic demands from clients, subject to the spatio-temporal traffic distribution.

Figure 31A:
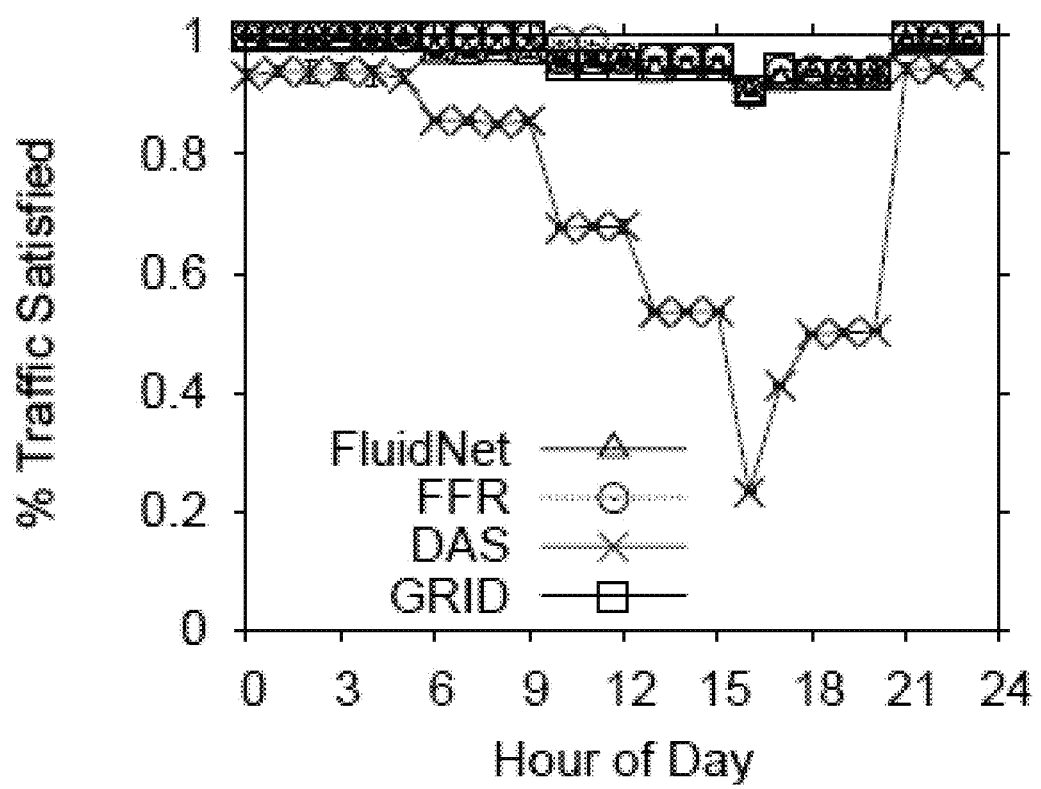
FIGS. 31(a) to 31(e) illustrates that FluidNet has comparable traffic satisfaction ratio to FFR (a), and is 3× and 2.2× more energy efficient than FFR and GRID respectively.
Figure 31B:
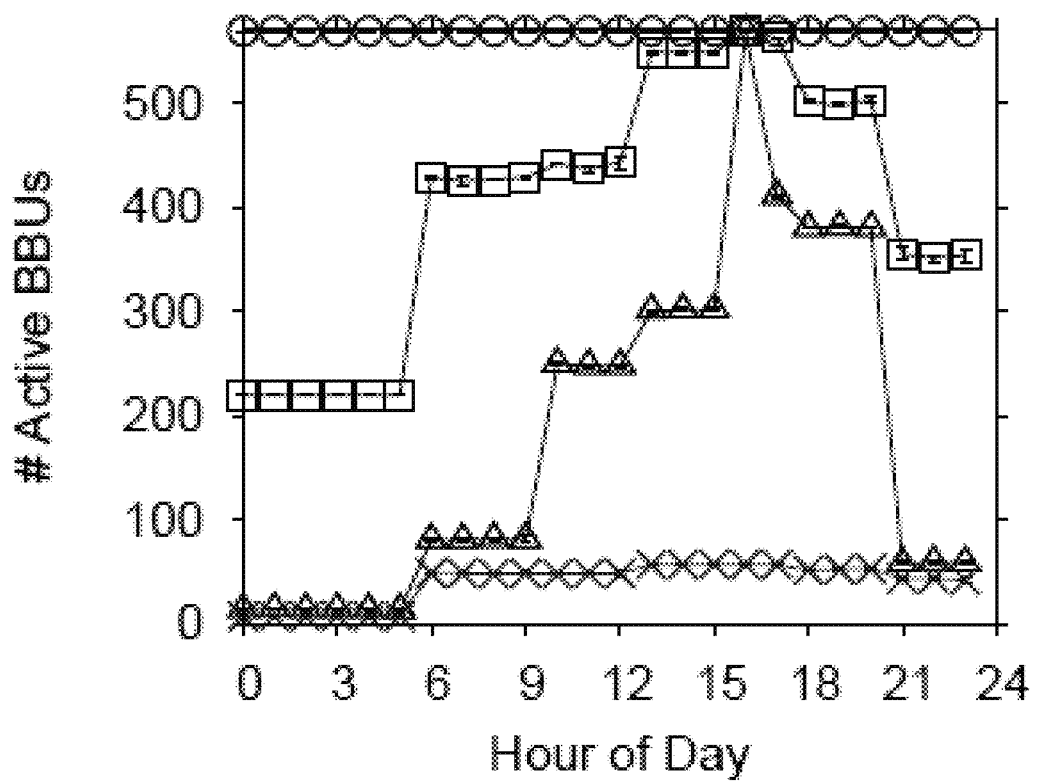

FIGS. 31(a) and 31(b) plot the traffic satisfaction ratio and the energy consumption (RU), respectively. We first see that FluidNet has a competitive traffic satisfaction ratio with FFR (is only 3% worse on average). The slight reduction is because FFR explicitly accounts for inter-sector interference by considering a cluster size of three sectors. In contrast, FluidNet applies FFR at a granularity of one sector and resorts to resource permutations to address inter-sector interference in a scalable manner. We also see that while having a competitive traffic ratio, FluidNet is much more (3× on average) energy efficient than FFR. DAS, albeit the most energy efficient strategy, suffers from lack of spatial reuse and hence satisfies only 65% of the traffic on average.

Figure 31C:
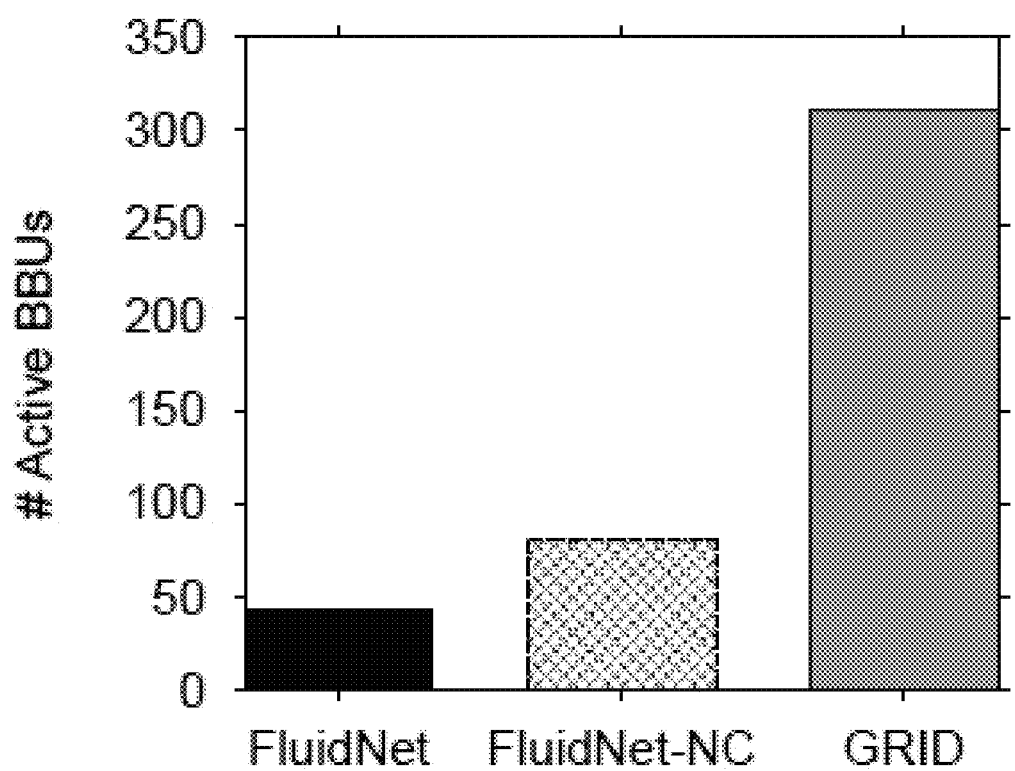
Figure 31D:
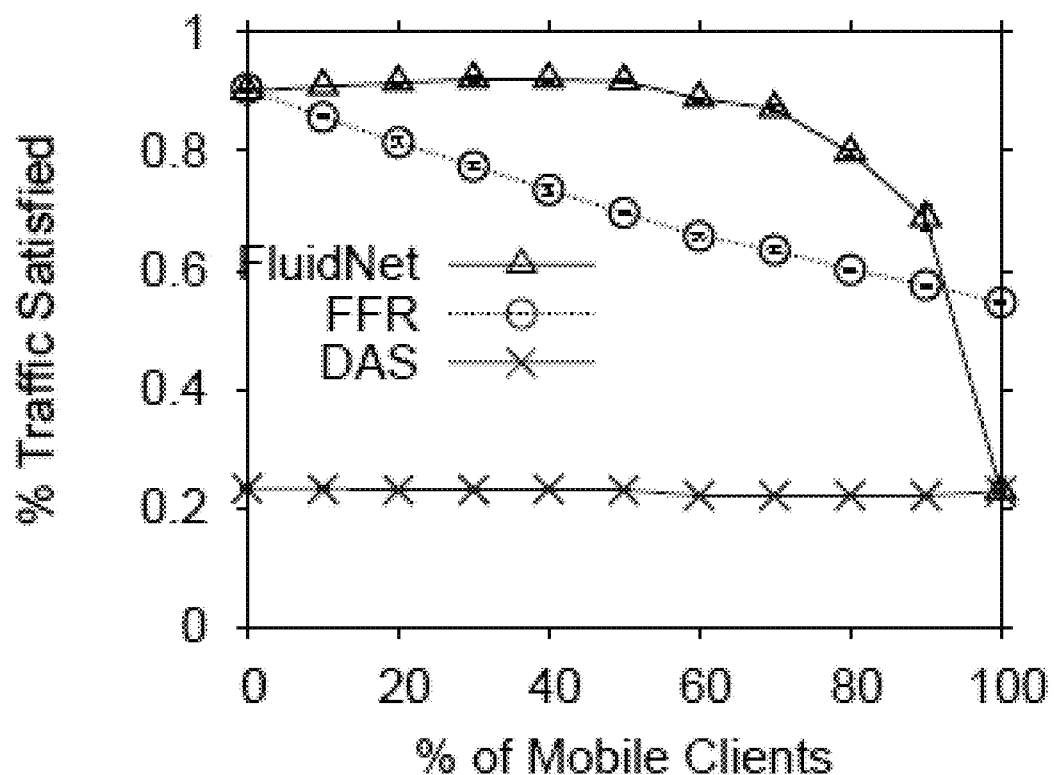
Figure 31E:
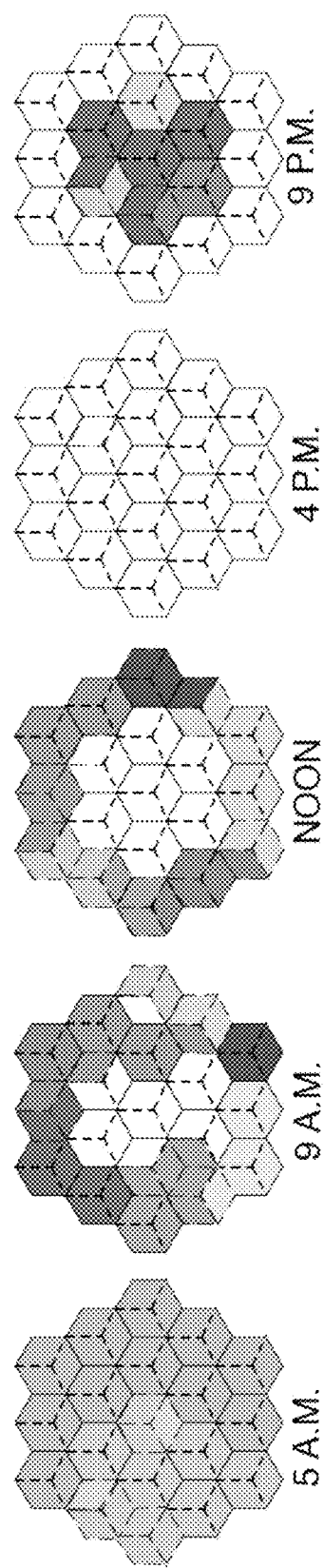

When compared with GRID, while the fraction of traffic satisfied does not differ considerably, FluidNet activates 2.2× less BBUs than GRID. This is due to the fact that while energy savings from BS-switching approaches such as GRID are inherently limited based on physical proximity of cells, FluidNet can cluster arbitrarily large numbers of cells to yield more energy savings. This is exemplified in FIG. 31(e) where we plot the temporal progression of clusters in FluidNet; clusters (color-coded) are seen to shift spatially from residential areas in the morning to business areas in the evening. White (uncolored) sectors are clusters of size one (i.e., cannot be merged with other sectors due to high traffic load). To closely look at clustering in FluidNet during non-peak hours, we compare FluidNet with and without the clustering component (the latter called "FluidNet-NC"). As seen in FIG. 31(c), even without its clustering component FluidNet outperforms GRID. Further, while FluidNet-NC requires 80 BBUs on average, FluidNet requires only 43 BBUs, resulting in much lower energy consumption. This shows that clustering is critical in realizing high energy savings.

In summary, FluidNet effectively exploits the spatial and temporal load asymmetry in the network and yields more energy savings than state-of-the-art solutions while satisfying a high fraction of the traffic demand.

User Heterogeneity: We now evaluate FluidNet with vehicular mobility. Here, we take the peak traffic hour of the day (4 p.m.) and investigate the traffic satisfaction ratio (averaged over 5 runs) with varying percentage of mobile clients. Each client moves at 60 miles per hour, only within its sector. From FIG. 31(d) we see that DAS performance is not affected by mobility since it results in a uniform signal quality for mobile clients; the network capacity is unchanged. With FFR, performance degrades as we increase the percentage of mobile clients (due to handovers and degraded SNR). With FluidNet, increasing number of mobile clients results in more carriers being allocated for DAS. While associating mobile traffic with DAS is beneficial in most of the cases, it can lead to lower performance (compared to FFR) when all the traffic is mobile. Ideally, one would need to identify the tradeoff between DAS (uniform per-client SNR but no spatial reuse) and FFR (degraded client SNR but high spatial reuse) for mobile traffic, and make careful decisions.

8. Discussions and Remarks

We presented FluidNet—a framework for dynamically reconfiguring the front-haul of a C-RAN to meet the dual objective of improved RAN performance with reduced resource usage in the BBU pool. Our evaluations show promising benefits towards these goals. Going forward, we would like to consider the following.

Applicability to other C-RAN Models: Since FluidNet focuses on logical front-haul configurations, it can work with any front-haul (e.g., microwave wireless) as long as the latter can support the data rates needed for transport of BBU signals. Similarly, it also applies in a partially-centralized C-RAN model, where more processing is entrusted to the RRHs to reduce the load on the front-haul. However, the energy savings in this model needs to be investigated.

Co-existence with Carrier Aggregation: LTE-advanced systems will support multiple component carriers and carrier aggregation. Carrier split for configurations in FluidNet can be realized much more easily with multiple component carriers. However, the interaction of FFR and DAS with joint scheduling on multiple carriers needs further study.

Migrating to Digital Front-Haul Transmissions: Instead of using RF over Fiber, we would like to migrate our BBUs to those that provide access to digital I-Q streams that can be transported over CPRI. This would allow for scalable realization of our configurations in the digital domain.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A wireless communications system comprising:
a baseband processing unit (BBU) pool including one or more baseband processing units (BBUs); and
a plurality of remote radio heads (RRHs) connected to the BBU pool through a front-haul network,
wherein the wireless communications system has a plurality of sectors, each of which includes one or more small cells, each of which is deployed by one of the plurality of RRHs,
wherein a BBU is mapped to two or more RRHs in a sector in a one-to-many configuration, and a BBU is mapped to a single RRH in a sector in a one-to-one configuration,
wherein a combination of the one-to-one configuration and the one-to-many configuration is applied to each of the plurality of sectors,
wherein the one-to-one configuration comprises a fractional frequency reuse (FFR) strategy, and the one-to-many configuration comprises a distributed antenna system (DAS) strategy,
wherein the wireless communications system is configured to:
obtain, from said one or more small cells in each of the plurality of sectors, first traffic demand from mobile traffic and second traffic demand from sector-exterior traffic,
determine a minimum set of resources needed for the DAS strategy and the FFR strategy according to the first traffic demand and the second traffic demand, respectively,
determine multiplexing of the DAS strategy and the FFR strategy for each of the plurality of sectors,
determine baseband processing unit (BBU) resource usage metric (RU metric) for each of the plurality of sectors,
cluster the plurality of sectors based on the RU metrics, and
apply the DAS strategy and the FFR strategy to the front-haul network for each of the plurality of sectors, and
wherein the RU metric is determined by the following formula:

$$RU(b_i, n_i) = b_i \cdot 1 + (B - b_i) \cdot n_i,$$

where $n_i$, is the number of small cells in sector i, $b_i$, is the number of spectral resources allocated to the DAS configuration, and B is the total number of available spectral resources.

2. The wireless communications system as in claim 1, wherein the one-to-one configuration and the one-to-many configuration are multiplexed in time or in frequency.

3. The wireless communications system as in claim 1, wherein the one-to-one configuration comprises co-ordinated multipoint transmission (CoMP).

4. The wireless communications system as in claim 1, wherein the wireless communications system is further configured to:
assign respective traffic to resources allocated to the DAS strategy and the FFR strategy.

5. The wireless communications system as in claim 1, wherein the multiplexing of the DAS strategy and the FFR strategy is determined so that the multiplexing supports an amount of traffic demand from each of the plurality of sectors and reduces computing resource consumption in a BBU pool.

6. The wireless communications system as in claim 1, wherein the clustering is performed until net offered load is not supported or the resource usage (RU) metric of a cluster is not improved.

7. The wireless communications system as in claim 1, wherein the allocated resources are determined by the RU metrics.

8. The wireless communications system as in claim 1, wherein the wireless communications system is further configured to:
determine a minimum amount of additional spectral resources for the FFR strategy to satisfy net traffic demand in each of the plurality of sectors.

9. The wireless communications system as in claim 8, wherein the determination of the minimum amount is performed in an iterative manner or using binary search in arriving at a split of spectral resources between DAS and FFR in said each of the plurality of sectors.

10. A method used in a wireless communications system comprising a baseband processing unit (BBU) pool including one or more baseband processing units (BBUs), and a plurality of remote radio heads (RRHs) connected to the BBU pool through a front-haul network, the method comprising:
applying to each of a plurality of sectors a combination of the one-to-one configuration and the one-to-many configuration,
wherein the wireless communications system has the plurality of sectors, each of which includes one or more small cells, each of which is deployed by one of the plurality of RRHs,
wherein a BBU is mapped to two or more RRHs in a sector in a one-to-many configuration, and a BBU is mapped to a single RRH in a sector in a one-to-one configuration,
wherein the one-to-one configuration comprises a fractional frequency reuse (FFR) strategy, and the one-to-many configuration comprises a distributed antenna system (DAS) strategy,
wherein the wireless communications system is configured to:
obtain, from said one or more small cells in each of the plurality of sectors, first traffic demand from mobile traffic and second traffic demand from sector-exterior traffic,
determine a minimum set of resources needed for the DAS strategy and the FFR strategy according to the first traffic demand and the second traffic demand, respectively,
determine multiplexing of the DAS strategy and the FFR strategy for each of the plurality of sectors,
determine baseband processing unit (BBU) resource usage metric (RU metric) for each of the plurality of sectors,
cluster the plurality of sectors based on the RU metrics, and apply the DAS strategy and the FFR strategy to the front-haul network for each of the plurality of sectors, and wherein the RU metric is determined by the following formula:

$$RU(b_i, n_i) = b_i \cdot 1 + (B - b_i) \cdot n_i,$$

where $n_i$, is the number of small cells in sector i, $b_i$, is the number of spectral resources allocated to the DAS configuration, and B is the total number of available spectral resources.

11. The method as in claim 10, wherein the one-to-one configuration and the one-to-many configuration are multiplexed in time or in frequency.

12. The method as in claim 10, wherein the one-to-one configuration comprises a fractional frequency reuse (FFR) strategy, and the one-to-many configuration comprises a distributed antenna system (DAS) strategy.

13. The method as in claim 10, wherein the one-to-one configuration comprises co-ordinated multipoint transmission (CoMP).

14. A baseband processing unit (BBU) used in a wireless communications system, the BBU being configured to be connected to a plurality of remote radio heads (RRHs) through front-haul network,
wherein the wireless communications system has a plurality of sectors, each of which includes one or more small cells, each of which is deployed by one of the plurality of RRHs,
wherein the BBU is mapped to two or more RRHs in a one-to-many configuration, and the BBU is mapped to a single RRH in a one-to-one configuration,
wherein a combination of the one-to-one configuration and the one-to-many configuration is applied to the sector,
wherein the one-to-one configuration comprises a fractional frequency reuse (FFR) strategy, and the one-to-many configuration comprises a distributed antenna system (DAS) strategy,
wherein the wireless communications system is configured to:
obtain, from said one or more small cells in each of the plurality of sectors, first traffic demand from mobile traffic and second traffic demand from sector-exterior traffic,
determine a minimum set of resources needed for the DAS strategy and the FFR strategy according to the first traffic demand and the second traffic demand, respectively,
determine multiplexing of the DAS strategy and the FFR strategy for each of the plurality of sectors,
determine baseband processing unit (BBU) resource usage metric (RU metric) for each of the plurality of sectors,
cluster the plurality of sectors based on the RU metrics, and
apply the DAS strategy and the FFR strategy to the front-haul network for each of the plurality of sectors, and wherein the RU metric is determined by the following formula:

$$RU(b_i, n_i) = b_i \cdot 1 + (B - b_i) \cdot n_i,$$

where $n_i$, is the number of small cells in sector i, $b_i$, is the number of spectral resources allocated to the DAS configuration, and B is the total number of available spectral resources.

15. The baseband processing unit (BBU) as in claim 14, wherein the one-to-one configuration and the one-to-many configuration are multiplexed in time or in frequency.

16. The baseband processing unit (BBU) as in claim 14, wherein the one-to-one configuration comprises a fractional frequency reuse (FFR) strategy, and the one-to-many configuration comprises a distributed antenna system (DAS) strategy.

17. The baseband processing unit (BBU) as in claim 14, wherein the one-to-one configuration comprises co-ordinated multipoint transmission (CoMP).

* * * * *